US009245496B2

(12) United States Patent
Gruber et al.

(10) Patent No.: US 9,245,496 B2
(45) Date of Patent: Jan. 26, 2016

(54) MULTI-MODE MEMORY ACCESS TECHNIQUES FOR PERFORMING GRAPHICS PROCESSING UNIT-BASED MEMORY TRANSFER OPERATIONS

(71) Applicant: QUALCOMM Incorporated, San Diego, CA (US)

(72) Inventors: Andrew E. Gruber, Arlington, MA (US); Tao Wang, Sunnyvale, CA (US); Shambhoo Khandelwal, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 374 days.

(21) Appl. No.: 13/725,393

(22) Filed: Dec. 21, 2012

(65) Prior Publication Data

US 2014/0176586 A1 Jun. 26, 2014

(51) Int. Cl.
*G09G 5/39* (2006.01)
*G09G 5/36* (2006.01)
*G06F 12/06* (2006.01)
*G09G 5/393* (2006.01)
*G09G 5/395* (2006.01)
*G06F 12/08* (2006.01)

(52) U.S. Cl.
CPC ............ *G09G 5/363* (2013.01); *G06F 12/0607* (2013.01); *G06F 12/0875* (2013.01); *G09G 5/393* (2013.01); *G09G 5/395* (2013.01); *G06F 2212/1021* (2013.01); *G06F 2212/455* (2013.01); *G06F 2212/601* (2013.01)

(58) Field of Classification Search
CPC ... G09G 5/39; G09G 5/393; G09G 2360/123; G06T 1/60; G06F 12/00
USPC .................................................. 345/531, 540
See application file for complete search history.

(56) References Cited

U.S. PATENT DOCUMENTS

| 5,396,597 A | 3/1995 | Bodin et al. |
| 5,948,081 A | 9/1999 | Foster |
| 6,564,304 B1 | 5/2003 | Van Hook et al. |

(Continued)

FOREIGN PATENT DOCUMENTS

EP 1191445 3/2002

OTHER PUBLICATIONS

International Search Report and Written Opinion—PCT/US2013/071283—ISA/EPO—Apr. 3, 2014, 10 pages.

(Continued)

*Primary Examiner* — Hau Nguyen
(74) *Attorney, Agent, or Firm* — Shumaker & Sieffert, P.A.

(57) ABSTRACT

This disclosure describes techniques for performing memory transfer operations with a graphics processing unit (GPU) based on a selectable memory transfer mode, and techniques for selecting a memory transfer mode for performing all or part of a memory transfer operation with a GPU. In some examples, the techniques of this disclosure may include selecting a memory transfer mode for performing at least part of a memory transfer operation, and performing, with a GPU, the memory transfer operation based on the selected memory transfer mode. The memory transfer mode may be selected from a set of at least two different memory transfer modes that includes an interleave memory transfer mode and a sequential memory transfer mode. The techniques of this disclosure may be used to improve the performance of GPU-assisted memory transfer operations.

50 Claims, 29 Drawing Sheets

(56) References Cited

U.S. PATENT DOCUMENTS

| | | |
|---|---|---|
| 6,956,578 B2 | 10/2005 | Kuo et al. |
| 7,580,042 B2 * | 8/2009 | Chung et al. .................. 345/566 |
| 8,035,647 B1 | 10/2011 | Bittel et al. |
| 2003/0048276 A1 | 3/2003 | Wasserman et al. |
| 2011/0072190 A1 | 3/2011 | Borracini et al. |
| 2011/0157200 A1 * | 6/2011 | Hur et al. ..................... 345/543 |
| 2011/0276735 A1 * | 11/2011 | Cho et al. ..................... 710/110 |
| 2013/0179645 A1 * | 7/2013 | Matsuo et al. ................ 711/151 |

OTHER PUBLICATIONS

Novak et al., "GPU Computing: Data-Parallel Algorithms," Karlsruhe Institute of Technology, XP055160009, Feb. 3, 2011, (https://cg.ivd.kit.edu/downloads/GPUComputing_assignment_2.pdf), 9 pp.

Second Written Opinion from International Application No. PCT/US2013/071283, dated Jan. 14, 2015, 7 pp.

International Preliminary Report on Patentability from International Application No. PCT/US2013/071283, dated Mar. 25, 2015, 8 pp.

* cited by examiner

| Time | Read Engine | Write Engine | Read Bus | Write Bus | Memory Controller | Memory Bus |
|---|---|---|---|---|---|---|
| 1 | Read1 | | | | | |
| 2 | Read2 | | | | ReadCommand1 | |
| 3 | Read3 | | | | ReadCommand2 | |
| 4 | Read4 | | | | ReadCommand3 | ReadData1 |
| 5 | | | ReadData1 | | ReadCommand4 | ReadData2 |
| 6 | | Write1 | ReadData2 | WriteData1 | | ReadData3 |
| 7 | Read5 | Write2 | ReadData3 | WriteData2 | | ReadData4 |
| 8 | Read6 | Write3 | ReadData4 | WriteData3 | | |
| 9 | Read7 | Write4 | | WriteData4 | | |
| 10 | Read8 | | | | WriteCommand1 | WriteData1 |
| 11 | | | | | ReadCommand5 | |
| 12 | | | | | | |
| 13 | | | | | | ReadData5 |
| 14 | | | ReadData5 | | | |
| 15 | | Write5 | | WriteData5 | | |
| 16 | Read9 | | | | WriteCommand2 | WriteData2 |
| 17 | | | | | ReadCommand6 | |
| 18 | | | | | | |
| 19 | | | | | | ReadData6 |
| 20 | | | ReadData6 | | | |
| 21 | | Write6 | | WriteData6 | | |
| 22 | Read10 | | | | WriteCommand3 | WriteData3 |
| 23 | | | | | ReadCommand7 | |
| 24 | | | | | | |
| 25 | | | | | | ReadData7 |
| 26 | | | ReadData7 | | | |
| 27 | | Write7 | | WriteData7 | | |
| 28 | Read11 | | | | WriteCommand4 | WriteData4 |
| 29 | | | | | ReadCommand8 | |
| 30 | | | | | | |
| 31 | | | | | | ReadData8 |
| 32 | | | ReadData8 | | | |
| 33 | | Write8 | | WriteData8 | | |
| 34 | Read12 | | | | WriteCommand5 | WriteData5 |
| 35 | | | | | ReadCommand9 | |
| 36 | | | | | | |
| 37 | | | | | | ReadData9 |
| 38 | | | ReadData9 | | | |

FIG. 9A

| Time | Read Engine | Write Engine | Read Bus | Write Bus | Memory Controller | Memory Bus |
|---|---|---|---|---|---|---|
| 39 | | Write9 | | WriteData9 | | |
| 40 | | | | | WriteCommand6 | WriteData6 |
| 41 | | | | | ReadCommand10 | |
| 42 | | | | | | |
| 43 | | | | | | ReadData10 |
| 44 | | | ReadData10 | | | |
| 45 | | Write10 | | WriteData10 | | |
| 46 | | | | | WriteCommand7 | WriteData7 |
| 47 | | | | | ReadCommand11 | |
| 48 | | | | | | |
| 49 | | | | | | ReadData11 |
| 50 | | | ReadData11 | | | |
| 51 | | Write11 | | WriteData11 | | |
| 52 | | | | | WriteCommand8 | WriteData8 |
| 53 | | | | | ReadCommand12 | |
| 54 | | | | | | |
| 55 | | | | | | ReadData12 |
| 56 | | | ReadData12 | | | |
| 57 | | Write12 | | WriteData12 | | |
| 58 | | | | | WriteCommand9 | WriteData9 |
| 59 | | | | | WriteCommand10 | WriteData10 |
| 60 | | | | | WriteCommand11 | WriteData11 |
| 61 | | | | | WriteCommand12 | WriteData12 |

FIG. 9B

| Time | Read Engine | Write Engine | Read Bus | Write Bus | Memory Controller | Memory Bus |
|---|---|---|---|---|---|---|
| 1 | Read1 | | | | | |
| 2 | Read2 | | | | ReadCommand1 | |
| 3 | Read3 | | | | ReadCommand2 | |
| 4 | Read4 | | | | ReadCommand3 | ReadData1 |
| 5 | | | ReadData1 | | ReadCommand4 | ReadData2 |
| 6 | | | ReadData2 | | | ReadData3 |
| 7 | | | ReadData3 | | | ReadData4 |
| 8 | | | ReadData4 | | | |
| 9 | | Write1 | | WriteData1 | | |
| 10 | | Write2 | | WriteData2 | WriteCommand1 | WriteData1 |
| 11 | | Write3 | | WriteData3 | WriteCommand2 | WriteData2 |
| 12 | | Write4 | | WriteData4 | WriteCommand3 | WriteData3 |
| 13 | Read5 | | | | WriteCommand4 | WriteData4 |
| 14 | Read6 | | | | ReadCommand5 | |
| 15 | Read7 | | | | ReadCommand6 | |
| 16 | Read8 | | | | ReadCommand7 | ReadData5 |
| 17 | | | ReadData5 | | ReadCommand8 | ReadData6 |
| 18 | | | ReadData6 | | | ReadData7 |
| 19 | | | ReadData7 | | | ReadData8 |
| 20 | | | ReadData8 | | | |
| 21 | | Write5 | | WriteData5 | | |
| 22 | | Write6 | | WriteData6 | WriteCommand5 | WriteData5 |
| 23 | | Write7 | | WriteData7 | WriteCommand6 | WriteData6 |
| 24 | | Write8 | | WriteData8 | WriteCommand7 | WriteData7 |
| 25 | Read9 | | | | WriteCommand8 | WriteData8 |
| 26 | Read10 | | | | ReadCommand9 | |
| 27 | Read11 | | | | ReadCommand10 | |
| 28 | Read12 | | | | ReadCommand11 | ReadData9 |
| 29 | | | ReadData9 | | ReadCommand12 | ReadData10 |
| 30 | | | ReadData10 | | | ReadData11 |
| 31 | | | ReadData11 | | | ReadData12 |
| 32 | | | ReadData12 | | | |
| 33 | | Write9 | | WriteData9 | | |
| 34 | | Write10 | | WriteData10 | WriteCommand9 | WriteData9 |
| 35 | | Write11 | | WriteData11 | WriteCommand10 | WriteData10 |
| 36 | | Write12 | | WriteData12 | WriteCommand11 | WriteData11 |
| 37 | | | | | WriteCommand12 | WriteData12 |

FIG. 10

| Time | Read Eng. | Write Eng. | Read Bus | Write Bus | Memory Controller | Memory Bus |
|---|---|---|---|---|---|---|
| 1 | Read1A | | | | | |
| 2 | Read1B | | | | ReadCommand1A | |
| 3 | Read2A | | | | ReadCommand1B | |
| 4 | Read2B | | | | ReadCommand2A | ReadData1A |
| 5 | | | ReadData1A | | ReadCommand2B | ReadData1B |
| 6 | | | ReadData1B | | | ReadData2A |
| 7 | | Write1 | ReadData2A | WriteData1 | | ReadData2B |
| 8 | Read3A | | ReadData2B | | | |
| 9 | Read3B | Write2 | | WriteData2 | | |
| 10 | Read4A | | | | WriteCommand1 | WriteData1 |
| 11 | Read4B | | | | ReadCommand3A | |
| 12 | | | | | ReadCommand3B | |
| 13 | | | | | | ReadData3A |
| 14 | | | ReadData3A | | | ReadData3B |
| 15 | | | ReadData3B | | | |
| 16 | | Write3 | | WriteData3 | | |
| 17 | Read5A | | | | WriteCommand2 | WriteData2 |
| 18 | Read5B | | | | ReadCommand4A | |
| 19 | | | | | ReadCommand4B | |
| 20 | | | | | | ReadData4A |
| 21 | | | ReadData4A | | | ReadData4B |
| 22 | | | ReadData4B | | | |
| 23 | | Write4 | | WriteData4 | | |
| 24 | Read6A | | | | WriteCommand3 | WriteData3 |
| 25 | Read6B | | | | ReadCommand5A | |
| 26 | | | | | ReadCommand5B | |
| 27 | | | | | | ReadData5A |
| 28 | | | ReadData5A | | | ReadData5B |
| 29 | | | ReadData5B | | | |
| 30 | | Write5 | | WriteData5 | | |
| 31 | Read7A | | | | WriteCommand4 | WriteData4 |
| 32 | Read7B | | | | ReadCommand6A | |
| 33 | | | | | ReadCommand6B | |
| 34 | | | | | | ReadData6A |
| 35 | | | ReadData6A | | | ReadData6B |
| 36 | | | ReadData6B | | | |
| 37 | | Write6 | | WriteData6 | | |

FIG. 11A

| Time | Read Eng. | Write Eng. | Read Bus | Write Bus | Memory Controller | Memory Bus |
|---|---|---|---|---|---|---|
| 38 | Read8A | | | | WriteCommand5 | WriteData5 |
| 39 | Read8B | | | | ReadCommand7A | |
| 40 | | | | | ReadCommand7B | |
| 41 | | | | | | ReadData7A |
| 42 | | | ReadData7A | | | ReadData7B |
| 43 | | | ReadData7B | | | |
| 44 | | Write7 | | WriteData7 | | |
| 45 | | | | | WriteCommand6 | WriteData6 |
| 46 | | | | | ReadCommand8A | |
| 47 | | | | | ReadCommand8B | |
| 48 | | | | | | ReadData8A |
| 49 | | | ReadData8A | | | ReadData8B |
| 50 | | | ReadData8B | | | |
| 51 | | Write8 | | WriteData8 | | |
| 52 | | | | | WriteCommand7 | WriteData7 |
| 53 | | | | | WriteCommand8 | WriteData8 |

FIG. 11B

| Time | Read Eng. | Write Eng. | Read Bus | Write Bus | Memory Controller | Memory Bus |
|---|---|---|---|---|---|---|
| 1 | Read1A | | | | | |
| 2 | Read1B | | | | ReadCommand1A | |
| 3 | Read2A | | | | ReadCommand1B | |
| 4 | Read2B | | | | ReadCommand2A | ReadData1A |
| 5 | Read3A | | ReadData1A | | ReadCommand2B | ReadData1B |
| 6 | Read3B | | ReadData1B | | ReadCommand3A | ReadData2A |
| 7 | Read4A | | ReadData2A | | ReadCommand3B | ReadData2B |
| 8 | Read4B | | ReadData2B | | ReadCommand4A | ReadData3A |
| 9 | | | ReadData3A | | ReadCommand4B | ReadData3B |
| 10 | | | ReadData3B | | | ReadData4A |
| 11 | | | ReadData4A | | | ReadData4B |
| 12 | | | ReadData4B | | | |
| 13 | | Write1 | | WriteData1 | | |
| 14 | | Write2 | | WriteData2 | WriteCommand1 | WriteData1 |
| 15 | | Write3 | | WriteData3 | WriteCommand2 | WriteData2 |
| 16 | | Write4 | | WriteData4 | WriteCommand3 | WriteData3 |
| 17 | Read5A | | | | WriteCommand4 | WriteData4 |
| 18 | Read5B | | | | ReadCommand5A | |
| 19 | Read6A | | | | ReadCommand5B | |
| 20 | Read6B | | | | ReadCommand6A | ReadData5A |
| 21 | Read7A | | ReadData5A | | ReadCommand6B | ReadData5B |
| 22 | Read7B | | ReadData5B | | ReadCommand7A | ReadData6A |
| 23 | Read8A | | ReadData6A | | ReadCommand7B | ReadData6B |
| 24 | Read8B | | ReadData6B | | ReadCommand8A | ReadData7A |
| 25 | | | ReadData7A | | ReadCommand8B | ReadData7B |
| 26 | | | ReadData7B | | | ReadData8A |
| 27 | | | ReadData8A | | | ReadData8B |
| 28 | | | ReadData8B | | | |
| 29 | | Write5 | | WriteData5 | | |
| 30 | | Write6 | | WriteData6 | WriteCommand5 | WriteData5 |
| 31 | | Write7 | | WriteData7 | WriteCommand6 | WriteData6 |
| 32 | | Write8 | | WriteData8 | WriteCommand7 | WriteData7 |
| 33 | | | | | WriteCommand8 | WriteData8 |

FIG. 12

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |

MULTI-MODE MEMORY ACCESS TECHNIQUES FOR PERFORMING GRAPHICS PROCESSING UNIT-BASED MEMORY TRANSFER OPERATIONS

TECHNICAL FIELD

This disclosure relates to graphics processing, and more particularly, to techniques for performing memory transfer operations with a graphics processor.

BACKGROUND

A graphics processing unit (GPU) is often used in a computing device to handle and/or provide hardware acceleration for one or more of the operations that are needed to display graphics images. One class of operations that is commonly handled by GPUs is memory transfer operations. Memory transfer operations may include memory copy operations and compositing operations. In some examples, the memory transfer operations may be referred to as blit operations or BLT operations (i.e., bit block transfer operations). Executing these memory transfer operations may involve performing numerous read and write operations with respect to an off-chip memory that stores the source and destination data for the memory transfer operation.

SUMMARY

This disclosure describes techniques for performing memory transfer operations with a graphics processing unit (GPU) based on a selectable memory transfer mode, and techniques for selecting a memory transfer mode for performing all or part of a memory transfer operation with a GPU. In some examples, the techniques for performing memory transfer operations may use a GPU that is configured to selectively switch between using an interleave memory transfer mode and a sequential memory transfer mode for performing all or part of a memory transfer operation. The interleave memory transfer mode may cause the GPU to perform a memory transfer operation based on a producer-consumer paradigm where read requests and write requests are interleaved with each other. The sequential memory transfer mode may cause the GPU to perform a memory transfer operation such that the GPU alternates between issuing groups of multiple, consecutive read requests and groups of multiple, consecutive write requests. In additional examples, the techniques for selecting a memory transfer mode may use a host processor (e.g., a CPU) and/or the GPU to select a memory transfer mode to use for all or part of the memory transfer operation based on one or more criteria.

In one example, this disclosure describes a method that includes selecting, with one or more processors, a memory transfer mode for performing at least part of a memory transfer operation. The memory transfer mode may be selected from a set of at least two different memory transfer modes that includes an interleave memory transfer mode and a sequential memory transfer mode. The method further includes performing, with a GPU, the memory transfer operation based on the selected memory transfer mode.

In another example, this disclosure describes a device that includes one or more processors configured to select a memory transfer mode for performing at least part of a memory transfer operation. The memory transfer mode may be selected from a set of at least two different memory transfer modes that includes an interleave memory transfer mode and a sequential memory transfer mode. The device further includes a GPU configured to perform the memory transfer operation based on the selected memory transfer mode.

In another example, this disclosure describes an apparatus that includes means for selecting a memory transfer mode for performing at least part of a memory transfer operation. The memory transfer mode may be selected from a set of at least two different memory transfer modes that includes an interleave memory transfer mode and a sequential memory transfer mode. The apparatus further includes means for performing the memory transfer operation based on the selected memory transfer mode.

In another example, this disclosure describes a computer-readable storage medium storing instructions that, when executed, cause one or more processors to select a memory transfer mode for performing at least part of a memory transfer operation. The memory transfer mode may be selected from a set of at least two different memory transfer modes that includes an interleave memory transfer mode and a sequential memory transfer mode. The computer-readable storage medium further stores instructions that, when executed, cause one or more processors to perform the memory transfer operation based on the selected memory transfer mode.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 9A and 9B are a timing diagram that illustrate example timing characteristics for a single source memory transfer operation that is performed according to the interleave memory transfer mode of this disclosure.

FIG. 10 is a timing diagram that illustrates example timing characteristics for a single source memory transfer operation that is performed according to the sequential memory transfer mode of this disclosure.

FIGS. 11A and 11B are a timing diagram that illustrate example timing characteristics for a multiple source memory transfer operation that is performed according to the interleave memory transfer mode of this disclosure.

FIG. 12 is a timing diagram that illustrates example timing characteristics for a multiple source memory transfer operation that is performed according to the sequential memory transfer mode of this disclosure.

FIG. 23 is a conceptual diagram illustrating a screen with a plurality of screen-aligned buffer regions and a destination surface according to this disclosure.

DETAILED DESCRIPTION

Figure 1:
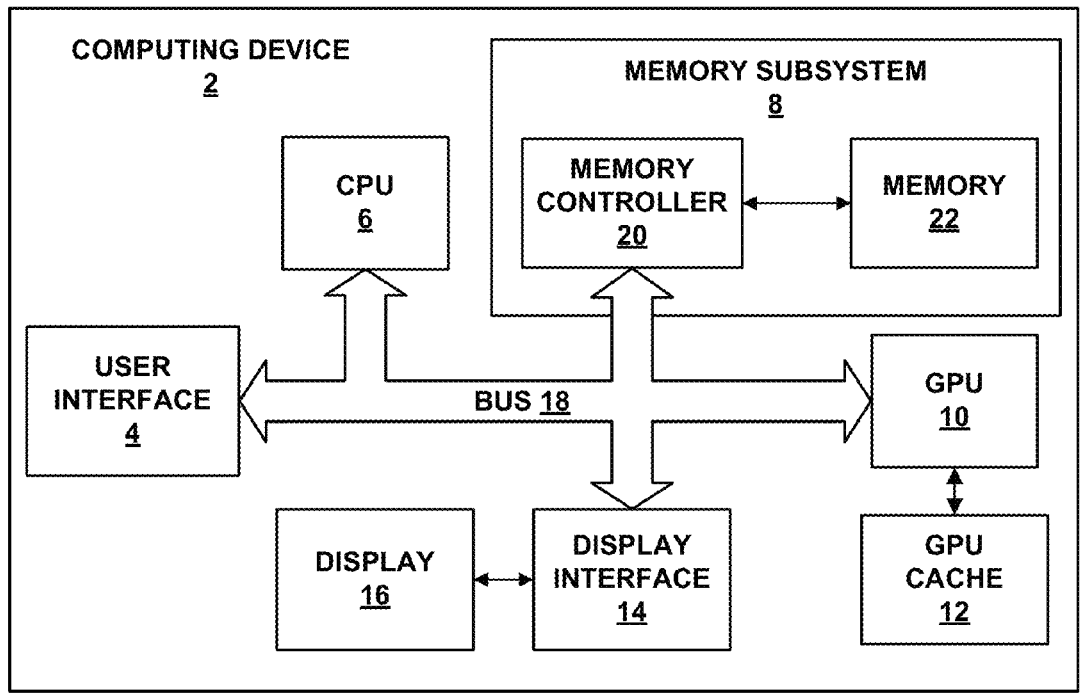
FIG. 1 is a block diagram illustrating an example computing device that may be used to implement the multi-mode memory transfer techniques of this disclosure and the memory transfer mode selection techniques of this disclosure.

This disclosure describes techniques for performing memory transfer operations with a graphics processing unit (GPU) based on a selectable memory transfer mode, and techniques for selecting a memory transfer mode for performing all or part of a memory transfer operation with a GPU. In some examples, the techniques for performing memory transfer operations may use a GPU that is configured to selectively switch between using an interleave memory transfer mode and a sequential memory transfer mode for performing all or part of a memory transfer operation. The interleave memory transfer mode may cause the GPU to perform a memory transfer operation based on a producer-consumer paradigm where read requests and write requests are interleaved with each other. The sequential memory transfer mode may cause a GPU to perform a memory transfer operation such that the GPU alternates between issuing groups of multiple, consecutive read requests and groups of multiple, consecutive write requests. In additional examples, the techniques for selecting a memory transfer mode may use a host processor (e.g., a CPU) and/or the GPU to select a memory transfer mode to use for all or part of the memory transfer operation based on one or more criteria.

Different memory transfer modes may be more efficient than others for different types of memory transfer operations. For example, the sequential memory transfer mode may generally be more efficient than the interleave memory transfer mode for larger memory transfer operations, while the interleave memory transfer mode may, in some cases, be more efficient than the sequential memory transfer mode for smaller memory transfer operations, particularly in the case where the minimum amount of data that is accessed per read request during the sequential memory transfer mode is large. The techniques of this disclosure may be used to selectively use different memory transfer modes that are more suited for particular types of memory transfer operations, thereby improving the performance of memory transfer operations by a GPU.

Memory transfer operations may include memory copy operations and compositing operations. In some examples, the memory transfer operations may be referred to as blit (i.e., bit block transfer) operations. Memory copy operations may involve copying data from a source region of a source surface to a destination region of a destination surface. That is, the GPU may read data from a source region of a source surface and write an exact replica of the data contained in the source region of the source surface to a destination region of a destination surface.

Compositing operations may involve combining at least two different source regions of the same or different source surfaces in some fashion, and writing the combination of the source regions to a destination region of a destination surface. In some cases, one or more of the source surfaces may be the same surface as the destination surface for a compositing operation. For example, a compositing operation may involve reading a single source region and a single destination region, blending the two together, and writing the blended result back to the destination region.

In some examples, when performing a compositing operation, the different source regions may be combined according to a raster operation, which may be different for different instances of the compositing operation. The raster operation may be an operation that specifies how the bits are to be combined for a particular compositing operation. In some examples, the raster operations may include bitwise operations, such as, e.g., Boolean logic operations. The Boolean logic operations may include, e.g., bitwise AND, OR, NOT and/or XOR operations.

In additional examples, the raster operations may include blending operations (e.g., alpha blending operations). In some examples, a blending operation may specify a source pixel multiplier and a destination pixel multiplier to be used during execution of the blending operation. In such examples, during execution of the blending operation, a source pixel value (e.g., a source pixel color value and/or a source pixel alpha value) may be multiplied by the source pixel multiplier to produce a first product, a corresponding destination pixel value (e.g., a destination pixel color value and/or a destination pixel alpha value) may be multiplied by the destination pixel multiplier to produce a second product, and the sum of the two products may be added together to produce a destination value for the pixel location. Other types of blending operations are also possible. In further examples, the different source regions may be combined according to a shader program executing on the GPU.

The source and destination surfaces used in a memory transfer operation may be the same or different surfaces, and may each correspond to a two-dimensional array of pixel data. The pixel data may include red, green, blue (RGB) color values and, in some cases, an alpha value (A) for each pixel in the surface. Because the surfaces correspond to a two-dimensional array of pixel data, the pixel data for an individual pixel location in the surface may be addressed by row and column coordinates. Each of the source regions used in a memory transfer operation may correspond to all or a subset of a respective source surface. Similarly, the destination region used in a memory transfer operation may correspond to all or a subset of the destination surface. The source and destination regions may be the same size and shape, and are typically, but not necessarily, rectangular-shaped regions.

When a GPU performs a memory transfer operation, the source surfaces and the destination surfaces used for memory transfer operation are typically stored in an off-chip memory. In other words, the memory may be formed on, located on, and/or disposed on a microchip, an integrated circuit, and/or a die that is different than the microchip, integrated circuit, and/or die upon which GPU is formed, located, and/or disposed. The memory may be communicatively coupled to the GPU via one or more buses and, in some cases, a memory controller.

When performing a memory copy operation, the GPU may read data from each of the pixel locations in the source region and write the data that was read from the source region to corresponding pixel locations in the destination region. Similarly, the performance of a compositing operation may involve reading the data from each of the locations in the multiple source regions, combining the data, and writing the combined data to the destination region. Therefore a single memory transfer operation may involve the issuance of numerous read requests and numerous write requests by the GPU to an off-chip memory via one or more buses.

To perform the memory read and write operations for a memory transfer operation a GPU may, in some examples, use a read engine and a write engine. The read engine may handle the issuance of read requests for the memory transfer operation and the write engine may handle the issuance of write requests for the memory transfer operation. When performing a memory transfer operation using the interleave memory transfer mode, the read and write engines may utilize a producer-consumer type of synchronization where the read client issues an initial amount of read requests, and upon receiving source data in response to a read request, the write client may consume the data and issue a corresponding write request to the memory. Upon consumption of the source data, the read engine may proceed to issue a subsequent read request. This type of loose synchronization between the read and write engines may cause the read and write streams to become intermingled and/or interleaved with each other. Therefore, when performing memory transfer operations based on a interleave memory transfer mode, the memory and the bus are frequently switching between servicing read requests and servicing write requests.

For some types of memories, such as, e.g., a double data rate synchronous dynamic random-access memory (DDR SDRAM), a certain amount of processing time overhead may be associated with each time the memory and/or bus needs to switch between servicing a read operation and servicing a write operation. For example, each time a switch occurs between servicing read and write requests, a particular amount of idle time may be needed to let the bus settle before the bus changes directions. This processing time overhead may be referred to as read-write turnaround time. As another example, if the read and write streams are accessing different pages of the memory, the memory may need to open and close different pages and/or banks of memory each time a switch occurs between servicing read and write requests, thereby adding additional processing time overhead to the read-write switch.

Memory transfer operations, such as compositing and blitting operations, are often memory limited. That is, the memory read and write requests needed to perform such operations often becomes a performance bottleneck for the GPU. Therefore, a read-write engine synchronization scheme that results in a large amount of switching between the servicing of read and write requests may not only reduce the memory access efficiency of the GPU, but may also reduce the performance of the overall memory transfer operation.

The sequential memory transfer mode described in this disclosure may be used to reduce the read-write turnaround overhead that occurs when performing memory transfer operations in a GPU, for example, by issuing sequences of multiple, consecutive read requests and sequences of multiple, consecutive write requests to a memory during separate time intervals. Because the read and write requests are issued in groups of multiple, consecutive requests during separate time intervals, the number of times that the system memory and/or bus may need to switch between servicing read and write requests may be reduced, thereby reducing the read-write turnaround overhead for the memory transfer operation.

For relatively large memory transfer operations, the reduced read-write turnaround overhead provided by the sequential memory transfer mode may cause the sequential memory transfer mode to be more efficient at performing memory transfer operations than the interleave memory transfer mode. For smaller memory transfer operations, however, the extra overhead needed to perform the synchronization in the sequential memory transfer mode may, in some cases, outweigh the benefits of reducing the read-write turnaround overhead. Moreover, in cases where the minimum amount of data transferred from the memory to the GPU for a read request during the sequential memory transfer mode is relatively large compared to the size of the memory transfer operation (e.g., a BLT operation), the sequential memory transfer mode may cause extraneous data to be read from the memory, thereby reducing the performance of the memory transfer operation.

Providing the ability to selectively switch between a sequential memory transfer mode and an interleave memory transfer mode for particular memory transfer operations or portions thereof according to the techniques of this disclosure may allow a GPU to selectively use the sequential memory transfer mode to increase memory efficiency in cases where the benefits of such a mode are not outweighed and/or diminished by other factors, and to use the interleave memory transfer mode in cases where the benefits of the sequential memory transfer mode are outweighed and/or diminished by other factors. By allowing a GPU to selectively use different memory transfer modes that are better suited for particular types (e.g., sizes) of memory transfer operations, the techniques of this disclosure may be able to improve the overall performance of a GPU that performs a variety of different types of memory transfer operations.

In some examples, a GPU and/or a GPU driver executing on an application processor may select a memory transfer mode for performing all or part of a memory transfer operation based on a size of the memory transfer operation. The size of the memory transfer operation may refer to the amount of data to be transferred by the memory transfer operation. For example, if the size of the memory transfer operation is greater than a threshold, then the GPU and/or the GPU driver may select the sequential memory transfer mode as the memory transfer mode to be used for performing all or part of the memory transfer operation. As another example, if the size of the memory transfer operation is not greater than a threshold, then the GPU and/or the GPU driver may select the interleave memory transfer mode as the memory transfer mode to be used for performing all or part of the memory transfer operation.

In additional examples, a GPU and/or a GPU driver executing on an application processor may select a memory transfer mode for performing all or part of a memory transfer operation based on an amount of overlap a destination region defined for a memory transfer operation has with a fixed, screen-aligned buffer region. In some cases, a surface may correspond to the pixels contained on a display monitor or screen. The screen may be subdivided into a plurality of regions each having a fixed size that corresponds to the size of the buffer that is used to store the read data. These subdivided regions may be referred to as fixed, screen-aligned buffer regions. In such examples, when operating in the sequential memory transfer mode, the GPU may be configured to transfer data between the memory and the GPU in data units of a fixed size that correspond to the size of the fixed, screen-aligned buffer regions.

If a destination region partially, but not fully, covers a particular fixed, screen-aligned buffer region, then the GPU and/or the GPU driver may select the interleave memory transfer mode as the memory transfer mode for that region of the screen because the buffer in which the read data will be stored will be not be fully utilized. If the sequential memory mode were selected in such a case, the fixed size memory read would cause extraneous data to be read from the memory, which may outweigh any read-write turnaround savings which would occur by using the sequential memory transfer mode. On the other hand, if a destination region fully covers a particular fixed, screen-aligned buffer region, then the GPU and/or the GPU driver may select the sequential memory transfer mode as the memory transfer mode for that region of the screen because the buffer in which the read data will be stored will be fully utilized and no time would be wasted retrieving extraneous data.

In further examples, a GPU and/or a GPU driver executing on an application processor may select a memory transfer mode for performing all or part of a memory transfer operation based on a size and/or a complexity of a shader program that is used to perform the memory transfer operation (e.g., a compositing operation). The size and/or the complexity of the shader program may be indicative of whether the performance of the shader operations for a particular memory transfer operation is likely to be a performance bottleneck for the memory transfer operation.

In such examples, if the size and/or complexity of the shader program is less than a threshold, then the GPU and/or the GPU driver may determine that the performance of the shader operations is not likely to be a performance bottleneck for the memory transfer operation. In such a case, the GPU and/or the GPU driver may select the sequential memory transfer mode for the memory transfer operation because it is possible that memory access efficiency may be a performance bottleneck for the memory transfer operation. On the other hand, if the size and/or complexity of the shader program is greater than a threshold, then the GPU and/or GPU driver may determine that the performance of the shader operations is likely to be a performance bottleneck for the memory transfer operation. In such a case, the GPU and/or GPU driver may select the interleave memory transfer mode for the memory transfer operation because an increase in memory efficiency is not needed and because the deferral of read operations that occurs in the sequential memory transfer mode could have the potential to starve the shader program of data, which is typically not desirable if the shader program is a performance bottleneck.

In additional examples, the GPU may select and configure a cache line size for a cache based on the selected memory transfer mode. The cache may correspond to a buffer in the GPU in which the read data is stored. In such examples, if the memory transfer mode is the sequential memory transfer mode, then the GPU may select a cache line size that is equal to the entire capacity of the cache in order to allow as large of a grouping of read and write operations as possible. On the other hand, if the memory transfer mode is the interleave memory transfer mode, then the GPU may select a cache line size that is less than the entire capacity of the cache in order to allow multiple regions of data to be simultaneously cached when servicing the interleaved requests.

According to some aspects of this disclosure, techniques are described for signaling a memory transfer mode to be used by a GPU for performing a memory transfer operation. The signaling techniques may allow a GPU driver and/or a user application executing on a host application processor to control the memory transfer mode that is used for performing a memory transfer operation.

In some examples, an information field that specifies a memory transfer mode may be added to one or more existing GPU commands that are configured to be executed by the GPU. The information field may, in some cases, be a single mode bit that specifies a memory transfer mode to be used for a memory transfer operation associated with the instruction. For example, a graphics driver may service a user-level blit command by specifying the source and destination memory regions to the GPU and by issuing a (three-dimensional) 3D draw call instruction to the GPU. The 3D draw call instruction may include a mode bit indicating the memory transfer mode to be used during execution of the 3D draw call instruction. The GPU may be configured to perform a memory transfer operation based on the memory transfer mode specified in the instruction.

In additional examples, the GPU may include a memory transfer mode state variable that specifies a memory transfer mode to be used for performing a memory transfer operation. In such examples, a GPU command (e.g., a command issued to the GPU from a GPU driver) may be used to program a state of the memory transfer mode state variable to a value indicative of a memory transfer mode to be used for performing a memory transfer operation. The GPU may be configured to perform the memory transfer operation based on the state of the memory transfer mode state variable.

In further examples, the memory transfer mode may be part of the GPU state that is modified as part of a GPU command stream. The GPU command stream may include both state register set-up commands as well as instructions (or instruction pointers) to code that is executed by one or more GPU shader processors.

In additional examples, an instruction may be added to the application programming interface (API) for the GPU driver. The instruction may include a memory transfer mode indicator that indicates a memory transfer mode to be used for performing the memory transfer operation. The GPU driver may be configured to cause the GPU to perform a memory transfer operation based on the memory transfer mode indicator. In this way, a user application may be able to specify the memory transfer mode to be used by a GPU when performing a memory transfer operation.

FIG. 1 is a block diagram illustrating an example computing device 2 that may be used to implement the multi-mode memory transfer techniques of this disclosure and the memory transfer mode selection techniques of this disclosure. Computing device 2 may comprise a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a hand-held device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user interface 4, a CPU 6, a memory subsystem 8, a graphics processing unit (GPU) 10, a GPU cache 12, a display interface 14, a display 16 and a bus 18. User interface 4, CPU 6, memory subsystem 8, GPU 10 and display interface 14 may communicate with each other using bus 18. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. The user may provide input to computing device 2 via one or more input devices (not shown) such as a keyboard, a mouse, a microphone, a touch pad or another input device that is coupled to computing device 2 via user interface 4.

The software applications that execute on CPU 6 may include one or more graphics rendering instructions that instruct GPU 10 to cause the rendering of graphics data to display 16. In some examples, the software instructions may conform to a graphics application programming interface (API), such as, e.g., an Open Graphics Library (OpenGL®) API, an Open Graphics Library Embedded Systems (OpenGL ES) API, a Direct3D API, a DirectX API, a RenderMan API, a WebGL API, or any other public or proprietary standard graphics API. In order to process the graphics rendering instructions, CPU 6 may issue one or more graphics rendering commands to GPU 10 to cause GPU 10 to perform some or all of the rendering of the graphics data. In some examples, the graphics data to be rendered may include a list of graphics primitives, e.g., points, lines, triangles, quadralaterals, triangle strips, patches, etc.

Memory subsystem 8 may be configured to service memory access requests received from other components within computing device 2. For example, memory subsystem 8 may service memory access requests from CPU 6, GPU 10, and/or display interface 14. The memory access requests may include read access requests and write access requests. Memory subsystem 8 is communicatively coupled to CPU 6, GPU 10, user interface 4, and display interface 14 via bus 18.

Memory subsystem 8 includes a memory controller 20 and a memory 22. Memory controller 20 facilitates the transfer of data going into and out of memory 22. For example, memory controller 20 may receive memory read requests and memory write requests from CPU 6 and/or GPU 10, and service such requests with respect to memory 22 in order to provide memory services for the components in computing device 2.

A read request may specify a memory address or a range of memory addresses from which data should be returned to the requester. A write request may specify a memory address or a range of memory addresses to which specified data should be written. The data to be written may be supplied to memory controller 20 by the requester (e.g., CPU 6 and/or GPU 10) via one or more data busses in conjunction with the write request. In some examples, the data to be written may form a part of the write request. In response to receiving memory access requests, memory controller 20 may issue one or more read commands to memory 22 and/or one or more write commands to memory 22 to service the read and write requests.

Memory controller 20 is communicatively coupled to memory 22 via a dedicated memory bus, and to other components (e.g., CPU 6 and GPU 10) via bus 18. Although memory controller 20 is illustrated in the example computing device 2 of FIG. 1 as being a processing module that is separate from both CPU 6 and memory 22, in other examples, some or all of the functionality of memory controller 20 may be implemented in one or more of CPU 6, GPU 10, and memory 22.

Memory 22 may store program modules and/or instructions that are accessible for execution by CPU 6 and/or data for use by the programs executing on CPU 6. For example, memory 22 may store user applications and graphics data associated with the applications. Memory 22 may also store information for use by and/or generated by other components of computing device 2. For example, memory 22 may act as a device memory for GPU 10 and may store data to be operated on by GPU 10 as well as data resulting from operations performed by GPU 10. For example, memory 22 may store any combination of surfaces, source surfaces, destination surfaces, texture buffers, depth buffers, stencil buffers, vertex buffers, frame buffers, or the like. In addition, memory 22 may store command streams for processing by GPU 10. Memory 22 may include one or more volatile or non-volatile memories or storage devices, such as, for example, random access memory (RAM), static RAM (SRAM), dynamic RAM (DRAM), synchronous dynamic random access memory (SDRAM), read-only memory (ROM), erasable programmable ROM (EPROM), electrically erasable programmable ROM (EEPROM), Flash memory, a magnetic data media or an optical storage media. In some examples, memory 22 may be a double data rate (DDR) SDRAM, such as, e.g., a DDR1 SDRAM, a DDR2 SDRAM, a DDR3 SDRAM, a DDR4 SDRAM, etc.

GPU 10 may be configured to execute commands that are issued to GPU 10 by CPU 6. The commands executed by GPU 10 may include graphics commands, draw call commands, GPU state programming commands, memory transfer commands, general-purpose computing commands, kernel execution commands, etc. The memory transfer commands may include, e.g., memory copy commands, memory compositing commands, and blitting commands.

In some examples, GPU 10 may be configured to perform graphics operations to render one or more graphics primitives to display 16. In such examples, when one of the software applications executing on CPU 6 requires graphics processing, CPU 6 may provide graphics data to GPU 10 for rendering to display 16 and issue one or more graphics commands to GPU 10. The graphics commands may include, e.g., draw call commands, GPU state programming commands, memory transfer commands, blitting commands, etc. The graphics data may include vertex buffers, texture data, surface data, etc. In some examples, CPU 6 may provide the commands and graphics data to GPU 10 by writing the commands and graphics data to memory 22, which may be accessed by GPU 10.

In further examples, GPU 10 may be configured to perform general-purpose computing for applications executing on CPU 6. In such examples, when one of the software applications executing on CPU 6 decides to off-load a computational task to GPU 10, CPU 6 may provide general-purpose computing data to GPU 10, and issue one or more general-purpose computing commands to GPU 10. The general-purpose computing commands may include, e.g., kernel execution commands, memory transfer commands, etc. In some examples, CPU 6 may provide the commands and general-purpose computing data to GPU 10 by writing the commands and graphics data to memory 22, which may be accessed by GPU 10.

GPU 10 may, in some instances, be built with a highly-parallel structure that provides more efficient processing of vector operations than CPU 6. For example, GPU 10 may include a plurality of processing elements that are configured to operate on multiple vertices, control points, pixels and/or other data in a parallel manner. The highly parallel nature of GPU 10 may, in some instances, allow GPU 10 to render graphics images (e.g., GUIs and two-dimensional (2D) and/or three-dimensional (3D) graphics scenes) onto display 16 more quickly than rendering the images using CPU 6. In addition, the highly parallel nature of GPU 10 may allow GPU 10 to process certain types of vector and matrix operations for general-purposed computing applications more quickly than CPU 6.

GPU 10 may, in some examples, be integrated into a motherboard of computing device 2. In other instances, GPU 10 may be present on a graphics card that is installed in a port in the motherboard of computing device 2 or may be otherwise incorporated within a peripheral device configured to interoperate with computing device 2. In further instances, GPU 10 may be located on the same microchip as CPU 6 forming a system on a chip (SoC). GPU 10 may include one or more processors, such as one or more microprocessors, application specific integrated circuits (ASICs), field programmable gate arrays (FPGAs), digital signal processors (DSPs), or other equivalent integrated or discrete logic circuitry.

In some examples, GPU 10 may be directly coupled to GPU cache 12. Thus, GPU 10 may read data from and write data to GPU cache 12 without necessarily using bus 18. In other words, GPU 10 may process data locally using a local storage, instead of off-chip memory. This allows GPU 10 to operate in a more efficient manner by eliminating the need of GPU 10 to read and write data via bus 18, which may experience heavy bus traffic. In some instances, however, GPU 10 may not include a separate cache, but instead utilize memory 22 via bus 18. GPU cache 12 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 10 may store rendered image data in a frame buffer that is allocated within memory 22. Display interface 14 may retrieve the data from the frame buffer and configure display 16 to display the image represented by the rendered image data. In some examples, display interface 14 may include a digital-to-analog converter (DAC) that is configured to convert the digital values retrieved from the frame buffer into an analog signal consumable by display 16. In other examples, display interface 14 may pass the digital values directly to display 16 for processing. Display 16 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 16 may be integrated within computing device 2. For instance, display 16 may be a screen of a mobile telephone handset or a tablet computer. Alternatively, display 16 may be a stand-alone device coupled to computer device 2 via a wired or wireless communications link. For instance, display 16 may be a computer monitor or flat panel display connected to a personal computer via a cable or wireless link.

Bus 18 may be implemented using any combination of bus structures and bus protocols including first, second and third generation bus structures and protocols, shared bus structures and protocols, point-to-point bus structures and protocols, unidirectional bus structures and protocols, and bidirectional bus structures and protocols. Examples of different bus structures and protocols that may be used to implement bus 18 include, e.g., a HyperTransport bus, an InfiniBand bus, an Advanced Graphics Port bus, a Peripheral Component Interconnect (PCI) bus, a PCI Express bus, an Advanced Microcontroller Bus Architecture (AMBA) Advanced High-performance Bus (AHB), an AMBA Advanced Peripheral Bus (APB), and an AMBA Advanced eXentisible Interface (AXI) bus. Other types of bus structures and protocols may also be used.

According to this disclosure, one or both of CPU 6 and GPU 10 may be configured to select a memory transfer mode for performing at least part of a memory transfer operation, and GPU 10 may be configured to perform the memory transfer operation based on the selected memory transfer mode. The memory transfer mode may be selected from a set of at least two different memory transfer modes. In some examples, the set of at least two different memory transfer modes may include an interleave memory transfer mode and a sequential memory transfer mode.

In some examples, the memory transfer mode may indicate how the issuance of read requests and the issuance of write requests are to be synchronized during the performance of a memory transfer operation. In such examples, the techniques of this disclosure may allow GPU 10 to selectively switch between at least two different modes of synchronization for the issuance of read requests and write requests. For example, if the interleave memory transfer mode is selected as the memory transfer mode to use for performing all or part of a memory transfer operation, then GPU 10 may cause read requests and write requests to be issued based on a producer-consumer synchronization paradigm. For instance, a write engine may consume source data in response to GPU 10 receiving the source data (e.g., in response to source data being produced), and a read engine may issue read requests in response to source data being consumed by the write engine. On the other hand, if the sequential memory transfer mode is selected as the memory transfer mode to use for performing all or part of a memory transfer operation, then GPU 10 may cause read requests and write requests to be issued based on a mutual exclusion synchronization paradigm. For example, GPU 10 may alternate between enabling a read engine to issue multiple, consecutive read requests and enabling a write engine to issue multiple, consecutive write requests during separate time intervals.

In further examples, the memory transfer mode may indicate a level of granularity at which read requests and write requests are to be interleaved during the performance of a memory transfer operation. In such examples, the techniques of this disclosure may allow GPU 10 to selectively switch between at least two different granularities of interleaving read requests and write requests for the performance of memory transfer operations. For example, if the interleave memory transfer mode is selected as the memory transfer mode to use for performing all or part of a memory transfer operation, then GPU 10 may cause read requests and write requests to be interleaved with a relatively fine level of granularity. For instance, single read requests and single write requests may be interleaved with each other. On the other hand, if the sequential memory transfer mode is selected as the memory transfer mode to use for performing all or part of a memory transfer operation, then GPU 10 may cause read requests and write requests to be interleaved with a relatively course level of granularity. For example, GPU 10 may alternate between issuing groups of multiple, consecutive read requests and groups of multiple, consecutive write requests.

In additional examples, the memory transfer mode may indicate whether read requests and write requests are required to be issued by GPU 10 in groups of multiple, consecutive read requests and groups of multiple, consecutive write requests. In such examples, the techniques of this disclosure may allow GPU 10 to selectively switch between: (1) requiring read requests and write requests to be issued in groups of multiple, consecutive read requests and groups of multiple, consecutive write requests; and (2) not requiring read requests and write requests to be issued in groups of multiple, consecutive read requests and groups of multiple, consecutive write requests.

For example, if the interleave memory transfer mode is selected as the memory transfer mode to use for performing all or part of a memory transfer operation, then GPU 10 may not require read requests and write requests to be issued in groups of multiple, consecutive read requests and groups of multiple, consecutive write requests. For example, GPU 10 may allow a read engine and a write engine to independently issue individual memory requests based on a producer-consumer paradigm. On the other hand, if the sequential memory transfer mode is selected as the memory transfer mode to use for performing all or part of a memory transfer operation, then GPU 10 may require that read requests and write requests be issued in groups of multiple, consecutive read requests and groups of multiple, consecutive write requests. For example, GPU 10 may alternate between granting exclusive memory access to a read engine in order to issue multiple, consecutive read requests to memory 22, and granting exclusive memory access to a write engine in order to issue multiple, consecutive write requests to memory 22.

In some examples, GPU 10 and/or CPU 6 (e.g., a GPU driver executing on CPU 6) may select a memory transfer mode for performing all or part of a memory transfer operation based on a size of the memory transfer operation. The size of the memory transfer operation may refer to the amount of data to be transferred by the memory transfer operation. For example, if the size of the memory transfer operation is greater than a threshold, then GPU 10 and/or CPU 6 may select the sequential memory transfer mode as the memory transfer mode to be used for performing all or part of the memory transfer operation. On the other hand, if the size of the memory transfer operation is not greater than a threshold, then GPU 10 and/or CPU 6 may select the interleave memory transfer mode as the memory transfer mode to be used for performing all or part of the memory transfer operation.

In additional examples, GPU 10 and/or CPU 6 (e.g., a GPU driver executing on CPU 6) may select a memory transfer mode for performing all or part of a memory transfer operation based on an amount of overlap a destination region defined for the memory transfer operation has with a fixed, screen-aligned buffer region. In some cases, a surface may correspond to the pixels contained on a display monitor or screen. The screen may be subdivided into a plurality of regions each having a fixed size that corresponds to the size of the buffer that is used to store the read data. These subdivided regions may be referred to as fixed, screen-aligned buffer regions. In such examples, when operating in the sequential memory transfer mode, GPU 10 may be configured to transfer data between memory 22 and GPU 10 in data units of a fixed size that correspond to the size of the fixed, screen-aligned buffer regions.

If a destination region partially, but not fully, covers a particular fixed, screen-aligned buffer region, then GPU 10 and/or CPU 6 may select the interleave memory transfer mode as the memory transfer mode for that region of the screen because the buffer in which the read data will be stored will be not be fully utilized. If the sequential memory mode were selected in such a case, the fixed size memory read would cause extraneous data to be read from the memory, which may outweigh any read-write turnaround savings which would occur by using the sequential memory transfer mode. On the other hand, if a destination region fully covers a particular fixed, screen-aligned buffer region, then GPU 10 and/or CPU 6 may select the sequential memory transfer mode as the memory transfer mode for that region of the screen because the buffer in which the read data will be stored will be fully utilized and no time would be wasted retrieving extraneous data.

In further examples, GPU 10 and/or CPU 6 (e.g., a GPU driver executing on CPU 6) may select a memory transfer mode for performing a memory transfer operation based on a size and/or a complexity of a shader program that is used to perform the memory transfer operation (e.g., a compositing operation). The size and/or the complexity of the shader program may be indicative of whether the performance of the shader operations for a particular memory transfer operation is likely to be a performance bottleneck for the memory transfer operation.

In such examples, if the size and/or complexity of the shader program is less than a threshold, then GPU 10 and/or CPU 6 may determine that the performance of the shader operations is not likely to be a performance bottleneck for the memory transfer operation. In such a case, GPU 10 and/or CPU 6 may select the sequential memory transfer mode for the memory transfer operation because it is possible that memory access efficiency may be a performance bottleneck for the memory transfer operation. On the other hand, if the size and/or complexity of the shader program is greater than a threshold, then GPU 10 and/or CPU 6 may determine that the performance of the shader operations is likely to be a performance bottleneck for the memory transfer operation. In such a case, GPU 10 and/or CPU 6 may select the interleave memory transfer mode for the memory transfer operation because an increase in memory efficiency is not needed and because the deferral of read operations that occurs in the sequential memory transfer mode could have the potential to starve the shader program of data, which is typically not desirable if the shader program is a performance bottleneck.

In additional examples, GPU 10 and/or CPU 6 (e.g., a GPU driver executing on CPU 6) may select a memory transfer mode based on a determination of whether execution of the shader program is likely to be a performance bottleneck for the memory transfer operation. For example, GPU 10 and/or CPU 6 may select the sequential memory transfer mode as the memory transfer mode in response to determining that the execution of the shader program is not likely to be a performance bottleneck for the memory transfer operation. On the other hand, GPU 10 and/or CPU 6 selecting the interleave memory transfer mode as the memory transfer mode in response to determining that the execution of the shader program is likely to be a performance bottleneck for the memory transfer operation.

In additional examples, GPU 10 may select and configure a cache line size for a cache based on the selected memory transfer mode. The cache may correspond to the buffer in the GPU in which the read data is stored. In such examples, if the memory transfer mode is the sequential memory transfer mode, then GPU 10 may select a cache line size that is equal to the entire capacity of the cache in order to allow as large of a grouping of read and write operations as possible. On the other hand, if the memory transfer mode is the interleave memory transfer mode, then GPU 10 may select a cache line size that is less than the entire capacity of the cache in order to allow multiple regions of data to be simultaneously cached when servicing the interleaved requests.

In some examples, one or more other components within computing device 2 (e.g., CPU 6) may signal a memory transfer mode to be used by GPU 10 for performing a memory transfer operation. The signaling techniques may allow a GPU driver and/or a user application executing on the application processor to control the memory transfer mode that is used for performing a memory transfer operation.

Different memory transfer modes may be more efficient than others for different types of memory transfer operations. For example, the sequential memory transfer mode may generally be more efficient than the interleave memory transfer mode for larger memory transfer operations, while the interleave memory transfer mode may generally be more efficient than the sequential memory transfer mode for smaller memory transfer operations, particularly in the case where the minimum amount of data that is accessed per read request during the sequential memory transfer mode is large. The techniques of this disclosure may be used to selectively use different memory transfer modes that are more suited for particular types of memory transfer operations, thereby improving the performance of memory transfer operations by a GPU.

Figure 2:
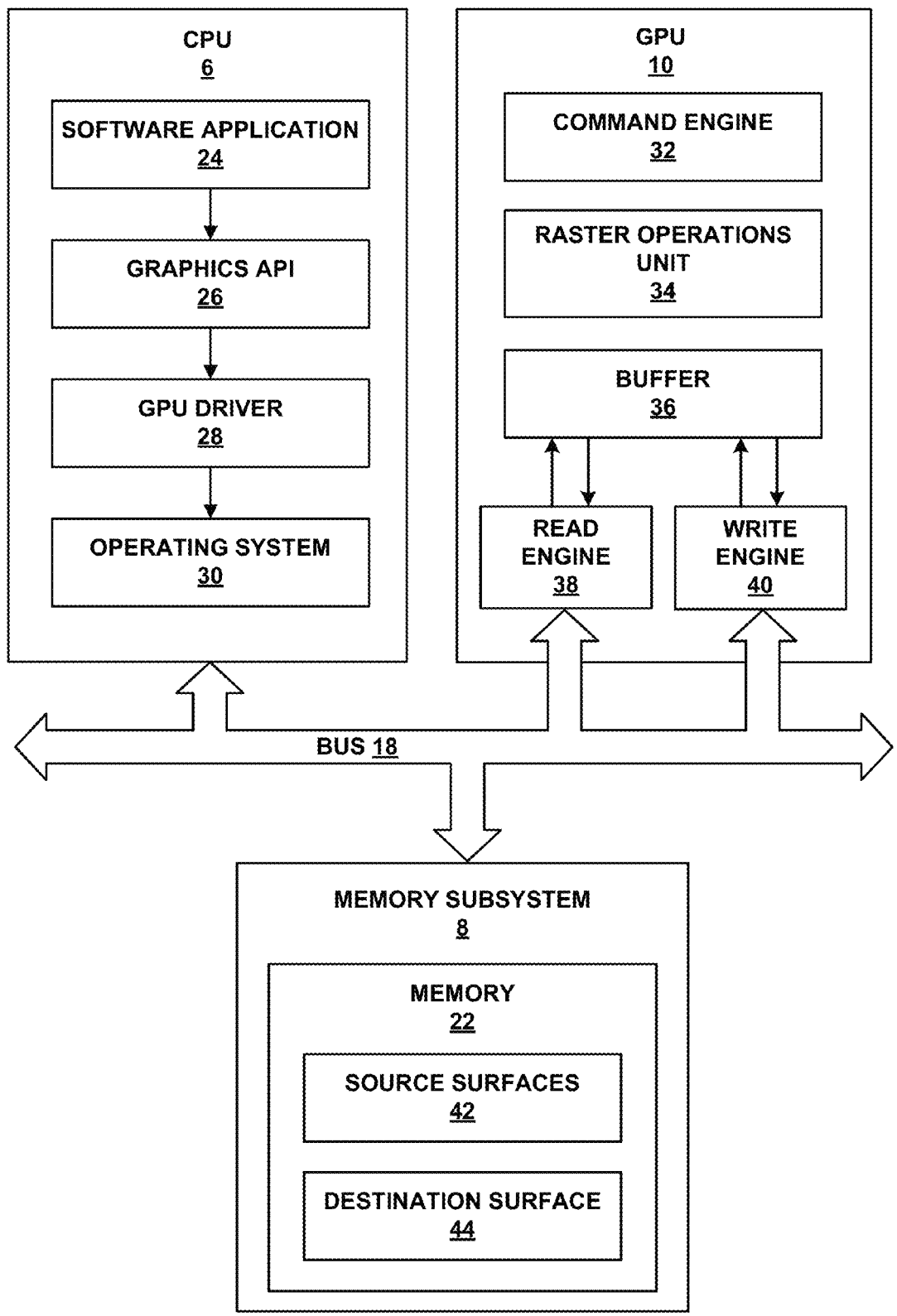
FIG. 2 is a block diagram illustrating the CPU, the GPU and the memory subsystem of the computing device in FIG. 1 in further detail.

FIG. 2 is a block diagram illustrating CPU 6, GPU 10 and memory subsystem 8 of computing device 2 in FIG. 1 in further detail. As shown in FIG. 2, CPU 6 is communicatively coupled to GPU 10 and memory subsystem 8, and GPU 10 is communicatively coupled to CPU 6 and memory subsystem 8. GPU 10 may, in some examples, be integrated onto a motherboard with CPU 6. In additional examples, GPU 10 may be implemented on a graphics card that is installed in a port of a motherboard that includes CPU 6. In further examples, GPU 10 may be incorporated within a peripheral device that is configured to interoperate with CPU 6. In additional examples, GPU 10 may be located on the same microchip as CPU 6 forming a system on a chip (SoC).

CPU 6 may be configured to execute a software application 24, a graphics API 26, a GPU driver 28 and an operating system 30. Software application 24 may include one or more instructions that cause graphics images to be displayed and/or one or more instructions that cause a non-graphics task (e.g., a general-purposed computing task) to be performed on GPU 10. Software application 24 may issue instructions to graphics API 26. Graphics API 26 may be a runtime service that translates the instructions received from software application 24 into a format that is consumable by GPU driver 28.

GPU driver 28 receives the instructions from software application 24, via graphics API 26, and controls the operation of GPU 10 to service the instructions. For example, GPU driver 28 may formulate one or more commands, place the commands into memory 22, and instruct GPU 10 to execute the commands. In some examples, GPU driver 28 may place the commands into memory 22 and communicate with GPU 10 via operating system 30, e.g., via one or more system calls.

In some examples, GPU driver 28 (or another software component on CPU 6) may be configured to select a memory transfer mode to be used for performing all or part of the memory transfer operation, and cause GPU 10 to perform the memory transfer operation based on the selected memory transfer mode. In some examples, the memory transfer mode may be selected from a set of at least two memory transfer modes that includes an interleave memory transfer mode and a sequential memory transfer mode.

In additional examples, GPU driver 28 may be configured to select the memory transfer mode to be used for all or part of a memory transfer operation according to any of the techniques described in this disclosure. For example, GPU driver 28 may select the memory transfer mode based on the size of the memory transfer operation (e.g., an amount of data to be transferred by the memory transfer operation). As another example, GPU driver 28 may select the memory transfer mode based on an amount of overlap a destination region defined for the memory transfer operation has with a fixed, screen-aligned buffer region. As a further example, GPU driver 28 may select the memory transfer mode based on a determination of whether execution of the shader program is likely to be a performance bottleneck for the memory transfer operation. In an additional example, GPU 10 may use one or more shader programs to perform the memory transfer operation, and GPU driver 28 may select the memory transfer mode based on a size of the shader program that is used for performing the memory transfer operation and/or a complexity of the shader program that is used for performing the memory transfer operation.

GPU 10 includes a command engine 32, a raster operations unit 34, a buffer 36, a read engine 38 and a write engine 40. In some examples, GPU 10 may include a 3D graphics rendering pipeline (not shown). In such examples, raster operations unit 34 may form a part of the 3D graphics rendering pipeline.

In some examples, GPU 10 may include a plurality of processing units (not shown), each of which may be a programmable processing unit or a fixed-function processing unit. In cases where GPU 10 includes a 3D graphics rendering pipeline, the plurality of processing units may operate together to implement the 3D graphics rendering pipeline. In some examples, the 3D graphics rendering pipeline may conform to a 3D graphics pipeline that is specified by one or more public and/or proprietary 3D graphics standard APIs, such as, e.g., an Open Graphics Library (OpenGL®) API, an Open Graphics Library Embedded Systems (OpenGL ES) API, a Direct3D API, a DirectX API, etc.

A programmable processing unit may include, for example, a programmable shader unit that is configured to execute one or more shader programs that are downloaded onto GPU 10 by CPU 6. A shader program, in some examples, may be a compiled version of a program written in a high-level shading language, such as, e.g., an OpenGL Shading Language (GLSL), a High Level Shading Language (HLSL), a C for Graphics (Cg) shading language, etc. In some examples, a programmable shader unit may include a plurality of processing units that are configured to operate in parallel, e.g., an SIMD pipeline. A programmable shader unit may have a program memory that stores shader program instructions and an execution state register, e.g., a program counter register that indicates the current instruction in the program memory being executed or the next instruction to be fetched. The programmable shader units may include, for example, vertex shader units, pixel shader units, geometry shader units, hull shader units, domain shader units, compute shader units, etc.

A fixed-function processing unit may include hardware that is hard-wired to perform certain functions. Although the fixed function hardware may be configurable, via one or more control signals for example, to perform different functions, the fixed function hardware typically does not include a program memory that is capable of receiving user-compiled programs. The fixed function processing units included in GPU 10 may include, for example, processing units that perform, e.g., raster operations, depth testing, scissors testing, alpha blending, etc. In examples where raster operations unit 34 is included in a 3D rendering pipeline, raster operations unit 34 may be, in some examples, a configurable, fixed-function processing unit. In some examples, raster operations unit 34 may be implemented as an output merger processing unit of a 3D rendering pipeline.

Command engine 32 is configured to receive commands from CPU 6 and to cause GPU 10 to execute the commands. In some examples, CPU 6 may place the commands in memory 22, and command engine 32 may retrieve the commands from memory 22. The commands may include, for example, state commands that change the state (e.g., rendering state) of GPU 10, shader program binding commands that instruct GPU 10 to load particular shader programs into one or more of the programmable processing units in a 3D rendering pipeline, drawing commands that instruct GPU 10 to render particular data stored in memory 22, general-purpose computing commands that instruct GPU 10 to execute one or more general-purpose computing kernels with respect to particular data stored in memory 22, and memory transfer commands that instruct GPU 10 to perform one or more memory transfer operations.

In response to receiving a state command, command engine 32 may be configured to set one or more state registers in GPU 10 to particular values based on the state command, and/or to configure one or more of the fixed-function processing units in a 3D rendering pipeline (not shown) for GPU 10 based on the state command. In response to receiving a draw call command, command engine 32 may be configured to cause the 3D rendering pipeline (not shown) in GPU 10 to retrieve 3D geometry from memory 22, and render the 3D geometry data into a 2D graphics image. In response to receiving a shader program binding command, command engine 32 may load one or more particular shader programs into one or more of the programmable processing units in the 3D rendering pipeline.

In some examples, in response to receiving a memory transfer command that instructions GPU 10 to perform a memory transfer operation, command engine 32 may select a memory transfer mode to be used for performing all or part of the memory transfer operation, and cause GPU 10 to perform the memory transfer operation based on the selected memory transfer mode. In some examples, the memory transfer mode may be selected from a set of at least two memory transfer modes that includes an interleave memory transfer mode and a sequential memory transfer mode.

In additional examples, command engine 32 may be configured to select the memory transfer mode to be used for all or part of a memory transfer operation according to any of the techniques described in this disclosure. For example, command engine 32 may select the memory transfer mode based on the size of the memory transfer operation (e.g., an amount of data to be transferred by the memory transfer operation).

As another example, command engine 32 may select the memory transfer mode based on an amount of overlap a destination region defined for the memory transfer operation has with a fixed, screen-aligned buffer region. As a further example, command engine 32 may select the memory transfer mode based on a determination of whether execution of the shader program is likely to be a performance bottleneck for the memory transfer operation. In an additional example, GPU 10 may use one or more shader programs to perform the memory transfer operation, and command engine 32 may select the memory transfer mode based on a size of the shader program that is used for performing the memory transfer operation and/or a complexity of the shader program that is used for performing the memory transfer operation.

In further examples, command engine 32 may select the memory transfer mode based on one or more commands received from CPU 6 that instruct command engine 32 to use a particular memory transfer mode. In some cases, the one or more commands may include state commands that instruct GPU 10 to set the state of a memory transfer mode state variable in GPU 10. In such cases, command engine 32 may select the memory transfer mode based on a current state of the memory transfer mode state variable. The memory transfer mode state variable may be stored, for example, in a register in GPU 10. In additional cases, the one or more commands may be commands that instruct GPU 10 to perform a memory transfer operation or some other operation, and the command may include a flag or other information indicative of a memory transfer operation to use when performing the memory transfer operation or other operation.

In order to perform a memory transfer operation based on a selected memory transfer operation mode, command engine 32 may configure one or more components in GPU 10 that are used for performing the memory transfer operation based on the selected memory transfer mode. For example, command engine 32 may configure one or more of buffer 36, read engine 38 and write engine 40 based on the selected memory transfer mode as described in further detail below.

Raster operations unit 34 is configured to perform one or more raster operations based on source data to generate destination data. The source data may correspond to one or more source regions of a memory transfer operation. In some examples, raster operations unit 34 may receive the source data from buffer 36 and/or from write engine 40. The destination data may be written to a destination region of a memory transfer operation.

The type of raster operation performed by raster operations unit 34 may be configurable, e.g. by command engine 32. The raster operation types may specify how the destination data is to be generated based on the source data for a particular memory transfer operation. In cases where raster operations unit 34 combines two different source regions to generate destination data (e.g., a compositing operation), the rasterization operation type may specify how the two different source regions are to be combined to generate the destination data. In some examples, the raster operation types may be bitwise operations that specify how destination data for a particular pixel location in a destination region is to be generated based on corresponding pixel locations in the source regions. The corresponding pixel locations in the source regions may be pixel locations that are in the same relative location of their respective source regions as the pixel location is in the destination region. The bitwise operations may include, for example, Boolean operations, such as bitwise AND, OR, NOT and/or XOR operations. The bitwise operations may also include bit copy operations, bit inverting operations, solid fill operations, etc. The raster operation may be an operation that specifies how the bits are to be combined for a particular compositing operation. In some examples, the raster operations may include bitwise operations, such as, e.g., Boolean logic operations. The Boolean logic operations may include, e.g., bitwise AND, OR, NOT and/or XOR operations.

In additional examples, the raster operation types may include blending operations (e.g., alpha blending operations). In some examples, a blending operation may specify a source pixel multiplier and a destination pixel multiplier to be used during execution of the blending operation. In such examples, during execution of the blending operation, a source pixel value (e.g., a source pixel color and/or a source alpha value) may be multiplied by the source pixel multiplier to produce a first product, a corresponding destination pixel value (e.g., a destination pixel color and/or a destination alpha value) may be multiplied by the destination pixel multiplier to produce a second product, and the sum of the two products may be added together to produce a destination value for the pixel location. Other types of blending operations are also possible.

In some examples, command engine 32 may configure raster operations unit 34 based on data included in a memory transfer operation command received by GPU 10 from CPU 6. For example, command engine 32 may select a type of raster operation to be performed by raster operations unit 34 based on a type of raster operation that is specified in the memory transfer operation command, and configure raster operations unit 34 to perform the memory transfer operation using the selected type of rasterization operation.

Although raster operations unit 34 has been described herein as combining different source regions to produce destination data for a memory transfer operation, in other examples, one or more other components in GPU 10 may be used in addition to or lieu of raster operations unit 34 to perform the memory transfer operation. For example, a shader program executing on a shader unit (not shown) of GPU 10 may combine the different source regions according to a combination technique that is specified in the shader program to generate destination data for a memory transfer operation.

Buffer 36 is configured to store source data that is retrieved from memory 22 during the execution of a memory transfer operation. In some examples, buffer 36 may be implemented as a plurality of registers within GPU 10. Buffer 36 may utilize any of a variety of buffering schemes including, for example, a first-in-first-out (FIFO) buffering scheme. According to the FIFO buffering scheme, source data that is stored in buffer 36 is consumed by a consumer (e.g., write engine 40) in the order in which the source data was placed into buffer 36.

In some examples, buffer 36 may generate a signal indicative of whether buffer 36 is full and a signal indicative of whether buffer 36 is empty. In such examples, these signals may be used to synchronize read engine 38 and/or write engine 40 during the performance of a memory transfer operation. In additional examples, buffer 36 may generate signals indicative of whether the source data currently stored in buffer 36 is greater than or equal to one or more thresholds or less than or equal to one or more thresholds, and these signals may be used in addition to or in lieu of full and empty signals to synchronize read engine 38 and/or write engine 40 during the performance of a memory transfer operation.

In some examples, buffer 36 may be a cache that operates according to a hit/miss caching paradigm with respect to underlying memory 22. In such examples, buffer 36 may be, in some examples, a configurable cache in the sense that the cache line size may be configurable. A cache line may refer to the data unit that is transferred between the underlying memory (e.g., memory 22) and the cache (e.g., buffer 36) in response to a cache miss and/or in response to a cache writeback. The size of the cache line may refer to the size of the data unit that is transferred between the underlying memory and the cache. When a cache line is transferred from the underlying memory into the cache, the cache line may be placed into and correspond to a cache entry. Therefore, the size of the cache line may also refer to the size of a single cache entry in the cache.

In examples where buffer 36 is a configurable cache, command engine 32 may select and configure the cache line size of buffer 36 based on a selected memory transfer mode. For example, command engine 32 may select a cache line size for buffer 36 based on a selected memory transfer mode, and configure buffer 36 to operate according to the selected cache line size.

In some examples, command engine 32 may select a cache line size for buffer 36 that is equal to an entire capacity of buffer 36 in response to the sequential memory transfer mode being selected as the memory transfer mode for performing the memory transfer operation. This may, in some cases, allow groupings of consecutive read operations and groupings of consecutive write operations to be as large as possible during the sequential memory transfer mode. In such examples, buffer 36 may select a cache line size for buffer 36 that is less than the entire capacity of the cache in response to the interleave memory transfer mode being selected as the memory transfer mode for performing the memory transfer operation. This may allow multiple regions of data in the underlying memory to be simultaneously cached when servicing the interleaved requests, which may, in some cases, reduce the cache-miss rate and improve efficiency for the interleave mode.

Read engine 38 is configured to issue read requests to memory subsystem 8 and to place source data received in response to the read requests into buffer 36. Read engine 38 may be configured to operate in accordance with one of a plurality of synchronization modes. The synchronization modes used to control the operation of read engine 38 may define the manner in which the issuance of read requests are synchronized with the issuance of write requests by write engine 40 and/or the manner in which the issuance of read requests are synchronized with the status of buffer 36. The synchronization modes used by read engine 38 may include an interleave synchronization mode that corresponds to the interleave memory transfer operation and a sequential synchronization mode that corresponds to the sequential memory transfer operation.

In some examples, command engine 32 may configure the synchronization mode to be used by read engine 38 for the performance of all or part of a memory transfer operation based on a selected memory transfer mode. For example, command engine 32 may select a synchronization mode based on a selected memory transfer mode, and configure read engine 38 to operate in accordance with the selected synchronization mode. As another example, command engine 32 may select the interleave synchronization mode to be used by read engine 38 in response to the interleave memory transfer mode being selected as the memory transfer mode for performing a memory transfer operation, and select the sequential synchronization mode to be used by read engine 38 in response to the sequential memory transfer mode being selected as the memory transfer mode for performing a memory transfer operation.

When operating according to the interleave synchronization mode, read engine 38 may issue an initial number of read requests in response to the initiation of a memory transfer operation. After the initial number of read requests have been issued, read engine 38 may issue an additional read request in response to source data being consumed by buffer 36 that is sufficient to issue a write request for the memory transfer operation. Read engine 38 may continue to issue read requests in this manner until all read requests have been issued for the memory transfer operation. In response to receiving a source data unit in response to a particular read request, read engine 38 may place the source data unit into buffer 36 and/or pass the source data unit directly write engine 40 and/or raster operations unit 34 for further processing.

Data that is sufficient to issue a write request for the memory transfer operation may refer to data that corresponds to all of the source operands that are required to calculate the destination data for a single location in destination region. For example, for a memory copy operation, data that is sufficient to issue a write request for the memory transfer operation may refer to data that corresponds to a single location in the source region of the memory copy operation. As another example, for a compositing operation, data that is sufficient to issue a write request for the memory transfer operation may refer to data that corresponds to a single location in a first source region for the memory copy operation and data that corresponds to a single corresponding location in a second source region for the memory copy operation. Corresponding locations may refer to locations that have the same relative position in different regions. For example, the third column of the second row in two different regions have the same relative location even if the regions are located in different portions of their respective surfaces.

When operating according to the sequential synchronization mode, read engine 38 may commence the issuance of read requests in response to the initiation of a memory transfer operation. Read engine 38 may continue issuing read requests until the number of issued read requests is greater than or equal to a first threshold. Once the number of issued read requests is greater than or equal to the first threshold, read engine 38 may cease issuing read requests until an amount of unconsumed source data stored in buffer 36 (e.g., data that has not been consumed by write engine 40) is less than or equal to a second threshold. Once an amount of unconsumed source data stored in buffer 36 is less than or equal to the second threshold, read engine 38 may resume the issuance of read requests. Read engine 38 may continue to cease and resume issuing read requests in this manner until all read requests have been issued for the memory transfer operation. The first threshold may be greater than the second threshold.

In some examples, the first threshold may be based on the size of buffer 36. For example, the first threshold may, in some examples, be equal to the maximum number of read data units that buffer 36 is capable of storing at one time where a read data unit corresponds to the source data returned in response to a single read request. In such examples, read engine 38 may issue "just enough" read requests to fill up buffer 36 with source data that is returned in response to the requests. In some examples, read engine 38 may keep track of how many read requests have been issued for a given burst of read requests to determine whether a threshold number of read requests have been issued. In additional examples, read engine 38 may monitor the amount of source data currently stored in buffer 36 to determine whether a threshold number of read requests have been issued. For example, read engine 38 may utilize a signal generated by buffer 36 that is indicative of whether buffer 36 is full or a signal generated by buffer 36 that is indicative of whether the amount of data stored in buffer 36 is greater than or equal to a threshold to determine whether a threshold number of read requests have been issued.

In further examples, the second threshold may be equal to zero. That is, read engine 38 may cease issuing read requests until there is no more unconsumed data in buffer 36. In other words, read engine 38 may cease issuing read requests until buffer 36 is empty. Once buffer 36 is empty, then read engine 38 may resume issuing read requests to fill up the buffer. In some examples, read engine 38 may utilize a signal generated by buffer 36 that is indicative of whether buffer 36 is empty or a signal generated by buffer 36 that is indicative of whether the amount of unconsumed source data in buffer 36 is less than or equal to a threshold to determine whether the unconsumed data is less than or equal to the second threshold.

The read requests issued by buffer 36 may specify a memory address or a range of memory addresses within memory 22 from which data should be returned to GPU 10. The data returned by memory subsystem 8 in response to a single read request may be referred to as a source data unit. In some examples, each read request issued by read engine 38 may correspond to a respective one of a plurality of locations in a source region for the memory transfer operation, and the source data unit returned in response to the read request may correspond to the data that is associated with the respective one of the plurality of locations in the source region. In such examples, for a memory copy operation with a single source surface, read engine 38 may issue a single read request for each location in the destination surface. For a compositing operation with multiple source surfaces, read engine 38 may issue multiple read requests for each of the locations in the destination surface, e.g., one read request for the corresponding location in each source surface.

Write engine 40 is configured to consume source data from buffer 36, generate destination data based on the consumed source data, and issue write requests to memory subsystem 8 in order to write destination data to a destination region in memory 22. In some examples, write engine 40 may generate the destination data such that the destination data is identical to the source data. Such examples may be used to perform, for example, memory copy operations. In further examples, write engine 40 may combine source data from at least two different source regions to generate the destination data. Such examples may be used to perform, for example, compositing operations. In such examples, write engine 40 may, in some examples, use raster operations unit 34 to perform a raster operation in order to combine the source data and generate the destination data.

Write engine 40 may be configured to operate in accordance with one of a plurality of synchronization modes. The synchronization modes used to control the operation of write engine 40 may define the manner in which the issuance of write requests are synchronized with the issuance of read requests by read engine 38 and/or the manner in which the issuance of write requests are synchronized with the status of buffer 36. The synchronization modes used by write engine 40 may include an interleave synchronization mode that corresponds to the interleave memory transfer operation and a sequential synchronization mode that corresponds to the sequential memory transfer operation.

In some examples, command engine 32 may configure the synchronization mode to be used by write engine 40 for the performance of all or part of a memory transfer operation based on a selected memory transfer mode. For example, command engine 32 may select a synchronization mode based on a selected memory transfer mode, and configure write engine 40 to operate in accordance with the selected synchronization mode. As another example, command engine 32 may select the interleave synchronization mode to be used by write engine 40 in response to the interleave memory transfer mode being selected as the memory transfer mode for performing a memory transfer operation, and select the sequential synchronization mode to be used by write engine 40 in response to the sequential memory transfer mode being selected as the memory transfer mode for performing a memory transfer operation.

When operating according to the interleave synchronization mode, in response to the initiation of a memory transfer operation, write engine 40 may initially wait until source data that is sufficient to issue a write request for a memory transfer operation has been received by GPU 10 and/or placed into buffer 36. Once source data has been received by GPU 10 and/or placed into buffer 36, write engine 40 may consume the source data, generate destination data based on the source data, and issue a write request to memory subsystem 8 to write the destination data to memory 22. After the write request has been issued, write engine 40 may determine if any additional source data has been received by GPU 10 and/or placed into buffer 36. If so, write engine 40 may consume the source data and issue another write request for the additional source data. Otherwise, write engine 40 may wait for additional data to be received by GPU 10 and/or to be placed into buffer 36. Write engine 40 may continue to consume source data in this manner until the memory transfer operation is complete.

In some examples, consuming the source data may refer to write engine 40 receiving the source data directly from read engine 38 and processing the source data. In further examples, consuming the source data may refer to write engine 40 retrieving the source data from buffer 36 and processing the source data. Processing the source data may include generating destination data based on the source data. After the data has been processed, write engine 40 may issue a write request to write the destination data. Unconsumed source data may refer to source data that has been placed into buffer 36, but has not yet been consumed by write engine 40. The amount of unconsumed source data may refer to the number of unconsumed source data units that are currently stored in buffer 36 where each source data unit corresponds to source data that is returned in response to a single read request. A source data unit may be alternatively referred to as a read data word.

When operating according to the sequential synchronization mode, in response to the initiation of a memory transfer operation, write engine 40 may initially wait until the amount of unconsumed data in buffer 36 is greater than or equal to a first threshold. During the waiting period, write engine 40 may not consume any source data or issue any write requests for the memory transfer operation. Once the amount of unconsumed data in buffer 36 is greater than or equal to the first threshold, write engine 40 may commence the consumption of source data and the issuance of write requests for the consumed source data. Write engine 40 may continue issuing write requests until the amount of unconsumed data in buffer 36 is less than or equal to a second threshold. Once the amount of unconsumed data in buffer 36 is less than or equal to the second threshold, write engine 40 may cease consuming source data and issuing write requests for the consumed source data until the amount of unconsumed data in buffer 36 is greater than or equal to the first threshold. After the amount of unconsumed data in buffer 36 is greater than or equal to the first threshold, write engine 40 may again commence the consumption of source data and the issuance of write requests. Write engine 40 may continue to cease and resume the consumption of source data and the issuance of write requests in this manner until all write requests have been issued for the memory transfer operation. The first threshold may be greater than the second threshold.

In some examples, the first threshold may be based on the size of buffer 36. For example, the first threshold may, in some examples, be equal to the maximum number of read data units or that buffer 36 is capable of storing at one time where a read data unit corresponds to the source data returned in response to a single read request. In some examples, write engine 40 may monitor the amount of unconsumed source data currently stored in buffer 36 to determine whether the amount of consumed data stored in buffer 36 is greater than or equal to the first threshold. For example, write engine 40 may utilize a signal generated by buffer 36 that is indicative of whether buffer 36 is full or a signal generated by buffer 36 that is indicative of whether the amount of data stored in buffer 36 is greater than or equal to a threshold to determine whether the amount of consumed data stored in buffer 36 is greater than or equal to the first threshold.

In further examples, the second threshold may be equal to zero. That is, write engine 40 may cease consuming source data and issuing write requests when there is no more unconsumed data in buffer 36. In other words, write engine 40 may cease consume source data and issuing write requests once buffer 36 is empty. In some examples, write engine 40 may utilize a signal generated by buffer 36 that is indicative of whether buffer 36 is empty or a signal generated by buffer 36 that is indicative of whether the amount of unconsumed source data in buffer 36 is less than or equal to a threshold to determine whether the unconsumed data is less than or equal to the second threshold.

The write requests issued by write engine 40 may specify a memory address or a range of memory addresses within memory 22 to which specified data is to be written. The data to be written may be supplied to memory controller 20 by write engine 40 via one or more data busses in conjunction with the write request. In some examples, the data to be written may form a part of the write request. The memory address or memory address range of the write request may correspond to a relative location in a destination region that is the same as the relative location(s) in one or more source regions from which source data that was used to generate the destination data was obtained.

Memory subsystem 8 includes memory 22. Memory 22 may store one or more source surfaces 42 and a destination surface 44. Each of source surfaces 42 and destination surface 44 correspond to a two-dimensional array of pixel data. The pixel data may include red, green, blue (RGB) color values and, in some cases, an alpha value (A) for each pixel location in the surface. Because source surfaces 42 and destination surface 44 correspond to a two-dimensional array of pixel data, the pixel data for an individual pixel location in the surface may be addressed by row and column coordinates. Each of the source regions used in a memory transfer operation may correspond to all or a subset of a respective source surface, and the destination region may correspond to all or a subset of the destination surface. The source and destination regions may be the same size and shape, and are typically, but not necessarily, rectangular-shaped regions. Although FIG. 2 depicts separate source surfaces 42 and a destination surface 44. In some examples, destination surface 44 may be used as a source surface for a memory transfer operation and/or one or more of source surfaces 42 may serve as a destination surface for a memory transfer operation. Memory subsystem

8 is communicatively coupled to CPU 6, GPU 10, read engine 38 and write engine 40 via bus 18.

In response to receiving memory access requests, memory subsystem 8 may cause the requested memory operation to be performed with respect to memory 22. For example, in response to receiving a read request, memory subsystem 8 may obtain (i.e. read) data stored in memory 22 from one or more memory locations in memory 22 that correspond to the one or more memory addresses specified in the read request, and provide the obtained data to GPU 10 (e.g., read engine 38). As another example, in response to receiving a write request and write data that corresponds to the write request, memory subsystem 8 may cause the write data to be stored in memory 22 at one or more locations that correspond to the one or more memory addresses specified in the write request. In some examples, memory subsystem 8 may provide confirmation to write engine 40 that the write request was successfully completed.

In some examples, the read and write requests issued by GPU 10 and received by memory subsystem 8 may be in a format that is consumable by memory 22. In such examples, memory subsystem 8 may pass the received requests from GPU 10 directly to memory 22 in order to read data from and/or write data to memory 22. In further examples, the read and write requests issued by GPU 10 and received by memory subsystem 8 may not be in a format that is consumable by memory 22. In such examples, memory subsystem 8 may generate one or more memory commands that are consumable by memory 22 based on the read and write requests, and issue such commands to memory 22 in order to read data from and/or write data to memory 22. In some examples, the one or more commands may take the form a read sequence of commands for a read operation and a write sequence of commands for a write operation.

Bus 18 may be implemented using any combination of bus structures and bus protocols including shared bus structures and protocols, point-to-point bus structures and protocols, unidirectional bus structures and protocols, and bidirectional bus structures and protocols. In some examples, bus 18 may be configured to include a bidirectional data bus between GPU 10 and memory subsystem 8, and a unidirectional command and address bus from GPU 10 to memory subsystem 8. In further examples, bus 18 may be configured to include a unidirectional read bus from memory subsystem 8 to GPU 10, a unidirectional write bus from GPU 10 to memory subsystem 8, and a unidirectional command and address bus from GPU 10 to memory subsystem 8. These bus configurations are merely examples, and other configurations of bus structures with more or less types of busses and in the same or a different configuration may also be used.

As discussed above, in order to perform a memory transfer operation based on a selected memory transfer mode, command engine 32 may configure one or more of buffer 36, read engine 38 and write engine 40 based on the selected memory transfer mode. In some examples, if the selected memory transfer mode is the interleave memory transfer mode, then command engine 32 may configure read engine 38 and write engine 40 to operate in accordance with an interleave synchronization mode. In such examples, if the selected memory transfer mode is the sequential memory transfer mode, then command engine 32 may configure read engine 38 and write engine 40 to operate in accordance with an sequential synchronization mode.

In additional examples where buffer 36 is a cache with a configurable cache size, if the selected memory transfer mode is the interleave memory transfer mode, then command engine 32 may configure read engine 38 and write engine 40 to operate in accordance with an interleave synchronization mode and configure buffer 36 such that the cache line size of buffer 36 is less than the maximum cache line size of buffer 36. In such examples, if the selected memory transfer mode is the sequential memory transfer mode, then command engine 32 may configure read engine 38 and write engine 40 to operate in accordance with an sequential synchronization mode and configure buffer 36 such that the cache line size of buffer 36 is equal to the maximum cache line size of buffer 36.

In some examples, when the interleave memory transfer mode is selected as the memory transfer mode for performing all or part of a memory transfer operation, command engine 32 may configure read engine 38 and write engine 40 to operate in the interleave synchronization mode in order to cause read engine 38 to issue read requests and write engine 40 to issue write requests based on a producer-consumer paradigm. Causing read engine 38 to issue read requests and write engine 40 to issue write requests based on a producer-consumer paradigm may include causing write engine 40 to issue a write request in response to GPU 10 receiving source data from memory subsystem 8 and/or memory 22 that is sufficient for issuing the write request and causing read engine 38 to issue a read request in response to write engine 40 consuming data from buffer 36 that is sufficient for issuing a write request.

In further examples, when the sequential memory transfer mode is selected as the memory transfer mode for performing all or part of a memory transfer operation, command engine 32 may configure read engine 38 and write engine 40 to operate in the sequential synchronization mode in order to cause read engine 38 to issue read requests and write engine 40 to issue write requests based on a mutual exclusion paradigm. Causing read engine 38 to issue read requests and write engine 40 to issue write requests based on a mutual exclusion paradigm may include causing read engine 38 and write engine 40 to alternate issuing groups of multiple, consecutive read requests and groups of multiple, consecutive write requests to memory subsystem 8 and/or memory 22 during separate time intervals.

In additional examples, when command engine 32 configures read engine 38 and write engine 40 to operate in the interleave synchronization mode, each time data that is sufficient to issue a write request for a memory transfer operation is received by GPU 10 (e.g., read engine 38) from memory subsystem 8 (e.g., memory 22), write engine 40 may consume the respective data without waiting for additional data to be subsequently received for at least one other write request. On the other hand, when command engine 32 configures read engine 38 and write engine 40 to operate in the sequential synchronization mode, for at least part of the memory transfer operation, in response to GPU 10 (e.g., read engine 38) receiving, from memory subsystem 8 (e.g., memory 22), source data that is sufficient to issue a write request for the memory transfer operation, write engine 40 may defer consumption of the source data until additional data is subsequently received that is sufficient to issue at least one other write request. For example, write engine 40 may defer the consumption of the source data until the amount of unconsumed data is greater than a first threshold.

In further examples, when command engine 32 configures read engine 38 and write engine 40 to operate in the interleave synchronization mode, each time write engine 40 consumes data that is sufficient to issue a write request for the memory transfer operation, read engine 38 may issue a read request without waiting for additional data to be subsequently consumed by write engine 40 for at least one other write request. On the other hand, when command engine 32 configures read engine 38 and write engine 40 to operate in the sequential synchronization mode, for at least part of the memory transfer operation, in response to write engine 40 consuming data that is sufficient to issue a write request for the memory transfer operation, read engine 38 may defer issuance of a subsequent read request until data is subsequently consumed by write engine 40 that is sufficient to issue at least one other write request. For example, read engine 38 may defer the issuance of a subsequent read request until the amount of unconsumed data is less than or equal to a second threshold.

In more examples, when the interleave memory transfer mode is selected as the memory transfer mode for performing all or part of a memory transfer operation, command engine 32 may configure read engine 38 and write engine 40 to operate in the interleave synchronization mode, and issue a command to read engine 38 and/or write engine 40 to initiate performance of the memory transfer operation. In response to receiving the command to initiate performance of the memory transfer operation, read engine 38 may issue one or more read requests. Read engine 38 may place source data received from memory subsystem 8 (e.g., memory 22) in response to the plurality of read requests into buffer 36. For each of the plurality of read requests, in response to the source data being placed in buffer 36 for a respective one of the plurality of read requests, write engine 40 may consume the source data placed in buffer 36 and issue a write request based on the consumed source data. For example, write engine 40 may generate destination data based on the consumed source data and issue a write request to write the destination data to a corresponding location in a destination region for the memory transfer operation. For each of a plurality of write requests, in response to source data being consumed from buffer 36 for a respective one of the write requests, read engine 38 may issue a subsequent read request.

In some cases, read engine 38 may monitor buffer 36 to determine when data has been consumed from buffer 36 by write engine 40. In additional cases, read engine 38 may receive a notification from buffer 36 and/or from write engine 40 to determine when data has been consumed from buffer 36 by write engine 40. In some cases, write engine 40 may monitor buffer 36 to determine when data has been placed into buffer 36 by read engine 38. In additional cases, write engine 40 may receive a notification from buffer 36 and/or from read engine 38 to determine when data has been placed into buffer 36 by read engine 38.

In additional examples, when the sequential memory transfer mode is selected as the memory transfer mode for performing all or part of a memory transfer operation, command engine 32 may configure read engine 38 and write engine 40 to operate in the sequential synchronization mode, and issue a command to read engine 38 and/or write engine 40 to initiate performance of the memory transfer operation. In response to receiving the command to initiate performance of the memory transfer operation, read engine 38 may issue a plurality of read requests. Read engine 38 may place source data received from memory subsystem 8 (e.g., memory 22) in response to the plurality of read requests into buffer 36. Read engine 38 may cease to issue read requests in response to detecting that buffer 36 is full. Write engine 40 may consume source data in the buffer and issue a plurality of write requests based on the consumed data in response to detecting that buffer 36 is full. Write engine 40 may cease to consume source data in buffer 36 and to issue write requests in response detecting that buffer 36 is empty. Read engine 38 may resume issuance of read requests in response to detecting that buffer 36 is empty.

In some cases, read engine 38 and/or write engine 40 may monitor buffer 36 to determine when buffer 36 is full or empty. In additional cases, read engine 38 and/or write engine 40 may receive notifications from buffer 36 and/or write engine 40 to determine when buffer 36 is full or empty.

Although command engine 32 is described herein as performing a memory transfer mode selection and/or as configuring the other processing components in GPU 10 based on the memory transfer mode selection, in other examples, one or more other components in GPU 10 may perform these functions in addition to or in lieu of command engine 32. For example, a dedicated memory transfer mode selection and configuration unit may be used to perform the above-mentioned functionality or read engine 38 and write engine 40 may be configured to perform such functionality.

In some examples, GPU driver 28 executing on CPU 6 (or other programs executing on CPU 6) may perform any of the memory transfer mode selection techniques of this disclosure and provide the selected memory transfer mode to GPU 10. GPU 10 may then select the memory transfer mode for performing the memory transfer based on the selected memory transfer mode provided to GPU 10 by CPU 6.

In additional examples, GPU driver 28 may receive a memory transfer mode command from a software application 24 (e.g., a graphics application) that specifies a memory transfer mode to be used for performing the memory transfer operation. In response to receiving the memory transfer mode command, GPU driver 28 may cause GPU 10 to perform a memory transfer operation based on the memory transfer mode command. For example, GPU driver 28 may issue one or more commands to GPU 10 that specify a memory transfer mode to use when performing a memory transfer operation.

Figure 3:
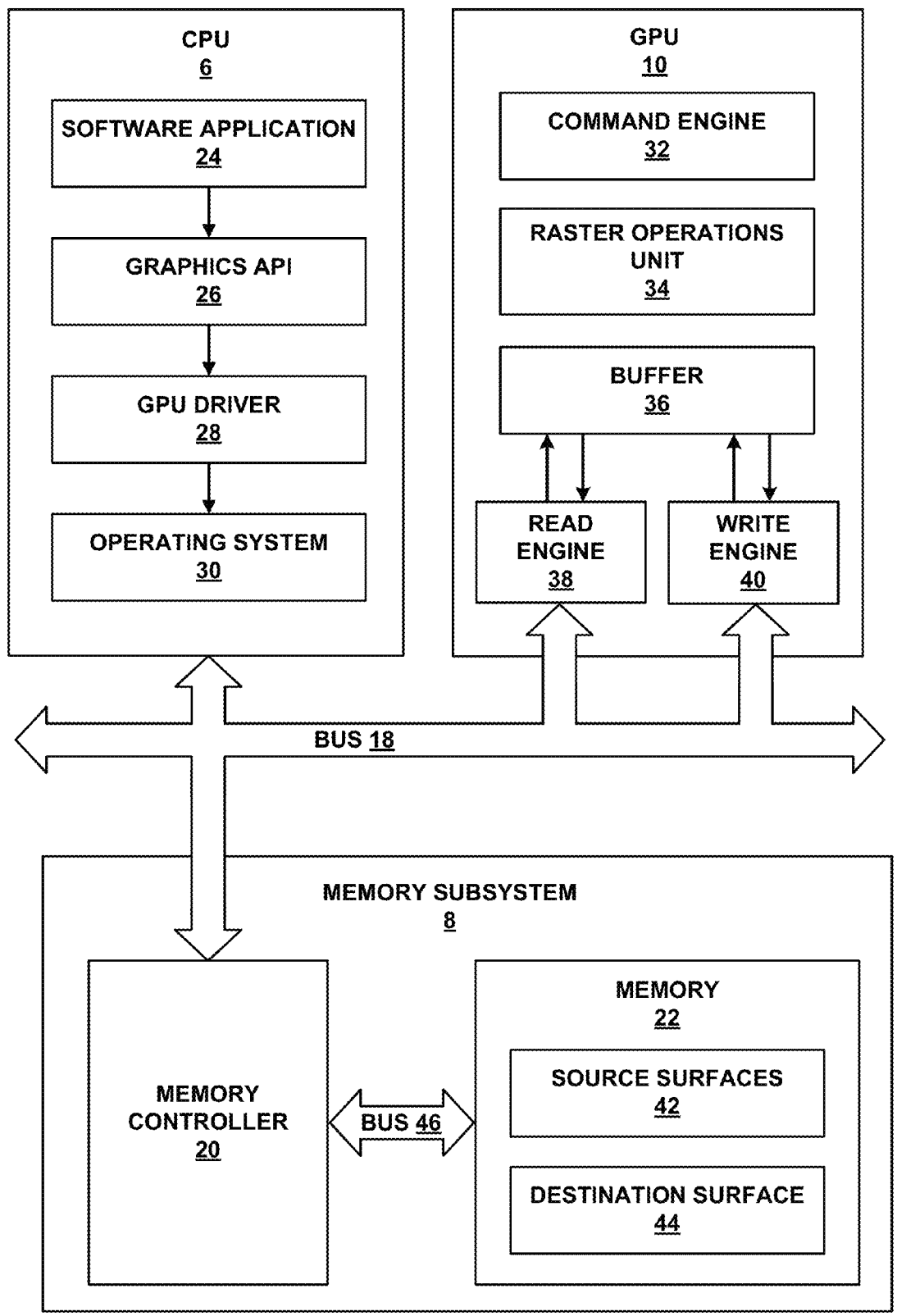
FIG. 3 is a block diagram illustrating an example memory subsystem that may be used in the example configuration shown in FIG. 2.

FIG. 3 is a block diagram illustrating an example memory subsystem 8 that may be used in the example configuration shown in FIG. 2. As illustrated in FIG. 3, memory subsystem 8 includes a memory controller 20, a memory 22, and a bus 46. Memory controller 20 may be configured to receive memory access requests from GPU 10, and to service the received memory access requests with respect to memory 22. The memory access requests may include read requests and/or write requests. The memory access requests issued by GPU 10 and received by memory controller 20 may be in a format that is consumable by memory controller 20. For example, the memory access requests may conform to an AMBA AXI specification, an AMBA AHB specification, or any other memory controller interface.

In some examples, the memory access requests received by memory controller 20 may not be in a format that is consumable by memory 22. In such examples, memory controller 20 may generate one or more memory commands that are consumable by memory 22 and issue such commands to memory 22 in order to read data from and/or write data to memory 22. In some examples, if memory 22 is a DDR SDRAM, then the one or more memory commands that are consumable by memory 22 may be commands that are compatible with a DDR SDRAM interface.

In some examples, the one or more commands generated by memory controller 20 may take the form a read sequence of commands for a read operation and a write sequence of commands for a write operation. For example, if memory 22 is a DDR SDRAM, the one or more memory commands generated by memory controller 20 may take the form of read sequences of commands and/or write sequences of commands that conform to the DDR SDRAM interface. The read and write sequences of commands may take the form of the assertion of one or more control signals that conform to an DDR SDRAM interface. For example, in response to receiving a memory access request, memory controller 20 may generate signals to activate a particular row and bank of memory 22, if not already activated, that correspond to the address specified in the memory access request. Memory controller 20 may also generate a signal to select a particular column in the activated row and bank that corresponds to the address specified in the memory access request. Memory controller 20 may also generate a signal to indicate to memory 22 whether data should be read from or written to memory 22. If the memory access request is a write request, then memory controller 20 may supply write data to memory 22 via a bi-directional data bus within bus 46. If the memory access request is a read request, then memory controller 20 may receive data from memory 22 via the bi-directional data bus within bus 46 and provide the read data to CPU 14 via bus 18.

Memory 22 is configured to receive read commands and write commands, and service the commands with respect to data storage space contained within memory 22. In response to receiving a read command, memory 22 may obtain data from the data storage space contained within memory 22 at a location specified by an address included in the read command, and provide the obtained data to memory controller 20 via a bi-directional bus within bus 46. In response to receiving a write command, memory 22 may store data received from memory controller 20 via the bi-directional bus within bus 46 into data storage space contained within memory 22 at a location specified by an address included in the write command.

Source surfaces 42 and destination surface 44 may be substantially similar to the corresponding components shown in FIG. 2. Accordingly, in the interest of brevity and to avoid redundancy, these components will not be described in further detail.

Bus 46 may be implemented as any type of bus structure and operate according to any type of bus protocol. In some examples, bus 46 may include bit lines that correspond to the control signals that are used to control memory 22. For example, if memory 22 is a DDR SDRAM, bus 46 may include one or more of a clock signal, a chip select signal, a bank select signal, a row address strobe, a column address strobe, a write enable signal, a bi-directional data bus, etc.

As discussed above, bus 46 may include a bi-directional data bus. In other words, the same bit lines in bus 46 may transfer read data from memory 22 to memory controller 20 when executing a read request and may transfer write data from memory controller 20 to memory 22 when executing a write request. Each time memory controller 20 changes from issuing read requests to issuing write requests or from issuing write requests to issuing read requests, idle time may be needed to allow the bi-directional data bus in bus 46 to settle before changing direction. This settling time may be referred to as read-write turnaround time.

The sequential memory transfer mode described in this disclosure may be used to reduce the number of read-to-write transitions that take place when performing a memory transfer operation, thereby reducing the overall delay that occurs during the memory transfer operation due to read-write turnaround time. Although the sequential memory transfer mode may reduce the delay that occurs during the memory transfer operation due to read-write turnaround time, for certain types of memory transfer operations, the sequential memory transfer mode may not necessarily be more efficient than the interleave memory transfer mode. For example, if a relatively large, fixed amount of data is always retrieved for a read operation during the sequential memory transfer mode, then for small memory transfer operations, the sequential mode may require the fetching of extraneous data, which may overshadow the benefits achieved by reducing read-write turnaround.

Due to these and other considerations, one type of memory transfer mode may not universally be the most efficient memory transfer mode for performing memory transfer operations. Accordingly, the techniques of this disclosure may be used to select appropriate memory transfer modes that are better suited for particular types of memory transfer operations, thereby improving the performance of a GPU that may perform varying types and sizes of memory transfer operations.

Figure 4:
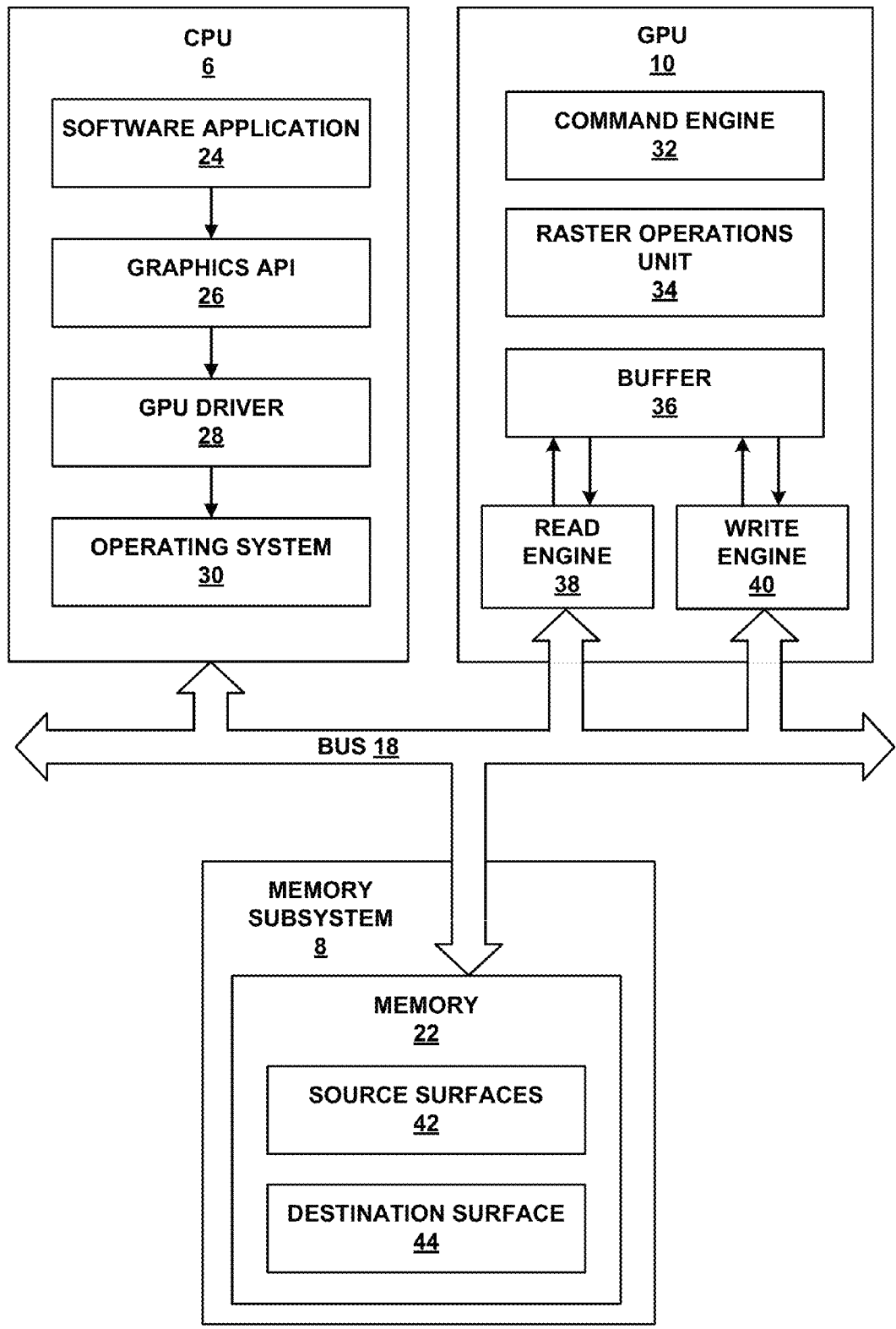
FIG. 4 is a block diagram illustrating another example memory subsystem that may be used in the example configuration shown in FIG. 2.

FIG. 4 is a block diagram illustrating another example memory subsystem 8 that may be used in the example configuration shown in FIG. 2. As illustrated in FIG. 4, memory subsystem 8 includes a memory 22 that is directly coupled to bus 18 without an intervening memory controller. In this example, memory 22 may be configured to receive memory access requests from GPU 10, and to service the received memory access requests with respect to data storage space contained within memory 22. The memory access requests may include read requests and/or write requests.

In some examples, memory 22 may include a built-in memory controller functionality. In such examples, the memory access requests issued by GPU 10 and received by memory 22 may be in a format that is consumable by a memory controller. For example, the memory access requests may conform to an AMBA AXI specification, an AMBA AHB specification, or any other memory controller interface. The built-in memory controller functionality may convert the received memory access requests into one or more commands that are consumable by memory 22. For example, if memory 22 is a DDR SDRAM, then the one or more memory commands that are consumable by memory 22 may be commands that are compatible with a DDR SDRAM interface.

In further examples, read engine 38 and write engine 40 in GPU 10 may issue commands to memory subsystem 8 and memory 22 that are consumable by memory 22. For example, if memory 22 is a DDR SDRAM, then the one or more memory commands that are consumable by memory 22 may be commands that are compatible with a DDR SDRAM interface.

In additional examples, GPU 10 may include built-in memory controller functionality. In such examples, the memory access requests issued by read engine 38 and write engine 40 may not necessarily be in a format that is consumable by memory 22. For example, the memory access requests may conform to an AMBA AXI specification, an AMBA AHB specification, or any other memory controller interface. The built-in memory controller functionality in GPU 10 may convert the received memory access requests into one or more commands that are consumable by memory 22. For example, if memory 22 is a DDR SDRAM, then the one or more memory commands that are consumable by memory 22 may be commands that are compatible with a DDR SDRAM interface.

In some examples, bus 18 may include a bi-directional data bus. The sequential memory transfer mode described in this disclosure may be used to reduce the number of read-to-write transitions that take place when performing a memory transfer operation, thereby reducing the overall delay that occurs during the memory transfer operation due to read-write turnaround time. However, as already discussed above, the sequential memory transfer mode may not be the most efficient memory transfer mode for all types and sizes of memory transfer operations. Accordingly, the techniques of this disclosure may be used to select appropriate memory transfer modes that are better suited for particular types of memory transfer operations, thereby improving the performance of a GPU that may perform varying types and sizes of memory transfer operations.

Figure 5:
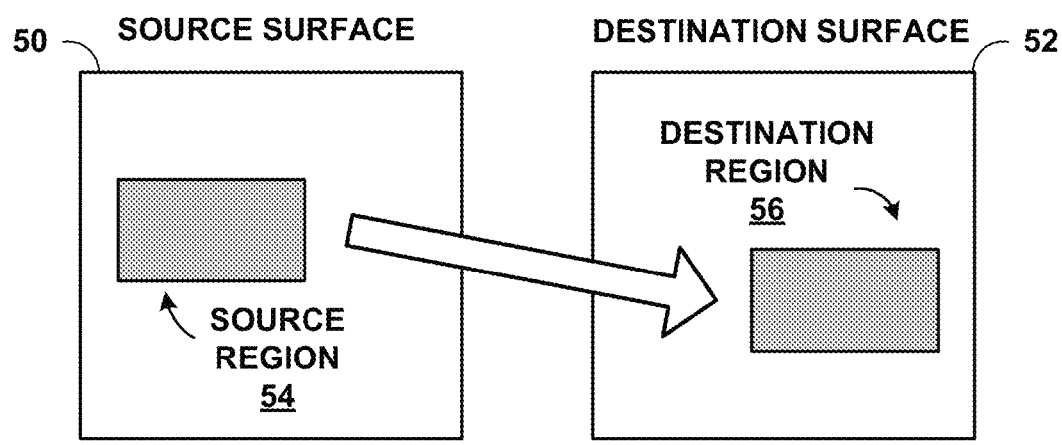
FIG. 5 is a conceptual diagram illustrating an example single source memory transfer operation according to this disclosure.

FIG. 5 is a conceptual diagram illustrating an example single source memory transfer operation according to this disclosure. FIG. 5 depicts a source surface 50 and a destination surface 52, each of which corresponds to a two-dimensional array of pixel data. The pixel data may include red, green, blue (RGB) color values and, in some cases, an alpha value (A) for each pixel in the surface. Because each of surfaces 50, 52 correspond to a two-dimensional array of pixel data, the pixel data for an individual pixel location in the surface may be indexed by row and column coordinates. In some examples, source surface 50 and destination surface 52 may be bitmaps. In further examples, source surface 50 and destination surface 52 may be a buffer resource, such as, e.g., a texture buffer. The example source surface 50 and destination surface 52 in FIG. 5 are the same shape and size, and are rectangular-shaped. However, in other examples, source surface 50 and destination surface 52 may not necessarily be the same shape and size and/or may be other shapes.

Source surface 50 includes a source region 54, and destination surface 52 includes a destination region 56. Source region 54 includes a subset of the pixel data included in source surface 50, and destination region 56 includes a subset of the pixel data included in destination surface 52. A subset of the pixel data included in a surface may refer to all or less than all of the pixel data included in the surface. As shown in FIG. 5, source region 54 and destination region 56 are the same size and shape, and are rectangular shaped. In other examples, however, source region 54 and destination region 56 may not be rectangular-shaped.

In the example memory transfer operation shown in FIG. 5, data is transferred from source region 54 of source surface 50 to destination region 56 of destination surface 52. In general, the data for each pixel location in source region 54 is transferred to the corresponding pixel location in destination region 56. Different pixel locations in different regions may be said to be corresponding pixel locations if the relative position of each of the pixel locations in its respective region is the same. For example, a pixel location in source region 54 may correspond to a pixel location in destination region 56 if the pixel location in source region 54 has the same relative location in source region 54 as the relative location in destination region 56 of the pixel location in destination region 56. For instance, the third column of the second row in of source region 54 and destination region 56 have the same relative location.

The memory transfer operation shown in FIG. 5 is a single source memory transfer operation because a single source region is used as a source operand for the memory transfer operation. The single source memory transfer operation shown in FIG. 5 may represent a memory copy operation where the same data of source region 54 is copied into destination region 56. Although the memory transfer operation shown in FIG. 5 shows a separate source surface 50 and destination surface 52, in other examples, source surface 50 and destination surface 52 may be same surface. In such examples, source region 54 and destination region 56 may, in some examples, be different regions within the same surface between which data is transferred by the memory copy operation.

Figure 6:
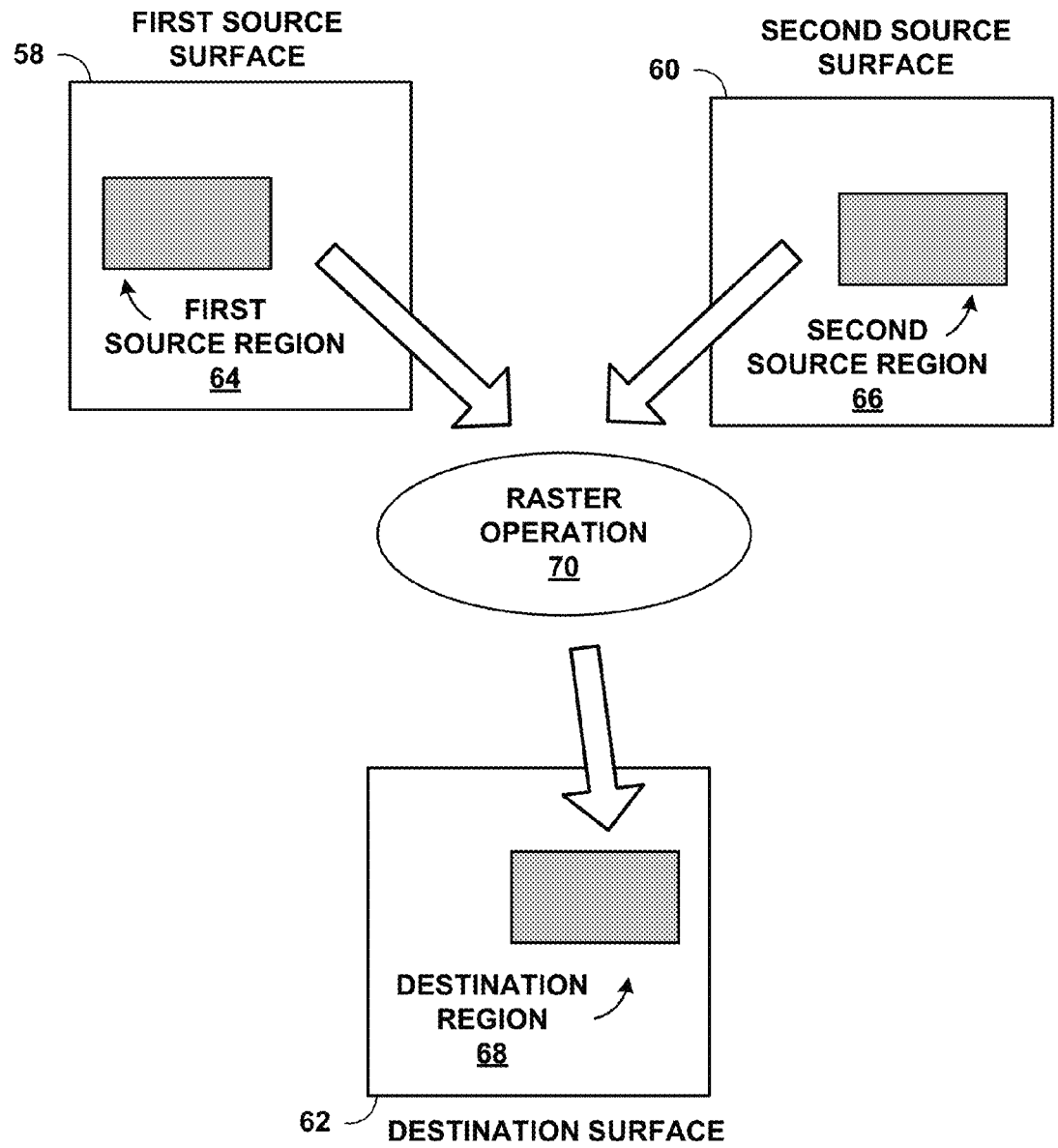
FIG. 6 is a conceptual diagram illustrating an example multiple source memory transfer operation according to this disclosure.

FIG. 6 is a conceptual diagram illustrating an example multiple source memory transfer operation according to this disclosure. FIG. 6 depicts a first source surface 58, a second source surface 60, and a destination surface 62. Each of surfaces 58, 60, 62 may be substantially similar to surfaces 50, 52 discussed above with respect to FIG. 5. First source surface 58 includes a first source region 64, second source surface 60 includes a second source region 66, and destination surface 62 includes a destination region 68. First source region 64 includes a subset of the pixel data included in first source surface 58, second source region 66 includes a subset of the pixel data included in second source surface 60, and destination region 68 includes a subset of the pixel data included in destination surface 62. As shown in FIG. 5, first source region 64, second source region 66, and destination region 68 are the same size and shape, and are rectangular shaped. In other examples, however, regions 64, 66 and 68 may not be rectangular-shaped.

In the example memory transfer operation of FIG. 6, source data from first source region 64 and source data from second source region 66 are combined via a raster operation 70 to generate destination data, and the destination data is placed into destination region 68 of destination surface 62. In general, the data for each pixel location in first source region 64 is combined with data from the corresponding pixel location in second source region 66, and written to a corresponding pixel location in destination region 68. Different pixel locations in different regions may be said to be corresponding pixel locations if the relative position of each of the pixel locations in its respective region is the same.

The memory transfer operation shown in FIG. 6 is a multiple source memory transfer operation because multiple source regions are used as source operands for the memory transfer operation. The multiple source memory transfer operation shown in FIG. 6 may represent a compositing operation where data from two different source regions are combined to generate destination data that is written to a destination region. Although the memory transfer operation shown in FIG. 6 shows a separate first source surface 58, second source surface 60 and destination surface 62, in other examples, one or more of surfaces 58, 60, 62 may be same surface. For example, second source surface 60 and destination surface 62 may be the same surface, and second source region 66 and destination region 68 may be same regions within that surface. In such an example, the compositing operation may merge pixel data in first source region 64 with existing pixel data in destination surface 62 using a particular raster operator.

Figure 7:
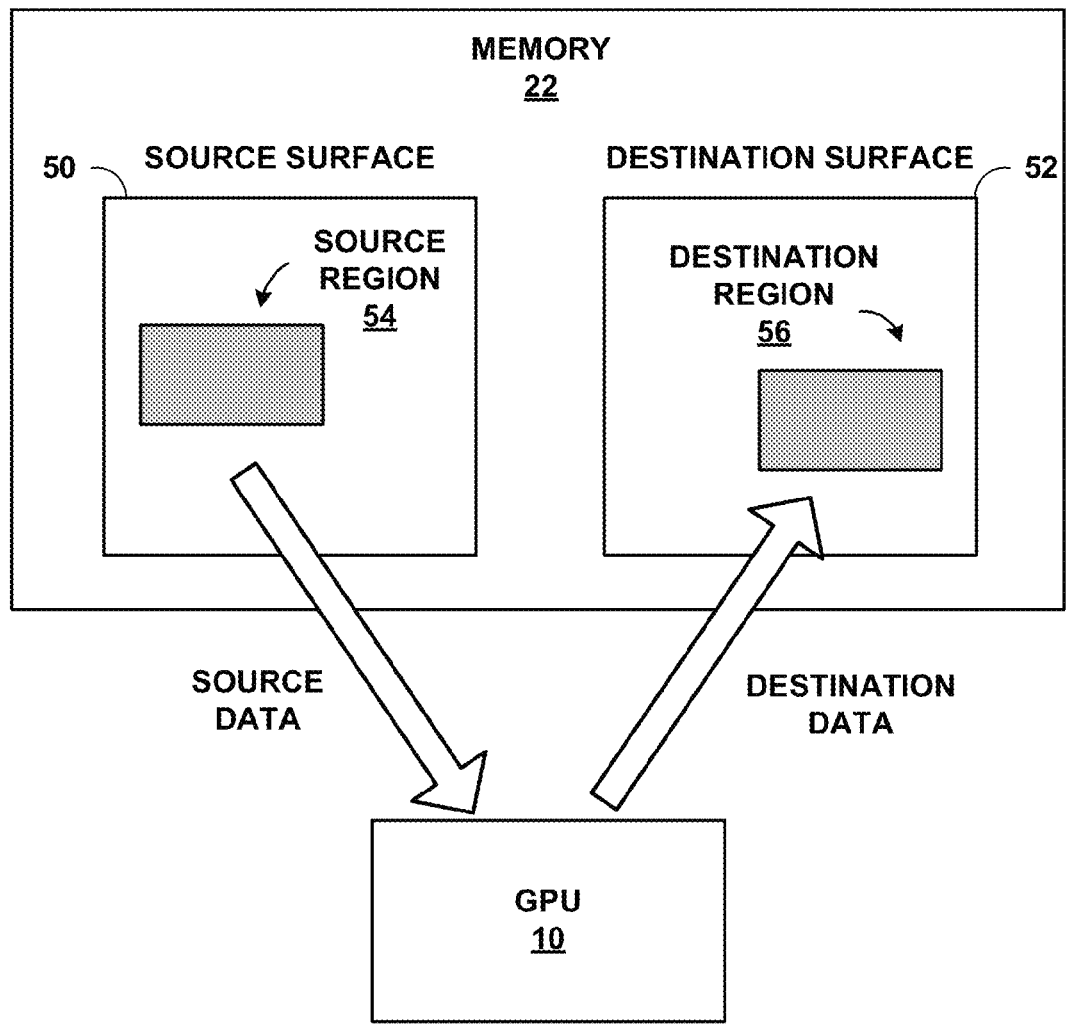
FIG. 7 is a conceptual diagram illustrating an example GPU-assisted single source memory transfer operation according to this disclosure.

FIG. 7 is a conceptual diagram illustrating an example GPU-assisted single source memory transfer operation according to this disclosure. The GPU-assisted memory transfer operation shown in FIG. 7 may be the same memory transfer operation as that which is depicted in FIG. 5. As shown in FIG. 7, source surface 50 and destination surface 52 are stored in memory 22.

To perform the memory transfer operation, GPU 10 reads source data from source region 54, generates destination data based on the source data read from source region 54, and writes the destination data to destination region 56. The destination data may be the same as the source data.

For each pixel location in source region 54, GPU 10 may issue a read request to read source data from source region 54 that corresponds to the respective pixel location. In response to receiving the read request, memory 22 may provide the source data that corresponds to the respective pixel location to GPU 10. In some examples, GPU 10 may store the source data in a buffer in GPU 10. GPU 10 may generate destination data for the respective pixel location based on the source data for the respective pixel location. For a memory copy operation, the destination data for the respective pixel location may be the same as the source data for the respective pixel location. GPU 10 may issue a write request to write the destination data to a pixel location in destination region 56 that corresponds to the respective pixel location of source region 54. In response to receiving the write request, memory 22 may store the destination data to the pixel location in destination region 56 that corresponds to the respective pixel location of source region 54. GPU 10 may perform these operations for each pixel location in source region 54 and corresponding pixel location in destination region 56.

Figure 8:
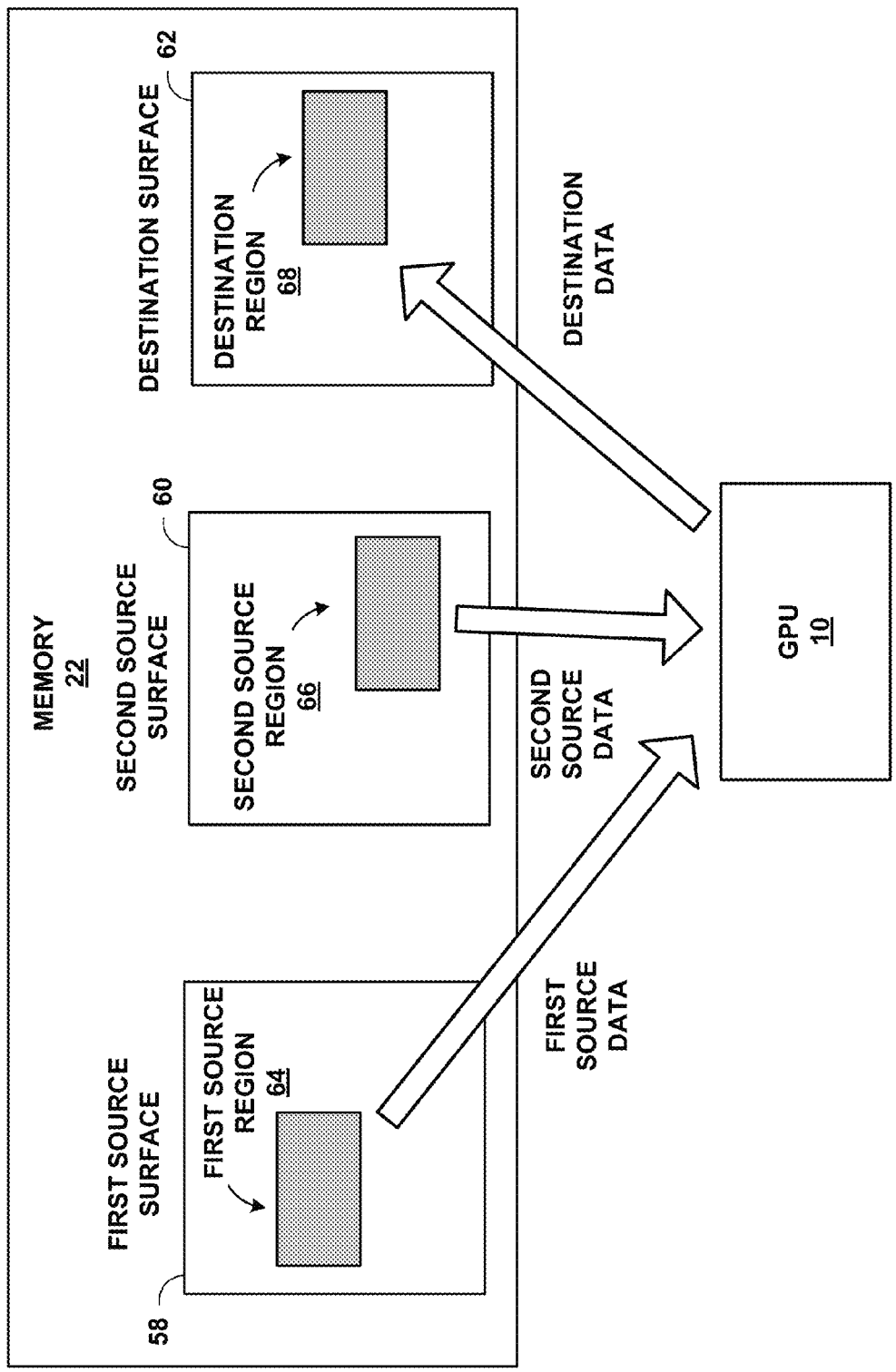
FIG. 8 is a conceptual diagram illustrating an example GPU-assisted multiple source memory transfer operation according to this disclosure.

FIG. 8 is a conceptual diagram illustrating an example GPU-assisted multiple source memory transfer operation according to this disclosure. The example GPU-assisted memory transfer operation shown in FIG. 8 may be the same memory transfer operation as that which is depicted in FIG. 6. As shown in FIG. 8, first source surface 58, second source surface 60, and destination surface 62 are stored in memory 22.

To perform the memory transfer operation, GPU 10 reads source data from first source surface 58 and second source surface 60, generates destination data based on the source data read from first source surface 58 and second source surface 60, and writes the destination data to destination surface 62. The destination data may be based on a combination of the source data. For example, GPU 10 may generate the destination data based on a raster operator that specifies the manner in which the source data from first source surface 58 and second source surface 60 are to be combined. A raster operations unit of GPU 10 (e.g., raster operations unit 34 shown in FIG. 2) may be used to combine the data.

For each pixel location in first source region 64, GPU 10 may issue a read request to read first source data from first source region 64 that corresponds to the respective pixel location, and issue a read request to read second source data from a pixel location in second source region 66 that corresponds to the respective pixel location in first source region 64 (i.e., a pixel location in second source region 66 that has the same relative location as the respective pixel location in first source region 64). In response to receiving the read requests, memory 22 may provide first source data that corresponds to the respective pixel location in first source region 64 to GPU 10, and second source data that corresponds to a corresponding pixel location in second source region 66 to GPU 10. In some examples, GPU 10 may store the source data in a buffer in GPU 10. GPU 10 may generate destination data for the respective pixel location based on the first source data and the second source data for the respective pixel location. For a compositing operation, the source data may be combined according to a raster operation to generate the destination data. GPU 10 may issue a write request to write the destination data to a pixel location in destination region 68 that corresponds to the respective pixel location of first source region 64. GPU 10 may perform these operations for each set of corresponding pixel locations in first source region 64, second source region 66, and destination region 68.

FIGS. 9-12 are timing diagrams that illustrate example timing characteristics for various memory transfer operations that are performed according to the various memory transfer modes of this disclosure. The timing diagrams in FIGS. 9-12 are described with respect to the configuration of computing device 2 shown in FIG. 3 for exemplary purposes. However, it should be understood that other devices that have the same or different components in the same or a different configuration may be used to perform the techniques of this disclosure.

It should be noted that the timing diagrams presented in FIGS. 9-12 are provided merely to depict general concepts of this disclosure that relate to the issuance of read requests and write requests in various memory transfer modes and to the variations in read-write turnaround delay that may occur when using the different memory transfer modes. As such, it is understood that these timing diagrams are not intended to be physically rigorous or exhaustive models of all timing considerations that may occur when accessing a memory. Similarly, different memory controllers and/or memories may respond to read requests and write requests in a manner that is different than that which is depicted in the timing diagrams of FIGS. 9-12. As such, it should be understood that the techniques of this disclosure are not limited to the particular memory controller behavior and/or memory behavior depicted in FIGS. 9-12.

FIGS. 9A and 9B are a timing diagram that illustrates example timing characteristics for a single source memory transfer operation that is performed according to the interleave memory transfer mode of this disclosure. As discussed above, the memory transfer operation depicted in FIGS. 9A and 9B is performed with the configuration of computing device 2 illustrated in FIG. 3. As shown in FIG. 3, the configuration includes a memory controller 20 that is communicatively coupled to a GPU 10 via a bus 18 and that is communicatively coupled to memory 22 via a bus 46. In order to perform the memory transfer operation according to the interleave memory transfer mode, command engine 32 may configure read engine 38 and write engine 40 to operate in an interleave synchronization mode. The memory transfer operation depicted in FIGS. 9A and 9B is performed with respect to a source region and a destination region that each have twelve pixels. Therefore, during the memory transfer operation, twelve read requests and twelve write requests are performed with respect to memory 22.

In FIGS. 9A and 9B, each row represents a particular time slot or time interval during the performance of the memory transfer operation with the first row being the earliest time slot and the last row being the latest time slot. The "Time" column represents the time slot number.

The "Read Engine" column includes "Read" events, which represent read requests that are issued by read engine 38. The "Write Engine" column includes "Write" events, which represent write requests that are issued by write engine 40. The read and write requests may be sent from GPU 10 to memory controller 20 via one or more command and/or addresses bus channels within bus 18.

The numbers following the read requests enumerate different read requests associated with different pixel locations in a source region. The numbers following the write requests enumerate different write requests associated with different pixel locations in a destination region. A read request and a write request that have the same number indicates that the read request and write request are performed with respect to corresponding pixel locations (i.e., pixels that have the same relative location) in the source and destination regions. In other words, the write data for the write request with a particular number is generated based on the source data received in response to a read request having that same particular number.

The "Read Bus" and "Write Bus" columns represent independent data channels for transferring data between GPU 10 and memory controller 20. The "Read Bus" and "Write Bus" may correspond to bus 18 shown in FIG. 3. The "Read Bus" may be a unidirectional bus channel within bus 18 that transports read data from memory controller 20 to GPU 10. The "Write Bus" may be a unidirectional bus channel within bus 18 that transports write data from GPU 10 to memory controller 20.

The "Read Bus" column includes "ReadData" events that represent source data that is transferred from memory controller 20 to GPU 10 in response to a particular read request issued by read engine 38. The number following the "ReadData" event indicates the read request that corresponds to the source data represented by the "ReadData" event. The "Write Bus" column includes "WriteData" events that represent destination data that is transferred from GPU 10 to memory controller 20 in conjunction with a write request issued by write engine 40. The number following the "WriteData" event indicates the write request that corresponds to the destination data represented by the "WriteData" event.

The "Memory Controller" column includes "ReadCommand" events and "WriteComand" events that represent read commands and write commands, respectively, that are sent from memory controller 20 to memory 22. The commands may be sent over one or more command and/or addresses bus channels within bus 46. The number following the "ReadCommand" event indicates the read request that corresponds to the read command represented by the "ReadCommand" event. Similarly, the number following the "WriteCommand" event indicates the write request that corresponds to the write command represented by the "WriteCommand" event.

The "Memory Bus" column represents a bi-directional data bus between memory controller 20 and memory 22. The bi-directional data bus may be part of bus 46. The "Memory Bus" column includes "ReadData" events that represent source data that is transferred from memory 22 to memory controller 20 in response to a particular read command issued by memory controller 20, and "WriteData" events that represent destination data that is transferred from memory controller 20 to memory 22 in conjunction with a particular write command issued by memory controller 20. The number following the "ReadData" event indicates the read command that corresponds to the source data represented by the "ReadData" event. The number following the "WriteData" event indicates the write command that corresponds to the destination data represented by the "WriteData" event.

The memory transfer operation depicted in FIGS. 9A and 9B is performed with a memory architecture that supports pipelined read access and pipelined write access. Pipelined read access may allow GPU 10 and/or memory controller 20 to issue a subsequent read request prior receiving data in response to all previously issued read requests. In other words, pipelined read access may allow GPU 10 and/or memory controller 20 to issue a first read request, and to issue a second read request after issuing the first read request and prior to receiving source data in response to the first read request.

Pipelined write access may allow GPU 10 and/or memory controller 20 to issue a subsequent write request prior receiving confirmation that all previously issued write requests have completed. In other words, pipelined write access may allow GPU 10 and/or memory controller 20 to issue a first write request, and to issue a second write request after issuing the first write request and prior to receiving confirmation that the first write request has completed.

The execution of the memory transfer operation begins at time slots 1-4 where read engine 38 begins to issue read requests. Memory controller 20 converts each read request into a read command. During time slots 2-5, memory controller 20 issues the read commands to memory 22 via bus 46 (i.e., the memory bus). In this example, memory 22 is configured to return read data in response to a read request at the second time slot after receiving a read command. For example, in response to receiving "ReadCommand1" at time slot 2, memory 22 returns "ReadData1," which corresponds to "ReadCommand1" at time slot 4. During time slots 4-7, memory 22 transfers the read data for the first four read requests to memory controller 20. During time slots 5-8, memory controller 20 redirects the read data to GPU 10 via the "Read Bus."

At time slot 5, write engine 40 detects that source data that is sufficient to issue a write request has been received by GPU 10 in response to a read request. In this example, source data that is sufficient to issue a write request corresponds to one source data unit received in response to a single read request. During time slot 6, in response to detecting that source data that is sufficient to issue a write request has been received by GPU 10, write engine 40 consumes the received source data, generates destination data based on the source data, issues a write request to memory controller 20, and transfers the destination data to memory controller 20 via the "Write Bus." In some examples, the destination data may be identical to the source data.

At time slot 6, memory controller 20 receives the write request, but does not issue a write command to memory 22 until time slot 11 for at least two reasons. First, memory controller 20 is still waiting to receive source data from memory 22 in response to previously issued read requests. Second, as discussed above, each time a switch occurs between servicing read and write requests, a particular amount of idle time may be needed to let the bus settle before the bus changes directions (e.g., from read to write). This idle time may be referred to as read-write turnaround delay. In the example of FIGS. 9A and 9B, the read-write turnaround delay is two idle cycles (i.e. time slots). As such, after the "ReadData4" event, memory controller 20 delays the issuance of "WriteCommand1" for two time slots. In conjunction with issuing "WriteCommand1," memory controller 20 transfers "WriteData1" over the memory bus to memory 22.

Returning to time slot 6, read engine 38 detects that source data that is sufficient to issue a write request has been consumed by write engine 40. During time slot 7, in response to detecting that source data that is sufficient to issue a write request has been consumed by write engine 40, read engine 38 issues a subsequent read request. Also during time slot 7, write engine 40 issues the "Write2" write request in response to GPU 10 receiving "ReadData2."

At this point, memory controller 20 has multiple different types of memory access requests to arbitrate and prioritize. For the example memory transfer operation depicted in FIGS. 9A and 9B, memory controller 20 processes memory access requests that were received earlier prior to memory access requests that were received later. If a read request and a write request are receiving during the same time slot, memory controller 20 processes the read request prior to the write request. Therefore, even though both a read request and a write request are received by memory controller 20 during time slot 7, memory controller 20 processes the read request prior to processing the write request. This is shown in FIG. 9A where memory controller 20 issues "ReadCommand5" during time slot 11 and "WriteCommand2" during time slot 16. It should be noted that the rules above are merely one example of an arbitration and prioritization scheme that could be implemented in a memory controller 20, and other types of arbitration and prioritization schemes may also be used in other examples.

Following time slot 11, read engine 38 and write engine 40 continue to issue read requests and write requests according to a producer-consumer paradigm. After all twelve pixels in the source region have been read and all twelve pixels in the destination region have been written, the memory transfer operation completes.

As shown in FIGS. 9A and 9B, the interleave memory transfer mode may cause read requests and write requests to be interleaved. For example, during time slots 7-9, GPU 10 issues read requests and write requests to memory controller 20 during the same time slots. This causes memory controller 20 to interleave read requests and write requests as shown in the "Memory Bus" column in time slots 11-28. As another example, during time slots 10-39, GPU 10 issues read requests and write requests to memory controller 20 in an interleaved fashion, which in turn causes memory controller 20 to process the requests in an interleaved fashion during time slots 29-55. Because of the interleaving, a significant number of time slots are idle on the "Memory Bus" as the bus frequently changes directions.

FIG. 10 is a timing diagram that illustrates example timing characteristics for a single source memory transfer operation that is performed according to the sequential memory transfer mode of this disclosure. Similar to the memory transfer operation depicted in FIGS. 9A and 9B, the memory transfer operation in FIG. 10 is performed with the configuration of computing device 2 illustrated in FIG. 3. Also similar the memory transfer operation depicted in FIGS. 9A and 9B, the memory transfer operation depicted in FIG. 10 supports pipelined read access and pipelined write access. The format of the table depicted in FIG. 10 is substantially similar to the table shown in FIGS. 9A and 9B, and therefore will not be described in further detail.

In order to perform the memory transfer operation according to the sequential memory transfer mode, command engine 32 may configure read engine 38 and write engine 40 to operate in an sequential synchronization mode. The memory transfer operation depicted in FIG. 10 is performed with respect to a source region and a destination region that each have twelve pixels. Therefore, during the memory transfer operation, twelve read requests and twelve write requests are performed with respect to memory 22.

The execution of the memory transfer operation begins at time slots 1-4 where read engine 38 begins to issue read requests. At time slot 5, read engine 38 ceases to issue read requests in response to the number of issued read requests being greater than or equal to the first threshold. In this example, the first threshold number is four read requests.

At time slot 8, write engine 40 detects that the amount of unconsumed data stored in buffer 36 is greater than or equal to the first threshold. At time slot 9, in response to detecting that the amount of unconsumed data stored in buffer 36 is greater than or equal to the first threshold, write engine 40 begins to consume source data from buffer 36, generate destination data based on the consumed source data, and issue write requests to write the destination data to memory 22. At time slot 13, write engine 40 detects that the amount of unconsumed data in buffer 36 is less than or equal to a second threshold. In response to detecting that the amount of unconsumed data in buffer 36 is less than or equal to a second threshold, write engine 40 ceases to consume source data and issue write requests for the consumed source data. In this example, the second threshold is zero.

At time slot 12, read engine 38 detects that the amount of unconsumed data in buffer 36 is less than or equal to a second threshold, and resumes the issuance of read requests at time slot 13. Read engine 38 and write engine 40 may continue to alternate issuing sequences of consecutive read requests and sequences of consecutive write requests according to the sequential memory transfer mode. After all twelve pixels in the source region have been read and all twelve pixels in the destination region have been written, the memory transfer operation completes.

As shown in FIG. 10, the sequential memory transfer mode may cause read requests and write requests to be issued in separate groups of read requests and write requests. For example, during time slots 1-4, GPU 10 issues a group of four consecutive read requests, and during time slots 9-12, GPU 10 issues a group of four consecutive write requests. As shown in FIG. 10, issuing separate groups of read and write requests caused the number of times that the "Memory Bus" changed directions to be reduced relative to the interleave memory transfer mode shown in FIGS. 9A and 9B. As such, the sequential memory mode may reduce the overall read-write turnaround delay that occurs when performing a memory transfer operation relative to the interleave memory transfer mode. This can be seen by observing that the same memory transfer operation took 61 time slots to complete in FIGS. 9A and 9B when performed according to the interleave transfer mode and 37 time slots to complete in FIG. 10 when performed according to the sequential memory transfer mode.

Although the sequential memory transfer mode may reduce the delay that occurs during the memory transfer operation due to read-write turnaround time, for certain types of memory transfer operations, the sequential memory transfer mode may not necessarily be more efficient than the interleave memory transfer mode. For example, if a relatively large, fixed amount of data is always retrieved for a read operation during the sequential memory transfer mode, then for small memory transfer operations, the sequential mode may require the fetching of extraneous data, which may overshadow the benefits achieved by reducing read-write turnaround.

Due to these and other considerations, one type of memory transfer mode may not universally be the most efficient memory transfer mode for performing memory transfer operations. Accordingly, the techniques of this disclosure may be used to select appropriate memory transfer modes that are better suited for particular types of memory transfer operations, thereby improving the performance of a GPU that may perform varying types and sizes of memory transfer operations.

FIGS. 11A and 11B are a timing diagram that illustrates example timing characteristics for a multiple source memory transfer operation that is performed according to the interleave memory transfer mode of this disclosure. Similar to the memory transfer operation depicted in FIGS. 9A and 9B, the memory transfer operation in FIGS. 11A and 11B is performed with the configuration of computing device 2 illustrated in FIG. 3. Also similar the memory transfer operation depicted in FIGS. 9A and 9B, the memory transfer operation depicted in FIGS. 11A and 11B supports pipelined read access and pipelined write access.

In order to perform the memory transfer operation according to the interleave memory transfer mode, command engine 32 may configure read engine 38 and write engine 40 to operate in an interleave synchronization mode. The memory transfer operation depicted in FIGS. 11A and 11B is performed with respect to two different source regions and a destination region, each of which have eight pixels. Therefore, during the memory transfer operation, sixteen read requests and eight write requests are performed with respect to memory 22.

The format of the table depicted in FIGS. 11A and 11B is similar to the table shown in FIGS. 9A and 9B except that read requests, read commands, and read data are designated by numerals and letters (e.g., "1A," "1B," "2A," "2B," etc.). In this case, the different letters represent different source regions, and the different numerals represent corresponding pixel locations (i.e., pixels that have the same relative location) in different regions. For example, "Read1A" is a read request for a particular pixel location in a first source region, and "Read1B" is a read request for a corresponding pixel location in a second source region. In this example, "Write1" may be a write request that writes destination data to a pixel location in the destination region that corresponds to the pixel locations for both "Read1A" and "Read1B." The destination data for a pixel location may be generated based on the source data associated with corresponding pixel locations in both source regions. For example, GPU 10 may generate "WriteData1" based on "ReadData1A" and "ReadData1B." A raster operation may be used to generate the destination data.

Read engine 38 and write engine 40 operate in a substantially similar manner to that which was described with respect to FIGS. 9A and 9B except that the data that is sufficient to issue a write request for the memory transfer operation may be two source data units returned in response to two different read requests rather than a single source data unit returned in response to a single read request. For example, at time slot 6, write engine 40 detects that source data that is sufficient to issue a write request (i.e., "ReadData1A" and "ReadData1B") for the memory transfer operation has been received by GPU 10, and during time slot 7, in response to detecting that source data that is sufficient to issue a write request for the memory transfer operation has been received by GPU 10, write engine 40 consumes the received source data, generates destination data based on the consumed source data, issues a write request to memory controller 20, and transfers the destination data to memory controller 20 via the "Write Bus."

As another example, at time slot 7, read engine 38 detects that source data that is sufficient to issue a write request (i.e., "ReadData1A" and "ReadData1B") for the memory transfer operation has been consumed by write engine 40. During time slot 8, in response to detecting that source data that is sufficient to issue a write request for the memory transfer operation has been consumed by write engine 40, read engine 38 issues a subsequent read request.

FIG. 12 is a timing diagram that illustrates example timing characteristics for a multiple source memory transfer operation that is performed according to the sequential memory transfer mode of this disclosure. Similar to the memory transfer operation depicted in FIGS. 11A and 11B, the memory transfer operation in FIG. 12 is performed with the configuration of computing device 2 illustrated in FIG. 3. Also similar the memory transfer operation depicted in FIGS. 11A and 11B, the memory transfer operation depicted in FIG. 12 supports pipelined read access and pipelined write access. The format of the table depicted in FIG. 12 is substantially similar to the table shown in FIGS. 11A and 11B, and therefore will not be described in further detail.

In order to perform the memory transfer operation according to the sequential memory transfer mode, command engine 32 may configure read engine 38 and write engine 40 to operate in an sequential synchronization mode. The memory transfer operation depicted in FIGS. 11A and 11B is performed with respect to two different source regions and a destination region, each of which have eight pixels. Therefore, during the memory transfer operation, sixteen read requests and eight write requests are performed with respect to memory 22.

As shown in FIG. 12, issuing separate groups of read and write requests caused the number of times that the "Memory Bus" changed directions to be reduced relative to the interleave memory transfer mode shown in FIGS. 11A and 11B. As such, the sequential memory mode may reduce the overall read-write turnaround delay that occurs when performing a memory transfer operation relative to the interleave memory transfer mode. This can be seen by observing that the same memory transfer operation took 53 time slots to complete in FIGS. 11A and 11B when performed according to the interleave transfer mode and 33 time slots to complete in FIG. 12 when performed according to the sequential memory transfer mode.

Again, one type of memory transfer mode may not universally be the most efficient memory transfer mode for performing memory transfer operations. Accordingly, the techniques of this disclosure may be used to select appropriate memory transfer modes that are better suited for particular types of memory transfer operations, thereby improving the performance of a GPU that may perform varying types and sizes of memory transfer operations.

FIGS. 13-19 illustrate different techniques for performing memory transfer operations according to the interleave and sequential memory transfer modes of this disclosure. The techniques shown in FIGS. 13-19 are described as being performed by GPU 10 shown in FIGS. 1 & 2 for exemplary purposes. In other examples, the techniques illustrated in FIGS. 13-19 may be implemented in other systems that have same or different components in the same or a different configuration.

Figure 13:
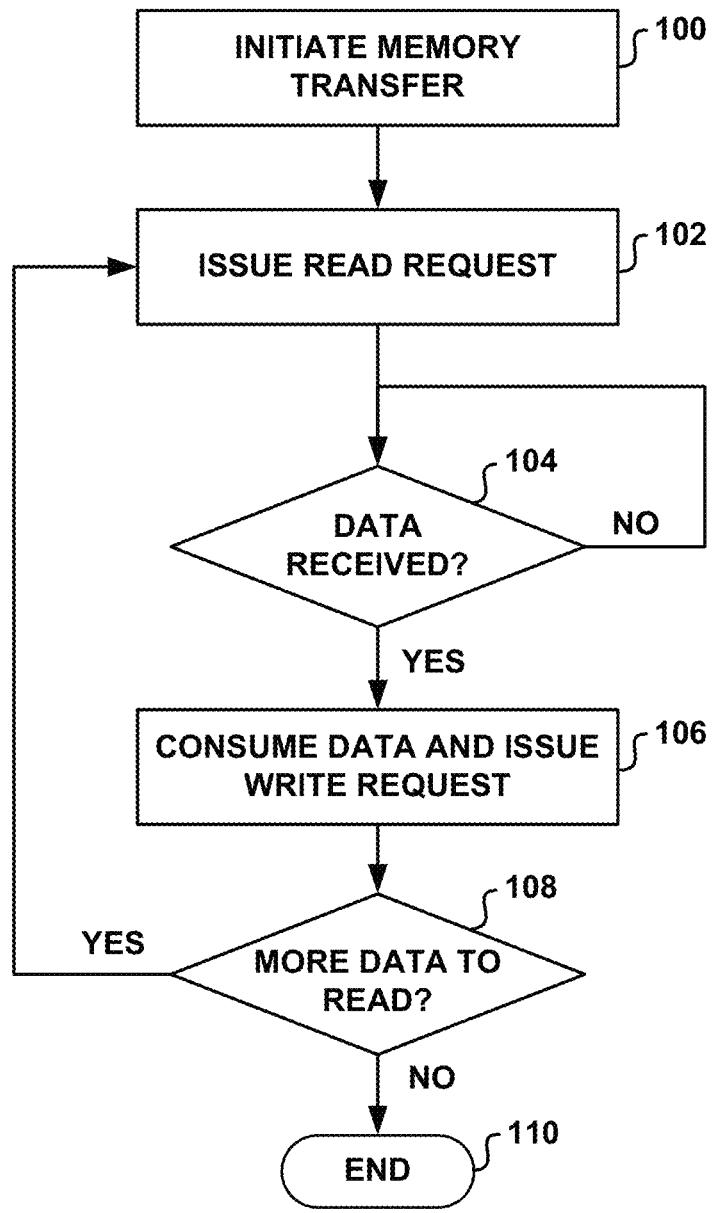
FIG. 13 is a flow diagram illustrating an example technique for performing a memory transfer operation according to the interleave memory transfer techniques of this disclosure.

FIG. 13 is a flow diagram illustrating an example technique for performing a memory transfer operation according to the interleave memory transfer mode of this disclosure. GPU 10 initiates a memory transfer operation (100). GPU 10 issues a read request to memory subsystem 8 (e.g., memory controller 20 or memory 22) to read source data associated with a pixel location within a source region (102).

GPU 10 waits until source data has been received from memory subsystem 8 (e.g. memory controller 20 or memory 22) in response to the read request. For example, GPU 10 determines if source data has been received from memory subsystem 8 in response to the read request (104). If the source data has not been received from memory subsystem 8 in response to the read request, GPU 10 loops back to decision box 104. In response to receiving the source data from memory subsystem 8, GPU 10 consumes the data, generates destination data based on the source data, and issues a write request to write the destination data to a corresponding pixel location in a destination region (106).

In response to source data being consumed, GPU 10 issues a subsequent read request provided more data needs to be read for the memory transfer operation. More specifically, GPU 10 determines if there is more data to read (108). If there is more data to read, GPU 10 proceeds to process box 102 and issues a subsequent read request. If there is no more data to read, GPU 10 completes the memory transfer operation (110).

Figure 14:
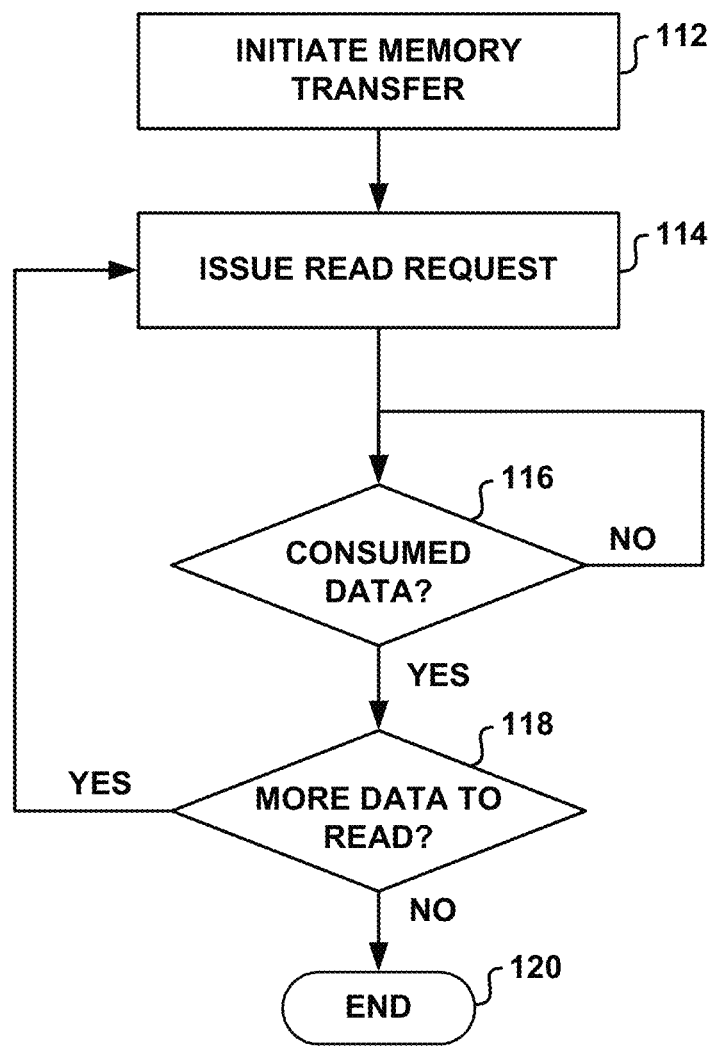
FIG. 14 is a flow diagram illustrating an example technique for issuing read requests according to the interleave synchronization mode of this disclosure.

FIG. 14 is a flow diagram illustrating an example technique for issuing read requests according to the interleave synchronization mode of this disclosure. Read engine 38 initiates a memory transfer operation (112). Read engine 38 issues a read request to memory subsystem 8 (e.g., memory controller 20 or memory 22) to read source data associated with a pixel location within a source region (114).

Read engine 38 waits until source data has been consumed from buffer 36 by write engine 40. For example, read engine 38 determines if source data has been consumed from buffer 36 by write engine 40 (116). If the source data has not been consumed from buffer 36, then GPU 10 loops back to decision box 116.

In response to source data being consumed from buffer 36 by write engine 40, read engine 38 issues a subsequent read request provided more data needs to be read for the memory transfer operation. For example, read engine 38 determines if there is more data to read (118). If there is more data to read, read engine 38 proceeds to process box 114 and issues a subsequent read request. If there is no more data to read, read engine 38 completes the memory transfer operation (120).

Figure 15:
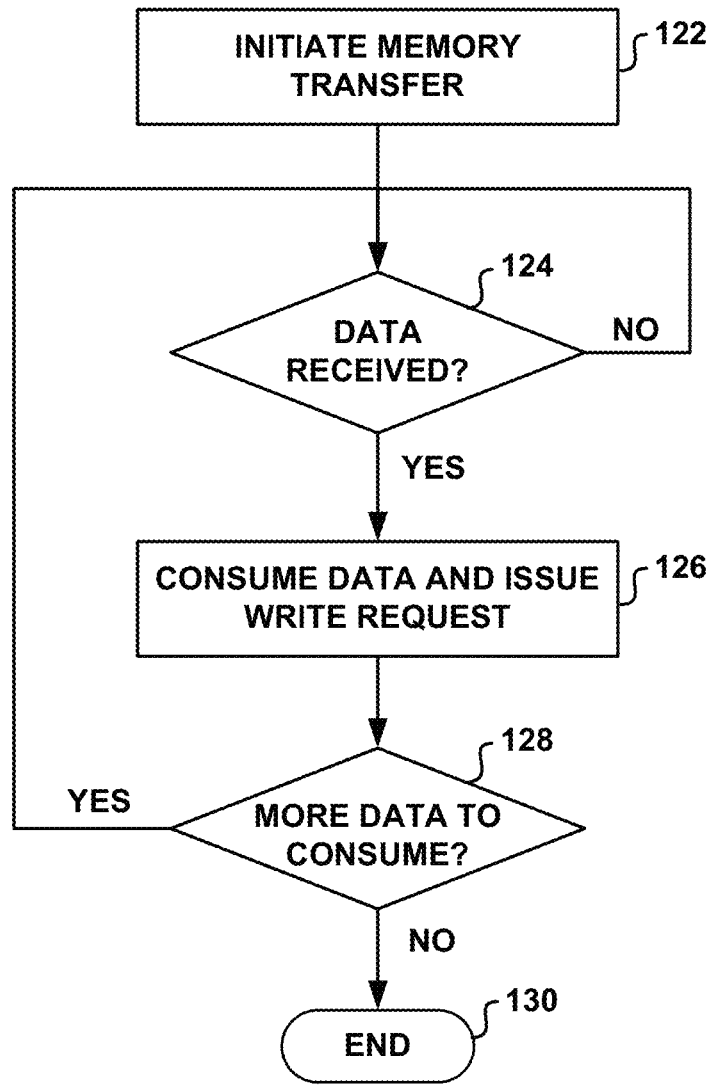
FIG. 15 is a flow diagram illustrating an example technique for issuing write requests according to the interleave synchronization mode of this disclosure.

FIG. 15 is a flow diagram illustrating an example technique for issuing write requests according to the interleave synchronization mode of this disclosure. Write engine 40 initiates a memory transfer operation (122).

Write engine 40 waits until source data has been received from memory subsystem 8 (e.g. memory controller 20 or memory 22) in response to the read request. For example, write engine 40 determines if source data has been received by GPU 10 from memory subsystem 8 in response to the read request (124). For instance, write engine 40 may determine if read engine 38 placed source data into buffer 36. If the source data has not been received from memory subsystem 8 in response to the read request, write engine 40 loops back to decision box 124. In response to determining that source data has been received by GPU 10, memory 22 consumes the data, generates destination data based on the source data, and issues a write request to write the destination data to a corresponding pixel location in a destination region (126).

Write engine 40 determines if there is more data to consume as part of the memory transfer operation (128). If there is more data to consume, write engine 40 proceeds to decision box 124 and waits for more source data to be received. If there is no more data to consume as part of the memory transfer operation, write engine 40 completes the memory transfer operation (130).

Figure 16:
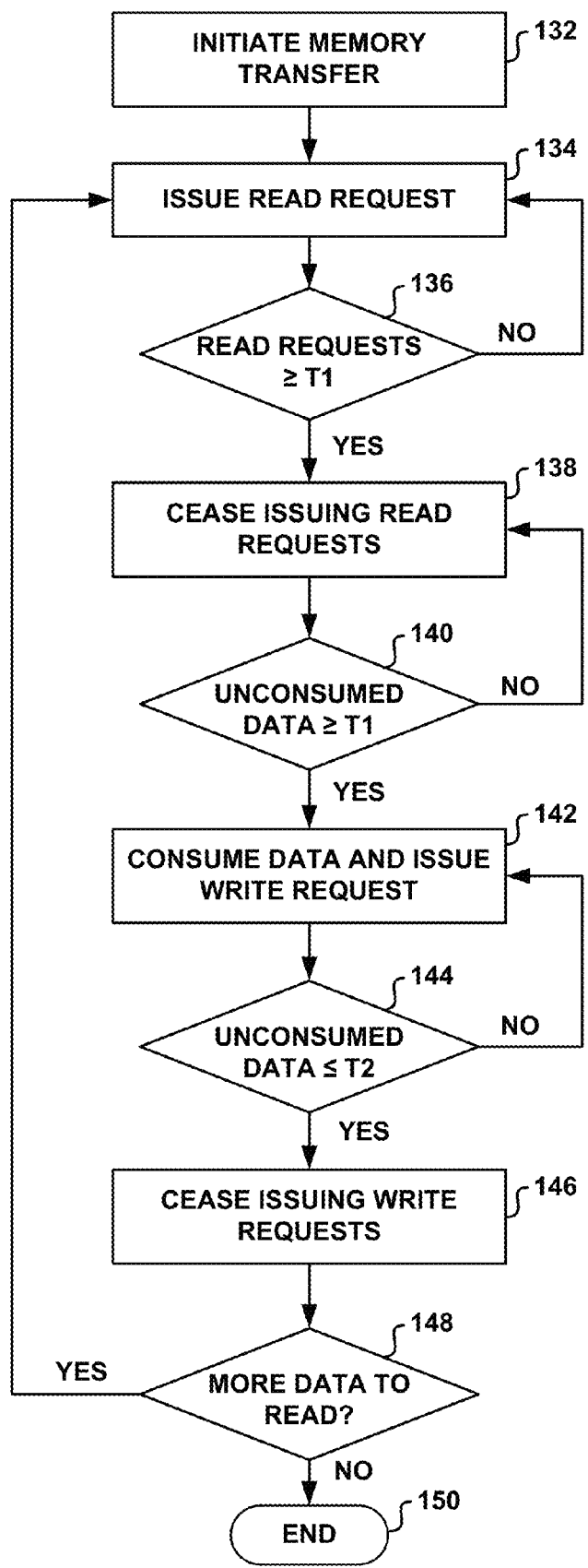
FIG. 16 is a flow diagram illustrating an example technique for performing a memory transfer operation according to the sequential memory transfer techniques of this disclosure.

FIG. 16 is a flow diagram illustrating an example technique for performing a memory transfer operation according to the sequential memory transfer mode of this disclosure. GPU 10 initiates a memory transfer operation (132). GPU 10 issues a read request to memory subsystem 8 (e.g., memory controller 20 or memory 22) to read source data associated with a pixel location within a source region (134).

GPU 10 determines whether the number of read requests that have been issued is greater than or equal to a first threshold (136). In response to determining that the number of read requests that have been issued is not greater than or equal to the first threshold, GPU 10 issues another read request (134). GPU 10 continues to issue read requests until the number of read requests that have been issued is greater than or equal to the first threshold. In response to determining that the number of read requests that have been issued is greater than or equal to the first threshold, GPU 10 ceases to issue read requests (138).

GPU 10 determines whether the amount of unconsumed source data is greater than or equal to the first threshold (140). In response to determining that the amount of unconsumed source data is not greater than or equal to the first threshold, GPU 10 continues to cease to issuing read requests (138). In response to determining that the amount of unconsumed source data is greater than or equal to the first threshold, GPU 10 begins consuming source data, generating destination data based on the source data, and issuing write requests (142).

GPU 10 determines whether the amount of unconsumed source data is less than or equal to a second threshold (144). The second threshold may be less than the first threshold. In response to determining that the amount of unconsumed source data is not less than or equal to the second threshold, GPU 10 continues to consume source data, generate destination data, and issue write requests (142). GPU 10 continues to consume source data, generate destination data, and issue write requests until the amount of unconsumed source data is less than or equal to the second threshold. In response to determining that the amount of unconsumed source data is less than or equal to the second threshold, GPU 10 ceases to consume source data, generate destination data, and issue write requests (146).

Also, in response to determining that the amount of unconsumed source data is less than or equal to the second threshold, GPU 10 may resume issuing read requests provided there is more data to read as part of the memory transfer operation. For example, GPU 10 determines if there is more data to read (148). If there is more data to read, GPU 10 proceeds to process box 134 and issues a subsequent read request. If there is no more data to read, GPU 10 completes the memory transfer operation (150).

Figure 17:
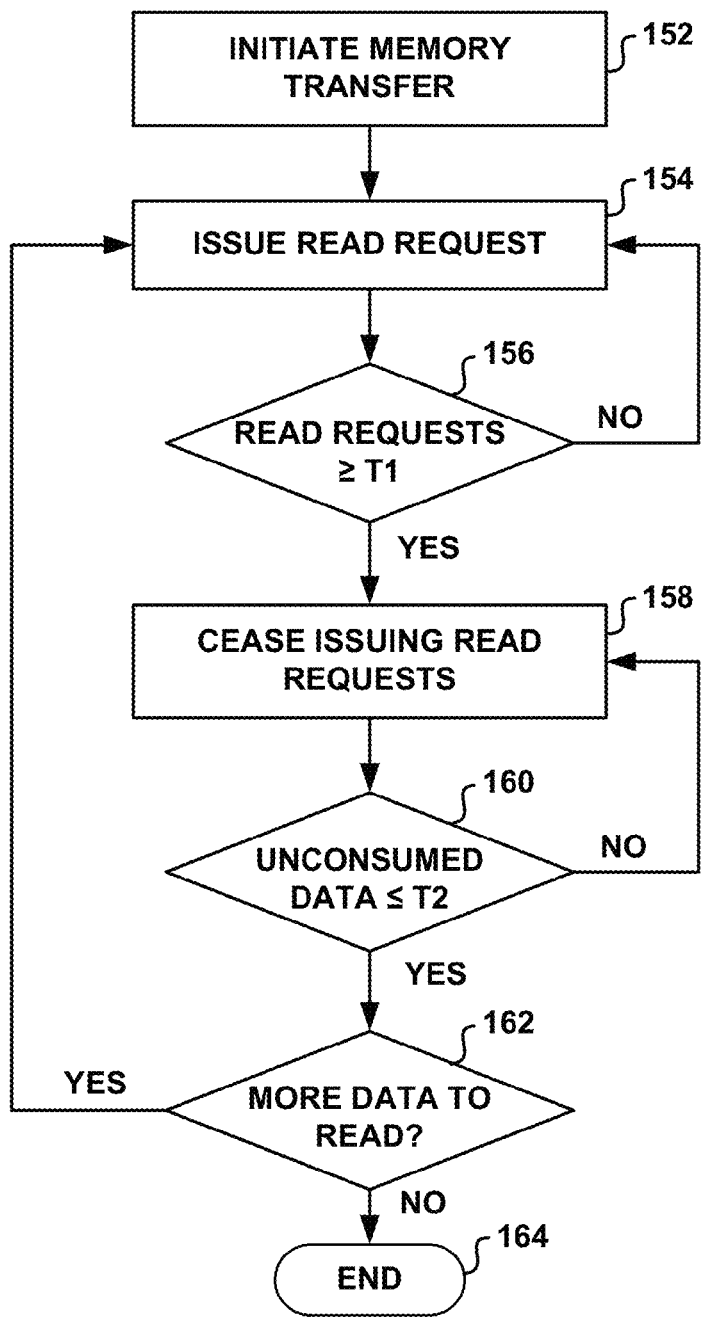
FIG. 17 is a flow diagram illustrating an example technique for issuing read requests according to the sequential synchronization mode of this disclosure.

FIG. 17 is a flow diagram illustrating an example technique for issuing read requests according to the sequential synchronization mode of this disclosure. Read engine 38 initiates a memory transfer operation (152). Read engine 38 issues a read request to memory subsystem 8 (e.g., memory controller 20 or memory 22) to read source data associated with a pixel location within a source region (154).

Read engine 38 determines whether the number of read requests that have been issued is greater than or equal to a first threshold (156). In response to determining that the number of read requests that have been issued is not greater than or equal to the first threshold, read engine 38 issues another read request (154). Read engine 38 continues to issue read requests until the number of read requests that have been issued is greater than or equal to a first threshold. In response to determining that the number of read requests that have been issued is greater than or equal to the first threshold, read engine 38 ceases to issue read requests (158).

Read engine 38 determines whether the amount of unconsumed source data is less than or equal to a second threshold (160). The second threshold may be less than the first threshold. In response to determining that the amount of unconsumed source data is not less than or equal to the second threshold, read engine 38 continues to cease to issuing read requests (158). Read engine 38 continues to cease issuing read requests until the amount of unconsumed source data is less than or equal to the second threshold.

In response to determining that the amount of unconsumed source data is less than or equal to the second threshold, GPU 10 may resume issuing read requests provided there is more data to read as part of the memory transfer operation. For example, GPU 10 determines if there is more data to read (162). If there is more data to read, GPU 10 proceeds to process box 154 and issues a subsequent read request. If there is no more data to read, GPU 10 completes the memory transfer operation (164).

Figure 18:
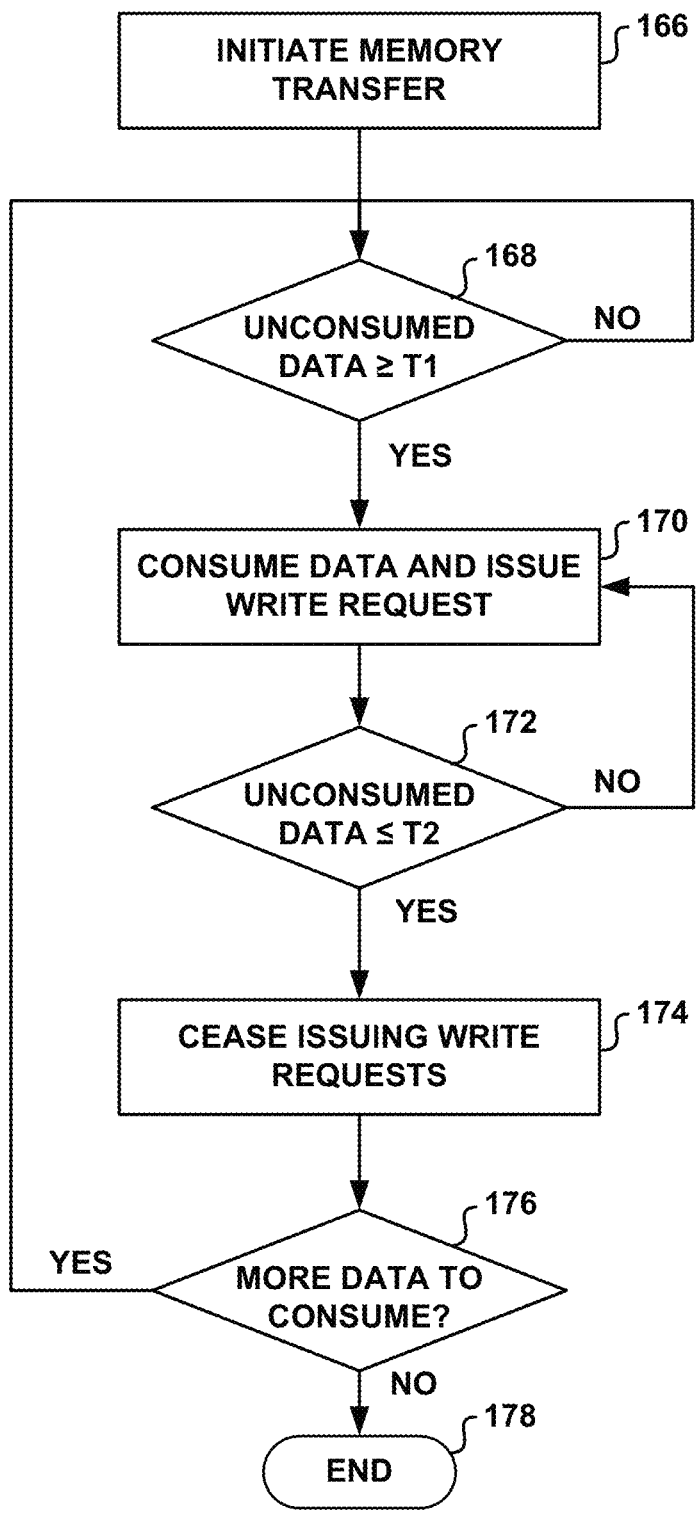
FIG. 18 is a flow diagram illustrating an example technique for issuing write requests according to the sequential synchronization mode of this disclosure.

FIG. 18 is a flow diagram illustrating an example technique for issuing write requests according to the sequential synchronization mode of this disclosure. Write engine 40 initiates a memory transfer operation (166).

Write engine 40 waits until the amount of unconsumed source data is greater than or equal to the first threshold. For example, write engine 40 determines whether the amount of unconsumed source data is greater than or equal to the first threshold (168). In response to determining that the amount of unconsumed source data is not greater than or equal to the first threshold, write engine 40 continues to wait. In response to determining that the amount of unconsumed source data is greater than or equal to the first threshold, write engine 40 begins consuming source data, generating destination data based on the source data, and issuing write requests (170).

Write engine 40 determines whether the amount of unconsumed source data is less than or equal to a second threshold (172). The second threshold may be less than the first threshold. In response to determining that the amount of unconsumed source data is not less than or equal to the second threshold, write engine 40 continues to consume source data, generate destination data, and issue write requests (170). Write engine 40 continues to consume source data, generate destination data, and issue write requests until the amount of unconsumed source data is less than or equal to the second threshold. In response to determining that the amount of unconsumed source data is less than or equal to the second threshold, write engine 40 ceases to consume source data, generate destination data, and issue write requests (174).

Write engine 40 may cease to consume source data, generate destination data, and issue write requests until the amount of unconsumed source data is greater than or equal to the first threshold. Provided that there is more data to consume as part of the memory transfer operation, write engine 40 may resume consuming source data, generating destination data, and issuing write requests in response to determining that the amount of unconsumed source data is greater than or equal to the first threshold. For example, write engine 40 determines if there is more data to consume as part of the memory transfer operation (176). If there is more data to consume, write engine 40 proceeds to decision box 168 and waits for the amount of unconsumed source data is greater than or equal to the first threshold. If there is no more data to consume as part of the memory transfer operation, write engine 40 completes the memory transfer operation (178).

Figure 19:
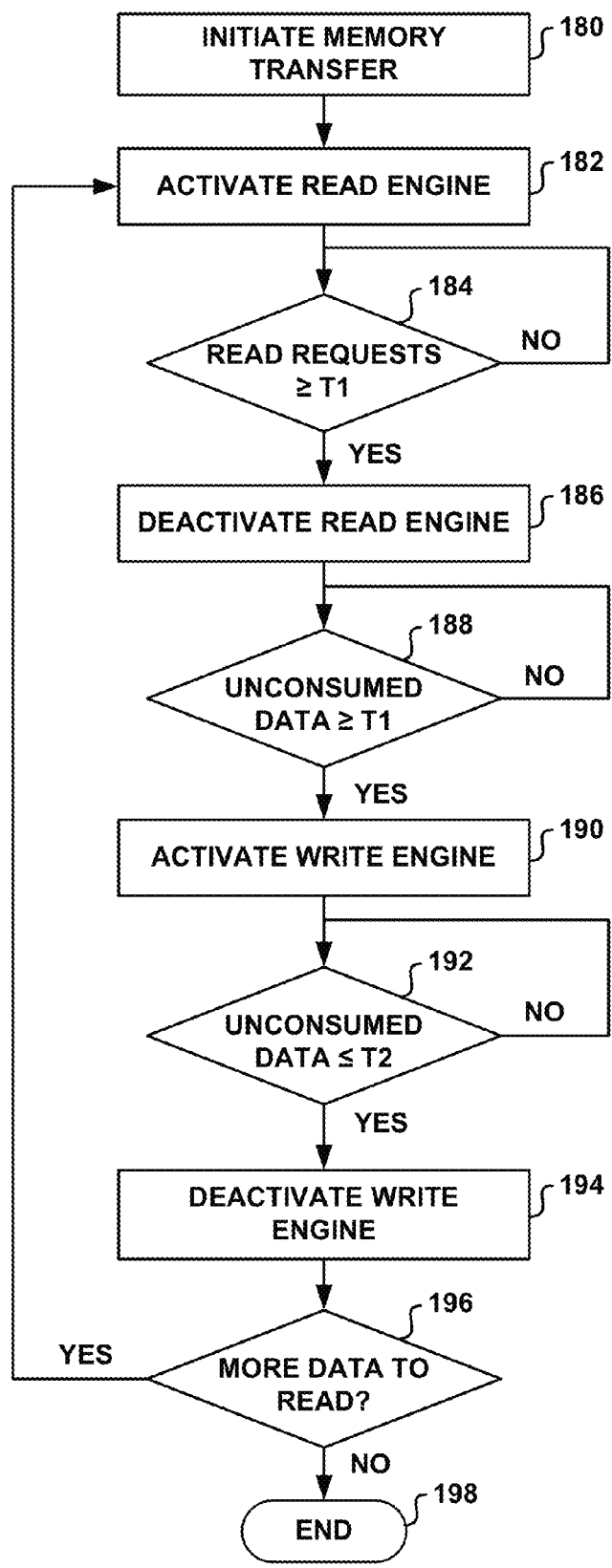
FIG. 19 is a flow diagram illustrating an example technique for performing a memory transfer operation according to the sequential memory transfer mode of this disclosure.

FIG. 19 is a flow diagram illustrating an example technique for performing a memory transfer operation according to the sequential memory transfer mode of this disclosure. GPU 10 initiates a memory transfer operation (180). GPU 10 activates read engine 38 (182). When read engine 38 is activated, read engine 38 issues read requests until read engine 38 is deactivated.

Read engine 38 remains activated until the number of read requests that have been issued is greater than or equal to a first threshold. For example, GPU 10 determines whether the number of read requests that have been issued is greater than or equal to a first threshold (184). In response to determining that the number of read requests that have been issued is not greater than or equal to the first threshold, GPU 10 loops back to decision block 184. In response to determining that the number of read requests that have been issued is greater than or equal to the first threshold, GPU 10 deactivates read engine 38 (186). When read engine 38 is deactivated, read engine 38 may cease issuing read requests.

GPU 10 waits until the amount of unconsumed source data is greater than or equal to the first threshold. For example, GPU 10 determines whether the amount of unconsumed source data is greater than or equal to the first threshold (188). In response to determining that the amount of unconsumed source data is not greater than or equal to the first threshold, GPU 10 loops back to decision block 188. In response to determining that the amount of unconsumed source data is greater than or equal to the first threshold, GPU 10 activates write engine 40 (190). When write engine 40 is activated, write engine 40 may consume source data, generate destination data based on the source data, and issue write requests to write the destination data to memory 22.

Write engine 40 remains activated until the amount of unconsumed source data is less than or equal to a second threshold. For example, GPU 10 determines whether the amount of unconsumed source data is less than or equal to a second threshold (192). The second threshold may be less than the first threshold. In response to determining that the amount of unconsumed source data is not less than or equal to the second threshold, GPU 10 loops back to decision block 192. In response to determining that the amount of unconsumed source data is less than or equal to the second threshold, GPU 10 deactivates write engine 40 (194). When write engine 40 is deactivated, write engine 40 may cease to consume source data, generate destination data, and issue write requests.

Also, in response to determining that the amount of unconsumed source data is less than or equal to the second threshold, GPU 10 may reactivate read engine 38 provided there is more data to read as part of the memory transfer operation. For example, GPU 10 determines if there is more data to read (196). If there is more data to read, GPU 10 proceeds to process box 182 and activates read engine 38. If there is no more data to read, GPU 10 completes the memory transfer operation (198).

Figure 20:
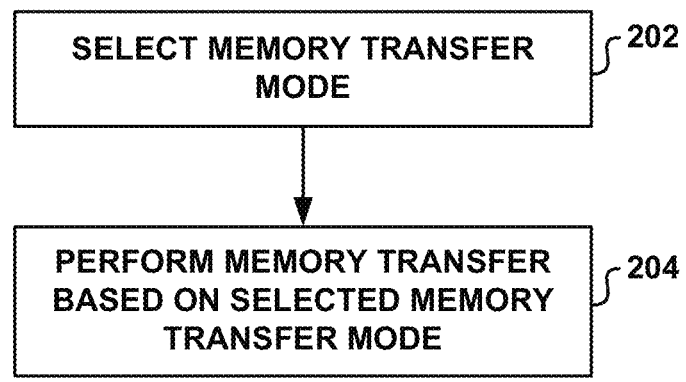
FIG. 20 is a flow diagram illustrating an example technique for performing a memory transfer operation according to this disclosure.

FIG. 20 is a flow diagram illustrating an example technique for performing a memory transfer operation according to this disclosure. The technique in FIG. 20 is described as being performed by computing device 2 shown in FIGS. 1 & 2 for exemplary purposes. In other examples, the technique illustrated in FIG. 20 may be implemented in other systems that have same or different components in the same or a different configuration.

CPU 6 and/or GPU 10 selects a memory transfer mode for performing all or part of the memory transfer operation (202). In some examples, the memory transfer mode may be selected from a set of at least two different memory transfer modes that includes an interleave memory transfer mode and a sequential memory transfer mode.

GPU 10 performs the memory transfer operation based on the selected memory transfer mode (204). For example, GPU 10 may perform the memory transfer operation based on an interleave memory transfer mode in response to the interleave memory transfer mode being selected as the memory transfer mode for performing the memory transfer operation. As another example, GPU 10 may perform the memory transfer operation based on a sequential memory transfer mode in response to the sequential memory transfer mode being selected as the memory transfer mode for performing the memory transfer operation.

In some examples, GPU 10 may perform a first part of the memory transfer operation using a first memory transfer mode selected from a set of at least two different memory transfer modes, and perform a second part of the memory transfer operation using a second memory transfer mode selected from the set of at least two different memory transfer modes.

FIGS. 21-22 and 24-26 illustrate different techniques for selecting a memory transfer mode for performing a memory transfer operation according to this disclosure. The techniques shown in FIGS. 21-22 and 24-26 are described as being performed by computing device 2 shown in FIGS. 1 & 2 for exemplary purposes. In other examples, the techniques illustrated in FIGS. 21-22 and 24-26 may be implemented in other systems that have same or different components in the same or a different configuration.

Figure 21:
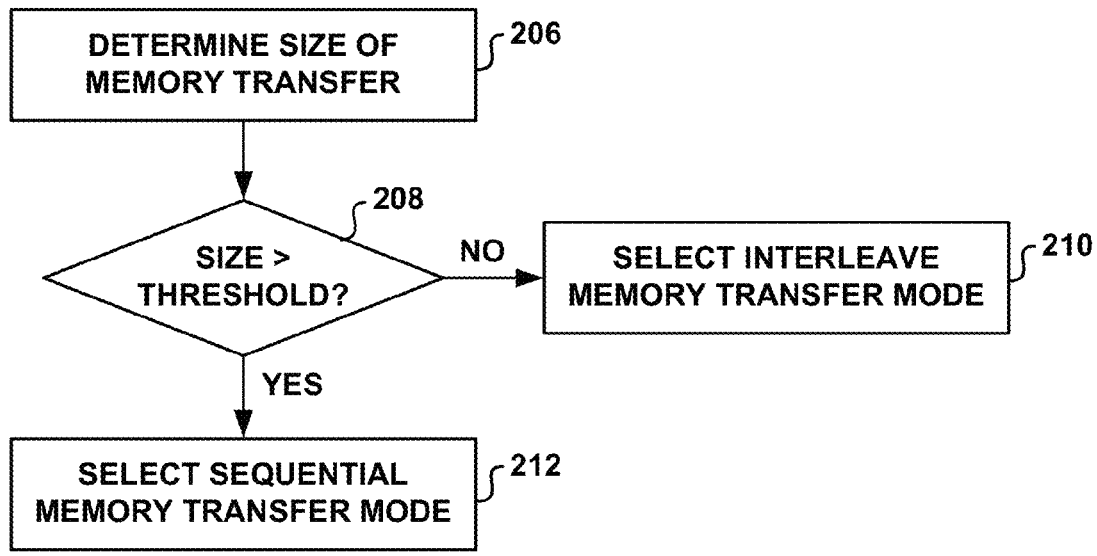
FIGS. 21 and 22 are flow diagrams illustrating example techniques for selecting a memory transfer mode for performing a memory transfer operation according to this disclosure.

FIG. 21 is a flow diagram illustrating an example technique for selecting a memory transfer mode for performing a memory transfer operation based on an amount of data to be transferred by the memory transfer operation according to this disclosure. In some examples, the technique shown in FIG. 21 may be used to implement process block 202 shown in FIG. 20.

CPU 6 and/or GPU 10 determines a size of a memory transfer operation (206). The size of the memory transfer operation may correspond to the amount of data to be transferred by the memory transfer operation. In some examples, the size of the memory transfer operation may be specified in a memory transfer command. In further examples, CPU 6 and/or GPU 10 may determine the size of the memory transfer operation based on the dimensions of a source region and a destination region and based on the number of source regions that are used in the memory transfer operation.

CPU 6 and/or GPU 10 determines whether the size of the memory transfer operation is greater than a threshold (208). If the size of the memory transfer operation is not greater than the threshold, then CPU 6 and/or GPU 10 selects the interleave memory transfer mode as the memory transfer mode to be used for performing all or part of a memory transfer operation (210). If the size of the memory transfer operation is greater than the threshold, then CPU 6 and/or GPU 10 selects the sequential memory transfer mode as the memory transfer mode to be used for performing all or part of a memory transfer operation (212).

Figure 22:
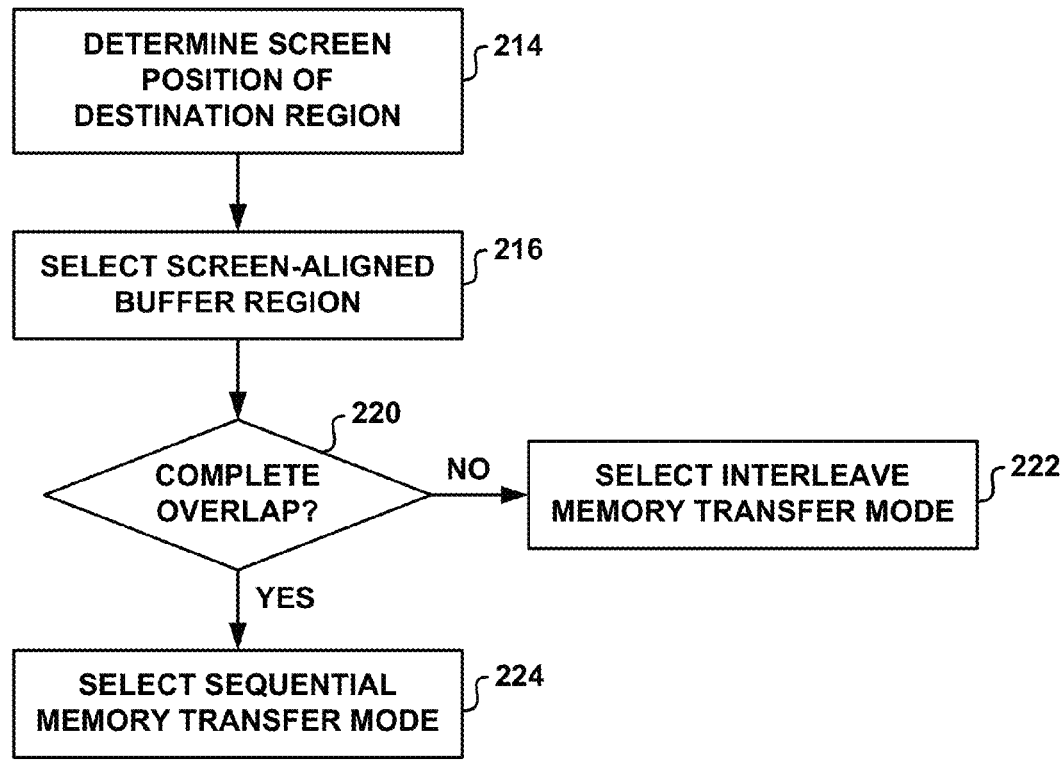

FIG. 22 is a flow diagram illustrating an example technique for selecting a memory transfer mode for performing a memory transfer operation based on an amount of overlap a destination region of the memory transfer operation has with a fixed, screen-aligned buffer region according to this disclosure. In some examples, the technique shown in FIG. 22 may be used to implement process block 202 shown in FIG. 20.

CPU 6 and/or GPU 10 determines the screen position of a destination region that is defined for the memory transfer operation (214). The screen position may refer to the location of the destination region in screen space. In some examples, CPU 6 and/or GPU 10 may determine the screen position based on data received in a memory transfer command.

Figure 23:
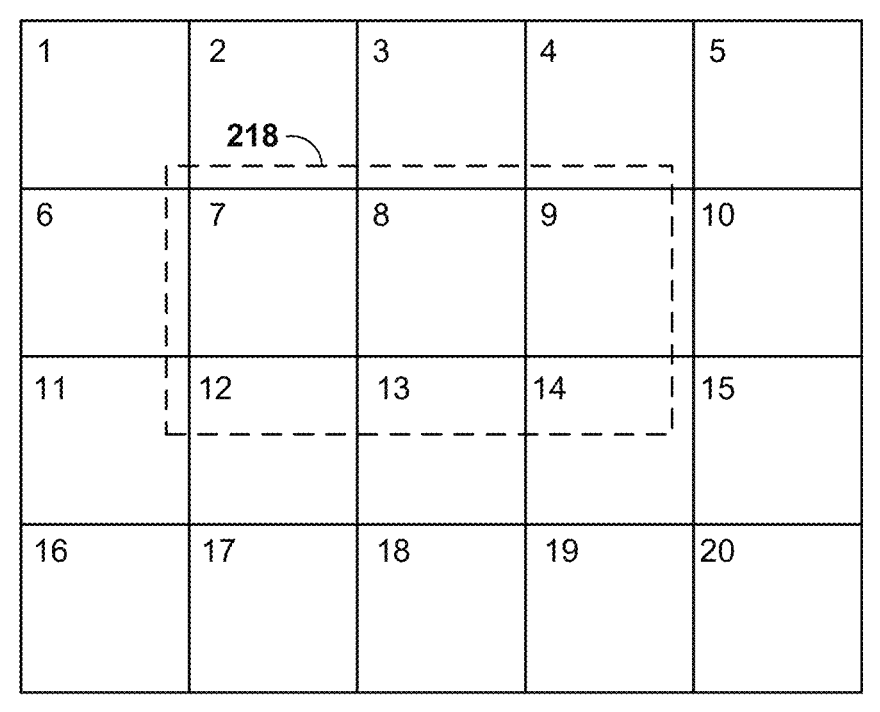

CPU 6 and/or GPU 10 selects a screen-aligned buffer region that overlaps at least partially with the destination region (216). FIG. 23 is a conceptual diagram illustrating a screen with a plurality of screen-aligned buffer regions (i.e., tiles 1-20) and a destination surface 218. As shown in FIG. 23, screen-aligned buffer regions 1-4, 6-9 and 11-14 overlap at least partially with destination surface 218 while screen-aligned buffer regions 5, 10, 15 and 16-20 do not overlap at all with destination surface 218.

CPU 6 and/or GPU 10 determines whether the destination region completely overlaps the selected screen-aligned buffer region (220). In other words, CPU 6 and/or GPU 10 may determine whether the destination region fully covers the selected fixed, screen-aligned buffer region. If the destination region does not completely overlap the selected screen-aligned buffer region (e.g., if the destination region does not fully cover the selected screen-aligned buffer region), then CPU 6 and/or GPU 10 selects the interleave memory transfer mode as the memory transfer mode to perform the memory transfer operation with respect to the selected screen-aligned buffer region (222). Otherwise, if the destination region completely overlaps the selected screen-aligned buffer region (e.g., if the destination region fully covers the selected screen-aligned buffer region), then CPU 6 and/or GPU 10 selects the sequential memory transfer mode as the memory transfer mode to perform the memory transfer operation with respect to the selected screen-aligned buffer region (224).

For example, with respect to FIG. 23, destination region 218 fully covers fixed, screen-aligned buffer regions 7, 8 and 9. Therefore, CPU 6 and/or GPU 10 may select the sequential memory transfer mode for performing the memory transfer operation with respect to screen-aligned buffer regions 7, 8 and 9. Similarly, destination region 218 partially covers, but does not fully cover, screen-aligned buffer regions 1-4, 6 and 11-14. Therefore, CPU 6 and/or GPU 10 may select the interleave memory transfer mode for performing the memory transfer operation with respect to screen-aligned buffer regions 1-4, 6 and 11-14.

In some cases, a surface may correspond to the pixels contained on a display monitor or screen. The screen may be subdivided into a plurality of regions each having a fixed size that corresponds to the size of the buffer that is used to store the read data. These subdivided regions may be referred to as fixed, screen-aligned buffer regions. In such examples, when operating in the sequential memory transfer mode, GPU 10 may be configured to transfer data between memory 22 and GPU 10 in data units of a fixed size that correspond to the size of the fixed, screen-aligned buffer regions.

If a destination region partially, but not fully, covers a particular fixed, screen-aligned buffer region, then CPU 6 and/or GPU 10 may select the interleave memory transfer mode as the memory transfer mode for that region of the screen because the buffer in which the read data will be stored will be not be fully utilized. If the sequential memory mode were selected in such a case, the fixed size memory read would cause extraneous data to be read from the memory, which may outweigh any read-write turnaround savings which would occur by using the sequential memory transfer mode. On the other hand, if a destination region fully covers a particular fixed, screen-aligned buffer region, then CPU 6 and/or GPU 10 may select the sequential memory transfer mode as the memory transfer mode for that region of the screen because the buffer in which the read data will be stored will be fully utilized and no time would be wasted retrieving extraneous data.

In some examples, a memory transfer operation may be implemented with GPU 10 by rendering one or more primitives that spatially correspond to the destination region of the memory transfer operation, applying a texture that corresponds to the source region data to the rendered one or more primitives, and merging the one or more primitives with any destination data already stored in a frame buffer. In such examples, CPU 6 and/or GPU 10 may select a memory transfer mode for performing a memory transfer operation with respect to a fixed, screen-aligned buffer region based on an amount of overlap a primitive to be rendered has with the fixed, screen-aligned buffer region. For example, CPU 6 and/or GPU 10 may select the sequential memory transfer mode as the memory transfer mode if the primitive to be rendered fully covers the fixed, screen-aligned buffer region, and select the interleave memory transfer mode as the memory transfer mode if the primitive to be rendered does not fully cover the fixed, screen-aligned buffer region.

Figure 24:
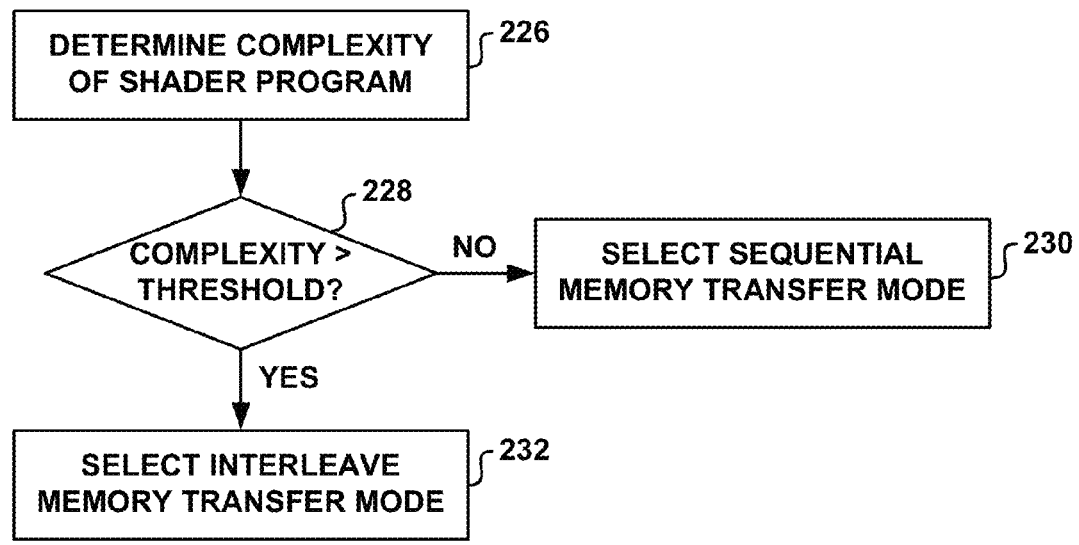
FIGS. 24-26 are flow diagrams illustrating example techniques for selecting a memory transfer mode for performing a memory transfer operation according to this disclosure.

FIG. 24 is a flow diagram illustrating an example technique for selecting a memory transfer mode for performing a memory transfer operation based on a complexity of a shader program that is used to perform the memory transfer operation according to this disclosure. In some examples, the technique shown in FIG. 24 may be used to implement process block 202 shown in FIG. 20.

CPU 6 and/or GPU 10 determines a complexity of a shader program that is used to perform the memory transfer operation (226). The shader program may, in some examples, be a pixel shader program. In some examples, the complexity of the shader program may correspond to the size of the shader program. In further examples, the complexity of the shader program correspond to the number of calculations to be performed by the shader program. In further examples, the complexity of the shader program may correspond to the number of loops or iterations to be performed by the shader program.

CPU 6 and/or GPU 10 determines whether the complexity of the shader program is greater than a threshold (228). If the complexity of the shader program is not greater than the threshold, then CPU 6 and/or GPU 10 may select the sequential memory transfer mode as the memory transfer mode to be used for performing all or part of a memory transfer operation (230). If the complexity of the shader program is greater than the threshold, then CPU 6 and/or GPU 10 may select the interleave memory transfer mode as the memory transfer mode to be used for performing all or part of a memory transfer operation (232).

Figure 25:
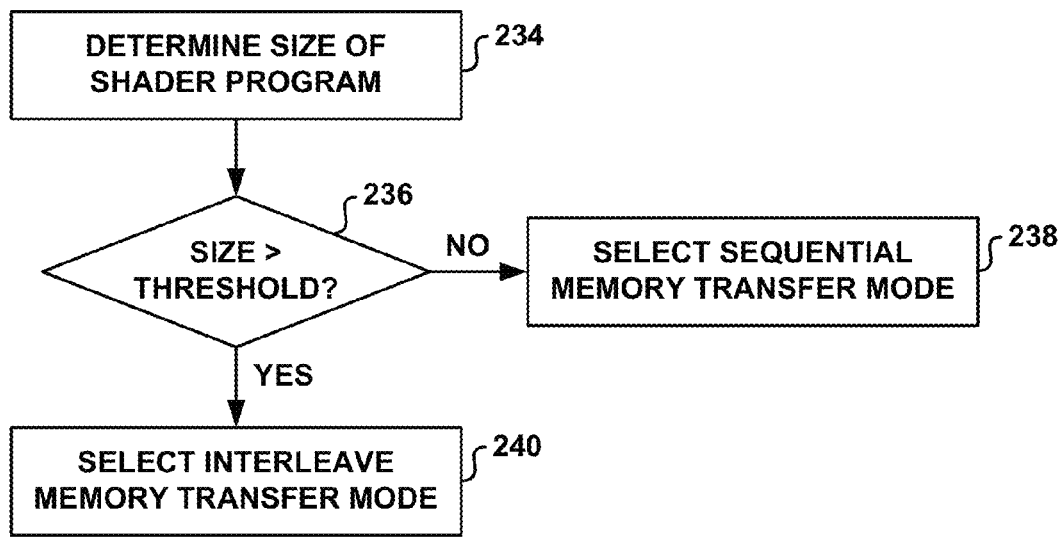

FIG. 25 is a flow diagram illustrating an example technique for selecting a memory transfer mode for performing a memory transfer operation based on a size of a shader program that is used to perform the memory transfer operation according to this disclosure. In some examples, the technique shown in FIG. 25 may be used to implement process block 202 shown in FIG. 20.

CPU 6 and/or GPU 10 determines a size of a shader program that is used to perform the memory transfer operation (234). The shader program may, in some examples, be a pixel shader program. In some examples, the size of the shader program may correspond to the number of instructions in the shader program. In further examples, the size of the shader program may correspond to the number of bytes in the shader program.

CPU 6 and/or GPU 10 determines whether the size of the shader program is greater than a threshold (236). If the size of the shader program is not greater than the threshold, then CPU 6 and/or GPU 10 may select the sequential memory transfer mode as the memory transfer mode to be used for performing all or part of a memory transfer operation (238). If the size of the shader program is greater than the threshold, then CPU 6 and/or GPU 10 may select the interleave memory transfer mode as the memory transfer mode to be used for performing all or part of a memory transfer operation (240).

Figure 26:
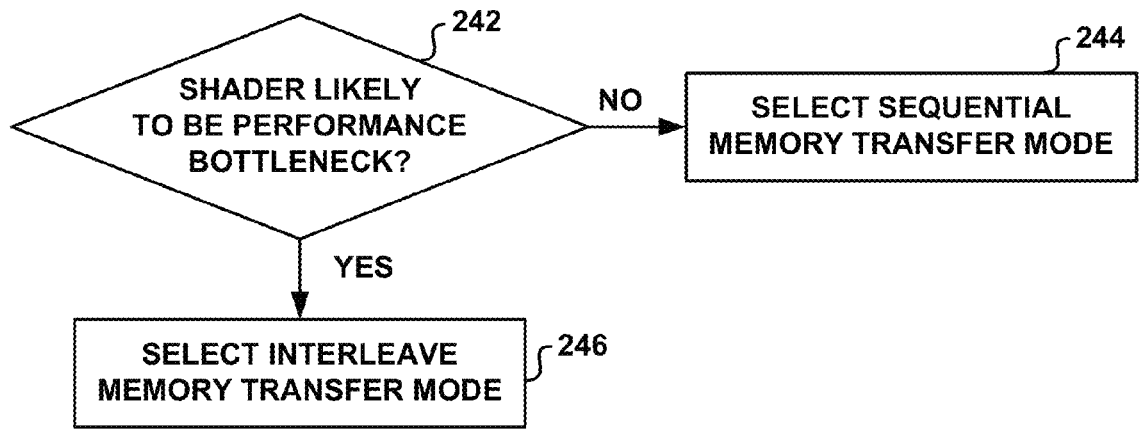

FIG. 26 is a flow diagram illustrating an example technique for selecting a memory transfer mode for performing a memory transfer operation based on a determination of whether execution of the shader program is likely to be a performance bottleneck for the memory transfer operation according to this disclosure. In some examples, the technique shown in FIG. 26 may be used to implement process block 202 shown in FIG. 20.

CPU 6 and/or GPU 10 makes a determination of whether execution of the shader program is likely to be a performance bottleneck for the memory transfer operation (242). The shader program may, ins some example, be a pixel shader program. In some examples, CPU 6 and/or GPU 10 may make the determination based on a complexity of the shader program and/or a size of the shader program.

If execution of the shader program is not likely to be a performance bottleneck for the memory transfer operation (e.g., the size and/or complexity of the shader program is less than a threshold), then CPU 6 and/or GPU 10 may select the sequential memory transfer mode as the memory transfer mode to be used for performing all or part of a memory transfer operation (244). If execution of the shader program is likely to be a performance bottleneck for the memory transfer operation (e.g., the size and/or complexity of the shader program is greater than a threshold), then CPU 6 and/or GPU 10 may select the interleave memory transfer mode as the memory transfer mode to be used for performing all or part of a memory transfer operation (246).

Figure 27:
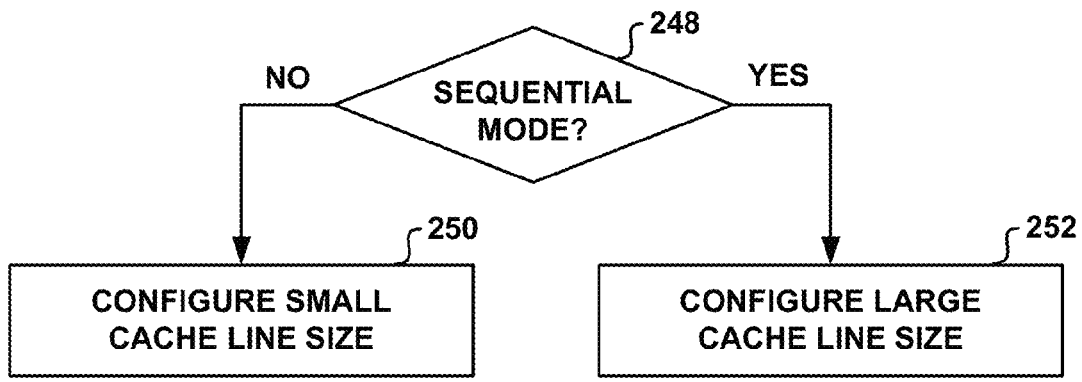
FIG. 27 is a flow diagram illustrating an example technique for performing a memory transfer operation according to this disclosure.

FIG. 27 is a flow diagram illustrating an example technique for performing a memory transfer operation according to this disclosure. In some examples, the technique shown in FIG. 27 may be used to implement process block 204 shown in FIG. 20.

GPU 10 determines whether the sequential memory transfer mode or the interleave memory transfer mode has been selected (248). If the sequential memory transfer mode has not been selected (i.e., the interleave memory transfer mode has been selected), then GPU 10 may configure a cache line size for a cache that is used to perform the memory transfer operation to be a first size (250). If the sequential memory transfer mode has been selected (i.e., the interleave memory transfer mode has been selected), then GPU 10 may configure the cache line size for a cache that is used to perform the memory transfer operation to be a second size (252). The second size may be larger than the first size. In some examples, the second size may correspond to a cache line size that is equal to the entire capacity of the cache, and the first size may correspond to a cache line size that is equal to less than the entire capacity of the cache.

According to some aspects of this disclosure, techniques are described for signaling a memory transfer mode to be used by a GPU for performing a memory transfer operation. The signaling techniques may allow a GPU driver and/or a user application executing on the application processor to control the memory transfer mode that is used for performing a memory transfer operation.

In some examples, an information field that specifies a memory transfer mode may be added to one or more existing GPU commands included in a GPU instruction set architecture (ISA). The information field may, in some cases, be a single mode bit that specifies a memory transfer mode to be used for a memory transfer operation associated with the instruction. For example, a graphics driver may service a user-level blit command by specifying the source and destination memory regions to the GPU and issuing a (three-dimensional) 3D draw call instruction to the GPU. The 3D draw call instruction may include a mode bit indicating the memory transfer mode to be used during execution of the 3D draw call instruction. The GPU may be configured to perform a memory transfer operation based on the memory transfer mode specified in the instruction.

In additional examples, the GPU may include a memory transfer mode state variable that specifies a memory transfer mode to be used for performing a memory transfer operation. In such examples, an additional instruction may be added to the instructions included in the GPU ISA. The additional instruction may be used to program a state of the memory transfer mode state variable to a value indicative of a memory transfer mode to be used for performing a memory transfer operation. The GPU may be configured to perform the memory transfer operation based on the state of the memory transfer mode state variable.

In further examples, an instruction may be added to the application programming interface (API) for the GPU driver. The instruction may include a memory transfer mode indicator that indicates a memory transfer mode to be used for performing the memory transfer operation. The GPU driver may be configured to cause the GPU to perform a memory transfer operation based on the memory transfer mode indicator. In this way, a user application may be able to specify the memory transfer mode to be used by a GPU when performing a memory transfer operation.

Example aspects of this disclosure include using an internal memory buffer to allow data to first be read in and then written out in sequence rather than interleaved. Example aspects of this disclosure further include a selection algorithm to automatically rasterize using the internal buffer based on primitive intersection with rasterization pattern. Thus, a primitive triangle may not use the internal buffer for the "narrow" sections while switching to "sequential mode" for the "wide" sections. Example aspects of this disclosure further include a mode bit indicating whether to allow the "sequential mode" to be used. The mode bit may be set based on whether the operation is estimated to be memory efficiency limited. An example implementation may involve using an existing cache, but changing its operation to use larger cache lines during the "sequential mode."

In some examples, a GPU driver and/or a user application may enable a choice of different memory transfer modes (rather than force the GPU to do one or the other). In such examples, the GPU may, in some examples, make the final decision of the memory transfer mode to be used for a memory transfer operation based on information discovered by the GPU during run-time.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method comprising:
    selecting, with one or more processors, a memory transfer mode for performing at least part of a memory transfer operation, the memory transfer mode being selected from a set of at least two different memory transfer modes that includes an interleave memory transfer mode and a sequential memory transfer mode, wherein the sequential memory transfer mode includes alternate issuing of groups of multiple, consecutive read requests and groups of multiple, consecutive write requests during separate time intervals; and
    performing, with a graphics processing unit (GPU), the memory transfer operation based on the selected memory transfer mode.

2. The method of claim 1, wherein selecting, with the one or more processors, the memory transfer mode comprises:
    selecting, with the one or more processors, the memory transfer mode based on an amount of data to be transferred by the memory transfer operation.

3. The method of claim 2, wherein selecting, with the one or more processors, the memory transfer mode based on the amount of data to be transferred by the memory transfer operation comprises:
    selecting, with the one or more processors, the sequential memory transfer mode as the memory transfer mode if the amount of data to be transferred by the memory transfer operation is greater than a threshold; and
    selecting, with the one or more processors, the interleave memory transfer mode as the memory transfer mode if the amount of data to be transferred by the memory transfer operation is not greater than the threshold.

4. The method of claim 1, wherein selecting, with the one or more processors, the memory transfer mode comprises:
    selecting, with the one or more processors, a memory transfer mode for performing a memory transfer operation with respect to a fixed, screen-aligned buffer region based on an amount of overlap a destination region of the memory transfer operation has with the fixed, screen-aligned buffer region.

5. The method of claim 1,
    wherein performing the memory transfer operation comprises executing a shader program, and
    wherein selecting, with the one or more processors, the memory transfer mode comprises selecting the memory transfer mode based on a determination of whether execution of the shader program is likely to be a performance bottleneck for the memory transfer operation.

6. The method of claim 5, wherein selecting, with the one or more processors, the memory transfer mode based on the determination of whether the execution of the shader program is likely to be the performance bottleneck for the memory transfer operation comprises:
    selecting the sequential memory transfer mode as the memory transfer mode in response to determining that the execution of the shader program is not likely to be the performance bottleneck for the memory transfer operation; and
    selecting the interleave memory transfer mode as the memory transfer mode in response to determining that the execution of the shader program is likely to be the performance bottleneck for the memory transfer operation.

7. The method of claim 1,
wherein performing the memory transfer operation comprises executing a shader program, and
wherein selecting, with the one or more processors, the memory transfer mode comprises selecting the memory transfer mode based on at least one of a size of a shader program that is used for performing the memory transfer operation and a complexity of the shader program that is used for performing the memory transfer operation.

8. The method of claim 7, wherein selecting, with the one or more processors, the memory transfer mode based on the at least one of the size of the shader program that is used for performing the memory transfer operation and the complexity of the shader program that is used for performing the memory transfer operation comprises:
selecting, with the one or more processors, the sequential memory transfer mode as the memory transfer mode if the at least one of the size of the shader program and the complexity of the shader program is less than a threshold; and
selecting, with the one or more processors, the interleave memory transfer mode as the memory transfer mode if the at least one of the size of the shader program and the complexity of the shader program is not less than the threshold.

9. The method of claim 1, wherein performing, with the GPU, the memory transfer operation comprises:
performing, with the GPU, the memory transfer operation based on an interleave memory transfer mode in response to the interleave memory transfer mode being selected as the memory transfer mode for performing the memory transfer operation; and
performing, with the GPU, the memory transfer operation based on a sequential memory transfer mode in response to the sequential memory transfer mode being selected as the memory transfer mode for performing the memory transfer operation.

10. The method of claim 9,
wherein performing, with the GPU, the memory transfer operation based on the interleave memory transfer mode comprises causing a read engine to issue read requests and a write engine to issue write requests based on a producer-consumer paradigm, and
wherein performing, with the GPU, the memory transfer operation based on the sequential memory transfer mode comprises causing the read engine to issue read requests and the write engine to issue write requests based on a mutual exclusion paradigm.

11. The method of claim 9,
wherein performing, with the GPU, the memory transfer operation based on the interleave memory transfer mode comprises, each time source data that is sufficient to issue a write request for the memory transfer operation is received by the GPU from a memory, consuming, with the write engine, the respective source data without waiting for additional source data to be subsequently received for at least one other write request, and
wherein performing, with the GPU, the memory transfer operation based on the sequential memory transfer mode comprises, for at least part of the memory transfer operation, in response to the GPU receiving, from the memory, source data that is sufficient to issue a write request for the memory transfer operation, deferring, with the write engine, consumption of the source data until additional source data subsequently received that is sufficient to issue at least one other write request.

12. The method of claim 9,
wherein performing, with the GPU, the memory transfer operation based on the interleave memory transfer mode comprises, each time a write engine consumes source data that is sufficient to issue a write request for the memory transfer operation, issuing, with a read engine, a read request without waiting for additional source data to be subsequently consumed by the write engine for at least one other write request, and
wherein performing, with the GPU, the memory transfer operation based on the sequential memory transfer mode comprises, for at least part of the memory transfer operation, in response to the write engine consuming source data that is sufficient to issue a write request for the memory transfer operation, deferring, with a read engine, issuance of a subsequent read request until additional source data is subsequently consumed by the write engine that is sufficient to issue at least one other write request.

13. The method of claim 1,
wherein the GPU comprises a buffer configured to store source data received in response to read requests issued by the GPU to the memory,
wherein performing, with the GPU, the memory transfer operation based on the interleave memory transfer mode comprises:
issuing one or more read requests;
placing source data received from the memory in response to the plurality of read requests into the buffer;
for each of the plurality of read requests, in response to the source data being placed in the buffer for a respective one of the plurality of read requests, consuming the source data placed in the buffer and issuing a write request based on the consumed source data; and
for each of a plurality of write requests, in response to source data being consumed from the buffer for a respective one of the write requests, issuing a subsequent read request, and
wherein performing, with the GPU, the memory transfer operation based on the sequential memory transfer mode comprises:
issuing a plurality of read requests;
placing source data received from the memory in response to the plurality of read requests into the buffer;
ceasing to issue read requests in response to detecting that enough read requests have been issued to fill the buffer;
consuming source data in the buffer and issuing a plurality of write requests based on the consumed source data in response to detecting that the buffer is full;
ceasing to consume source data in the buffer and to issue write requests in response detecting that the buffer is empty; and
resuming issuance of read requests in response to detecting that the buffer is empty.

14. The method of claim 1, further comprising:
performing a first part of the memory transfer operation using a first memory transfer mode selected from the set of at least two different memory transfer modes; and
performing a second part of the memory transfer operation using a second memory transfer mode selected from the set of at least two different memory transfer modes.

15. The method of claim 1, wherein performing, with the GPU, the memory transfer operation comprises:
selecting a cache line size of a cache that is used for buffering source data retrieved from a memory during the memory transfer operation based on the selected memory transfer mode; and configuring the cache for the memory transfer operation based on the selected cache line size.

16. The method of claim 15, wherein selecting the cache line size comprises:
selecting a cache line size that is equal to an entire capacity of the cache in response to the sequential memory transfer mode being selected as the memory transfer mode for performing the memory transfer operation; and
selecting a cache line size that is less than the entire capacity of the cache in response to the interleave memory transfer mode being selected as the memory transfer mode for performing the memory transfer operation.

17. The method of claim 1, wherein the one or more processors comprise the GPU, and wherein selecting, with the one or more processors, the memory transfer mode comprises selecting, with the GPU, the memory transfer mode for performing the at least part of the memory transfer operation.

18. The method of claim 1, wherein the one or more processors comprise a CPU, wherein selecting, with the one or more processors, the memory transfer mode comprises selecting, with the CPU, the memory transfer mode for performing the at least part of a memory transfer operation, and wherein the method further comprises causing the GPU to perform the memory transfer operation based on the selected memory transfer mode.

19. A method comprising:
selecting, with one or more processors, a memory transfer mode for performing at least part of a memory transfer operation, the memory transfer mode being selected from a set of at least two different memory transfer modes that includes an interleave memory transfer mode and a sequential memory transfer mode; and
performing, with a graphics processing unit (GPU), the memory transfer operation based on the selected memory transfer mode wherein selecting, with the one or more processors, the memory transfer mode based on an amount of overlap the destination region of the memory transfer operation has with the fixed, screen-aligned buffer region comprises:
selecting, with the one or more processors, a memory transfer mode for performing a memory transfer operation with respect to a fixed, screen-aligned buffer region based on an amount of overlap a destination region of the memory transfer operation has with the fixed, screen-aligned buffer region;
selecting the sequential memory transfer mode as the memory transfer mode if the destination region fully covers the fixed, screen-aligned buffer region; and
selecting the interleave memory transfer mode as the memory transfer mode if the destination region does not fully cover the fixed, screen-aligned buffer region.

20. A method comprising:
selecting, with one or more processors, a memory transfer mode for performing at least part of a memory transfer operation, the memory transfer mode being selected from a set of at least two different memory transfer modes that includes an interleave memory transfer mode and a sequential memory transfer mode; and
performing, with a graphics processing unit (GPU), the memory transfer operation based on the selected memory transfer mode, wherein performing, with the GPU, the memory transfer operation comprises:
performing, with the GPU, the memory transfer operation based on an interleave memory transfer mode in response to the interleave memory transfer mode being selected as the memory transfer mode for performing the memory transfer operation, wherein the memory transfer operation based on the interleave memory transfer mode comprises causing the write engine to issue a write request in response to the GPU receiving, from a memory, source data that is sufficient for issuing the write request and causing the read engine to issue a read request in response to the write engine consuming the source data that is sufficient for issuing the write request; and
performing, with the GPU, the memory transfer operation based on a sequential memory transfer mode in response to the sequential memory transfer mode being selected as the memory transfer mode for performing the memory transfer operation, and wherein the memory transfer operation based on the sequential memory transfer mode comprises causing the read engine and the write engine to alternate issuing groups of multiple, consecutive read requests and groups of multiple, consecutive write requests during separate time intervals.

21. A device comprising:
at least one memory;
one or more processors configured to select a memory transfer mode for performing at least part of a memory transfer operation for the at least one memory, the memory transfer mode being selected from a set of at least two different memory transfer modes that includes an interleave memory transfer mode and a sequential memory transfer mode, wherein the sequential memory transfer mode includes alternate issuing of groups of multiple, consecutive read requests and groups of multiple, consecutive write requests during separate time intervals; and
a graphics processing unit (GPU) configured to perform the memory transfer operation based on the selected memory transfer mode.

22. The device of claim 21, wherein the one or more processors are further configured to select the memory transfer mode based on an amount of data to be transferred by the memory transfer operation.

23. The device of claim 22, wherein the one or more processors are further configured to select the sequential memory transfer mode as the memory transfer mode if the amount of data to be transferred by the memory transfer operation is greater than a threshold, and to select the interleave memory transfer mode as the memory transfer mode if the amount of data to be transferred by the memory transfer operation is not greater than the threshold.

24. The device of claim 21, wherein the one or more processors are further configured to select a memory transfer mode for performing a memory transfer operation with respect to a fixed, screen-aligned buffer region based on an amount of overlap a destination region of the memory transfer operation has with the fixed, screen-aligned buffer region.

25. The device of claim 24, wherein the one or more processors are further configured to select the sequential memory transfer mode as the memory transfer mode if the destination region fully covers the fixed, screen-aligned buffer region, and to select the interleave memory transfer mode as the memory transfer mode if the destination region does not fully cover the fixed, screen-aligned buffer region.

26. The device of claim 21, wherein the GPU is further configured to execute a shader program to perform the memory transfer operation, and wherein the one or more processors are further configured to select the memory transfer mode based on a determination of whether execution of the shader program is likely to be a performance bottleneck for the memory transfer operation.

27. The device of claim 26, wherein the one or more processors are further configured to select the sequential memory transfer mode as the memory transfer mode in response to determining that the execution of the shader program is not likely to be a performance bottleneck for the memory transfer operation, and to select the interleave memory transfer mode as the memory transfer mode in response to determining that the execution of the shader program is likely to be a performance bottleneck for the memory transfer operation.

28. The device of claim 21, wherein the GPU is further configured to execute a shader program to perform the memory transfer operation, and wherein the one or more processors are further configured to select the memory transfer mode based on at least one of a size of a shader program that is used for performing the memory transfer operation and a complexity of the shader program that is used for performing the memory transfer operation.

29. The device of claim 28, wherein the one or more processors are further configured to select the sequential memory transfer mode as the memory transfer mode if the at least one of the size of the shader program and the complexity of the shader program is less than a threshold, and to select the interleave memory transfer mode as the memory transfer mode if the at least one of the size of the shader program and the complexity of the shader program is not less than the threshold.

30. The device of claim 21, wherein the GPU is further configured to perform the memory transfer operation based on an interleave memory transfer mode in response to the interleave memory transfer mode being selected as the memory transfer mode for performing the memory transfer operation, and to perform the memory transfer operation based on a sequential memory transfer mode in response to the sequential memory transfer mode being selected as the memory transfer mode for performing the memory transfer operation.

31. The device of claim 30,
wherein the GPU is further configured to cause a read engine to issue read requests and a write engine to issue write requests based on a producer-consumer paradigm when performing the memory transfer operation based on the interleave memory transfer mode, and
wherein the GPU is further configured to cause the read engine to issue read requests and the write engine to issue write requests based on a mutual exclusion paradigm when performing the memory transfer operation based on the sequential memory transfer mode.

32. The device of claim 30,
wherein the GPU is further configured to, when performing the memory transfer operation based on the interleave memory transfer mode, cause the write engine to issue a write request in response to the GPU receiving source data from a memory that is sufficient for issuing the write request and cause the read engine to issue a read request in response to the write engine consuming source data received from the memory that is sufficient for issuing a write request, and
wherein the GPU is further configured to, when performing the memory transfer operation based on the sequential memory transfer mode, cause the read engine and the write engine to alternate issuing groups of multiple, consecutive read requests and groups of multiple, consecutive read requests write requests during separate time intervals.

33. The device of claim 30,
wherein the GPU is further configured to, each time source data that is sufficient to issue a write request for the memory transfer operation is received by the GPU from a memory, consume, with the write engine, the respective source data without waiting for additional source data to be subsequently received for at least one other write request when performing the memory transfer operation based on the interleave memory transfer mode, and
wherein the GPU is further configured to, for at least part of the memory transfer operation, in response to the GPU receiving, from the memory, source data that is sufficient to issue a write request for the memory transfer operation, deferring, with the write engine, consumption of the source data until additional source data is subsequently received that is sufficient to issue at least one other write request when performing the memory transfer operation based on the sequential memory transfer mode.

34. The device of claim 30,
wherein the GPU is further configured to, each time a write engine consumes source data that is sufficient to issue a write request for the memory transfer operation, issuing, with a read engine, a read request without waiting for additional source data to be subsequently consumed by the write engine for at least one other write request when performing the memory transfer operation based on the interleave memory transfer mode, and
wherein the GPU is further configured to, for at least part of the memory transfer operation, in response to the write engine consuming source data that is sufficient to issue a write request for the memory transfer operation, deferring, with the read engine, issuance of a subsequent read request until source data is subsequently consumed by the write engine that is sufficient to issue at least one other write request when performing the memory transfer operation based on the sequential memory transfer mode.

35. The device of claim 21, wherein the GPU comprises a buffer configured to store source data received in response to read requests issued by the GPU to the memory,
wherein the GPU is further configured to, when performing the memory transfer operation based on the interleave memory transfer mode:
issue one or more read requests;
place source data received from the memory in response to the plurality of read requests into the buffer;
for each of the plurality of read requests, in response to the source data being placed in the buffer for a respective one of the plurality of read requests, consume the source data placed in the buffer and issuing a write request based on the consumed source data; and
for each of a plurality of write requests, in response to the source data being consumed from the buffer for a respective one of the write requests, issue a subsequent read request, and
wherein the GPU is further configured to, when performing the memory transfer operation based on the sequential memory transfer mode:
issue a plurality of read requests;
place source data received from the memory in response to the plurality of read requests into the buffer;
cease to issue read requests in response to detecting that enough read requests have been issued to fill the buffer;

consume source data in the buffer and issue a plurality of write requests based on the consumed source data in response to detecting that the buffer is full;

cease to consume source data in the buffer and to issue write requests in response detecting that the buffer is empty; and resume issuance of read requests in response to detecting that the buffer is empty.

36. The device of claim 21, wherein the GPU is further configured to perform a first part of the memory transfer operation using a first memory transfer mode selected from the set of at least two different memory transfer modes, and to perform a second part of the memory transfer operation using a second memory transfer mode selected from the set of at least two different memory transfer modes.

37. The device of claim 21, wherein the GPU is further configured to select a cache line size of a cache that is used for buffering source data retrieved from a memory during the memory transfer operation based on the selected memory transfer mode, and to configure the cache for the memory transfer operation based on the selected cache line size.

38. The device of claim 37, wherein the GPU is further configured to select a cache line size that is equal to an entire capacity of the cache in response to the sequential memory transfer mode being selected as the memory transfer mode for performing the memory transfer operation, and to select a cache line size that is less than the entire capacity of the cache in response to the interleave memory transfer mode being selected as the memory transfer mode for performing the memory transfer operation.

39. The device of claim 21, wherein the one or more processors comprise the GPU, and wherein the GPU is further configured to select the memory transfer mode for performing the at least part of a memory transfer operation.

40. The device of claim 21, wherein the one or more processors comprise a CPU configured to select the memory transfer mode for performing the at least part of the memory transfer operation, and to cause the GPU to perform the memory transfer operation based on the memory transfer mode.

41. The device of claim 21, wherein the device comprises a wireless communication device.

42. The device of claim 21, wherein the device comprises a mobile phone handset.

43. An apparatus comprising:
means for selecting a memory transfer mode for performing at least part of a memory transfer operation, the memory transfer mode being selected from a set of at least two different memory transfer modes that includes an interleave memory transfer mode and a sequential memory transfer mode, wherein the sequential memory transfer mode includes alternate issuing of groups of multiple, consecutive read requests and groups of multiple, consecutive write requests during separate time intervals; and
means for performing the memory transfer operation based on the selected memory transfer mode.

44. The apparatus of claim 43, wherein the means for selecting the memory transfer mode comprises:
means for selecting the memory transfer mode based on at least one of an amount of data to be transferred by the memory transfer operation, a size of a shader program that is used for performing the memory transfer operation, and a complexity of the shader program that is used for performing the memory transfer operation.

45. The apparatus of claim 43, wherein the means for selecting the memory transfer mode comprises:
means for selecting a memory transfer mode for performing a memory transfer operation with respect to a fixed, screen-aligned buffer region based on an amount of overlap a destination region of the memory transfer operation has with the fixed, screen-aligned buffer region.

46. The apparatus of claim 43,
wherein the means for performing the memory transfer operation comprises a graphics processing unit (GPU), and
wherein the means for selecting the memory transfer mode comprises at least one of a CPU and the GPU.

47. A computer-readable storage medium storing instructions that, when executed, cause one or more processors to:
select a memory transfer mode for performing at least part of a memory transfer operation, the memory transfer mode being selected from a set of at least two different memory transfer modes that includes an interleave memory transfer mode and a sequential memory transfer mode, wherein the sequential memory transfer mode includes alternate issuing of groups of multiple, consecutive read requests and groups of multiple, consecutive write requests during separate time intervals; and
perform the memory transfer operation based on the selected memory transfer mode.

48. The computer-readable storage medium of claim 47, wherein the instructions that, when executed, cause the one or more processors to select the memory transfer mode comprise instructions that, when executed, cause the one or more processors to:
select the memory transfer mode based on at least one of an amount of data to be transferred by the memory transfer operation, a size of a shader program that is used for performing the memory transfer operation, and a complexity of a shader program that is used for performing the memory transfer operation.

49. The computer-readable storage medium of claim 47, wherein the instructions that, when executed, cause the one or more processors to select the memory transfer mode comprise instructions that, when executed, cause the one or more processors to:
select a memory transfer mode for performing a memory transfer operation with respect to a fixed, screen-aligned buffer region based on an amount of overlap a destination region of the memory transfer operation has with the fixed, screen-aligned buffer region.

50. The computer-readable storage medium of claim 47,
wherein the instructions that, when executed, cause the one or more processors to perform the memory transfer operation comprise instructions that, when executed, cause a graphics processing unit (GPU) to perform the memory transfer operation based on the selected memory transfer mode, and
wherein the instructions that, when executed, cause the one or more processors to select the memory transfer mode comprise instructions that, when executed, cause at least one of a CPU and the GPU to select the memory transfer mode for performing the at least part of a memory transfer operation.

* * * * *